(12) United States Patent
Dekel et al.

(10) Patent No.: US 12,282,696 B2
(45) Date of Patent: Apr. 22, 2025

(54) METHOD AND SYSTEM FOR SEMANTIC APPEARANCE TRANSFER USING SPLICING ViT FEATURES

(71) Applicant: Yeda Research and Development Co. Ltd., Rehovot (IL)

(72) Inventors: Tali Dekel, Rehovot (IL); Shai Bagon, Rehovot (IL); Omer Bar Tal, Rehovot (IL); Narek Tumanyan, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 18/723,429

(22) PCT Filed: Dec. 18, 2022

(86) PCT No.: PCT/IL2022/051346
§ 371 (c)(1),
(2) Date: Jun. 23, 2024

(87) PCT Pub. No.: WO2023/126914
PCT Pub. Date: Jul. 6, 2023

(65) Prior Publication Data
US 2024/0419382 A1    Dec. 19, 2024

Related U.S. Application Data

(60) Provisional application No. 63/293,842, filed on Dec. 27, 2021.

(51) Int. Cl.
*G06F 3/14* (2006.01)
*G06T 7/11* (2017.01)
(Continued)

(52) U.S. Cl.
CPC ............... *G06F 3/14* (2013.01); *G06T 7/11* (2017.01); *G06V 10/54* (2022.01); *G06V 10/56* (2022.01);
(Continued)

(58) Field of Classification Search
CPC ... G06F 3/14; G06T 2207/20084; G06T 7/11; G06V 10/54; G06V 10/56; G06V 10/761; G06V 20/70
See application file for complete search history.

(56) References Cited

U.S. PATENT DOCUMENTS

| | | |
|---|---|---|
| 5,092,343 A | 3/1992 | Spitzer et al. |
| 5,138,459 A | 8/1992 | Roberts et al. |

(Continued)

FOREIGN PATENT DOCUMENTS

| | | |
|---|---|---|
| CN | 113642585 | 11/2021 |
| JP | 2006050494 | 2/2006 |

(Continued)

OTHER PUBLICATIONS

Dmitry Ulyanov; Andrea Vedaldi; and Victor Lempitsky, entitled: "Deep Image Prior" dated May 17, 2020 [arXiv:1711.10925 [cs.CV]; arXiv:1711.10925v4 [cs.CV]; https://doi.org/10.48550/arXiv.1711.10925; https://doi.org/10.1007/s11263-020-1303-4] (pp. 23).

(Continued)

*Primary Examiner* — Muhammad N Edun
(74) *Attorney, Agent, or Firm* — May Patents Ltd. c/o Dorit Shem-Tov

(57) ABSTRACT

Using a pre-trained and fixed Vision Transformer (ViT) model as an external semantic prior, a generator is trained given only a single structure/appearance image pair as input. Given two input images, a source structure image and a target appearance image, a new image is generated by the generator in which the structure of the source image is (Continued)

preserved, while the visual appearance of the target image is transferred in a semantically aware manner, so that objects in the structure image are "painted" with the visual appearance of semantically related objects in the appearance image. A self-supervised, pre-trained ViT model, such as a DINO-VIT model, is leveraged as an external semantic prior, allowing for training of the generator only on a single input image pair, without any additional information (e.g., segmentation/correspondences), and without adversarial training. The method may generate high quality results in high resolution (e.g., HD).

18 Claims, 19 Drawing Sheets

(51) Int. Cl.
 G06V 10/54 (2022.01)
 G06V 10/56 (2022.01)
 G06V 10/74 (2022.01)
 G06V 20/70 (2022.01)
(52) U.S. Cl.
 CPC ............ *G06V 10/761* (2022.01); *G06V 20/70* (2022.01); *G06T 2207/20084* (2013.01)

(56) References Cited

U.S. PATENT DOCUMENTS

| | | | |
|---|---|---|---|
| 5,402,170 | A | 3/1995 | Parulski et al. |
| 5,798,791 | A | 8/1998 | Katayama et al. |
| 6,018,728 | A | 1/2000 | Spence et al. |
| 6,038,337 | A | 3/2000 | Lawrence et al. |
| 6,711,293 | B1 | 3/2004 | Lowe |
| 6,897,891 | B2 | 5/2005 | Itsukaichi |
| 6,940,545 | B1 | 9/2005 | Ray |
| 7,432,952 | B2 | 10/2008 | Fukuoka |
| 8,165,401 | B2 | 4/2012 | Funayama et al. |
| 8,244,053 | B2 | 8/2012 | Steinberg |
| 8,285,067 | B2 | 10/2012 | Steinberg |
| 8,345,984 | B2 | 1/2013 | Ji et al. |
| 8,705,849 | B2 | 4/2014 | Prokhorov |
| 8,712,189 | B2 | 4/2014 | Bitouk et al. |
| 8,773,509 | B2 | 7/2014 | Pan |
| 8,898,093 | B1 | 11/2014 | Helmsen |
| 9,881,234 | B2 | 1/2018 | Huang et al. |
| 10,706,335 | B2 | 7/2020 | Gautam et al. |
| 2002/0101515 | A1 | 8/2002 | Yoshida et al. |
| 2007/0195167 | A1 | 8/2007 | Ishiyama |
| 2009/0102940 | A1 | 4/2009 | Uchida |
| 2012/0249768 | A1 | 10/2012 | Binder |
| 2014/0070613 | A1 | 3/2014 | Garb et al. |
| 2014/0159877 | A1 | 6/2014 | Huang |
| 2020/0160547 | A1* | 5/2020 | Liu ................... G06V 20/588 |
| 2020/0195910 | A1* | 6/2020 | Han ................... H04N 13/25 |
| 2020/0380306 | A1 | 12/2020 | Hada et al. |
| 2023/0196712 | A1* | 6/2023 | Assouline ............... G06T 11/00 382/107 |

FOREIGN PATENT DOCUMENTS

| | | |
|---|---|---|
| JP | 2007208922 | 8/2007 |
| JP | 2008033200 | 2/2008 |
| WO | 2012013914 | 2/2012 |
| WO | 2020/101246 | 5/2020 |

OTHER PUBLICATIONS

Hans-Petter Halvorsen, "Introduction to Database Systems", Telemark University College, dated Mar. 3, 2014 (40 pages).
Tutorial entitled: "Oracle / SQL Tutorial" by Michael Gertz of University of California, revised Version 1.01, Jan. 2000 (66 pages).
Book published 2005 by Pearson Education, Inc. William Stallings [ISBN: 0-13-191835-4] "Wireless Communications and Networks—second Edition" (569 pages).
Telecom Regulatory Authority, "WiFi Technology", published on Jul. 2003 (60 pages).
Bluetooth SIG published Dec. 2, 2014 standard Covered Core Package version: 4.2, "Master Table of Contents & Compliance Requirements—Specification vol. 0" (2772 pages).
Carles Gomez et al., "Overview and Evaluation of Bluetooth Low Energy: An Emerging Low-Power Wireless Technology", published 2012 in Sensors [ISSN 1424-8220] [Sensors 2012, 12, 11734-11753; doi: 10.3390/s120211734] (20 pages).
Shir Amir, Yossi Gandelsman, Shai Bagon, and Tali Dekel, "Deep ViT Features as Dense Visual Descriptors", published Sep. 4, 2022 (arXiv:2112.05814 [cs.CV]; https://doi.org/10.48550/arXiv.2112.05814) (17 pages).
Nicholas Kolkin, Jason Salavon, and Greg Shakhnarovich entitled: "Style Transfer by Relaxed Optimal Transport and Self-Similarity", [https://doi.org/10.48550/arXiv.1904.12785; arXiv:1904.12785v2 [cs.CV]] published 2019 in Proceedings of the IEEE/CVF Conference on Computer Vision and Pattern Recognition (10 pages).
Eli Shechtman and Michal Irani entitled: "Matching Local Self-Similarities across Images and Videos", published 2007 in IEEE Conference on Computer Vision and Pattern Recognition [DOI: 10.1109/CVPR.2007.383198] (8 pages).
Data sheet [DS-TM4C123GH6PM-15842.2741, SPMS376E, Revision 15842.2741 Jun. 2014], "Tiva™ TM4C 123GH6PM Microcontroller—Data Sheet", published 2015 by Texas Instruments Incorporated (1409 pages).
Narek Tumanyan; Omer Bar-Tal; Shai Bagon; and Tali Dekel, "Splicing ViT Features for Semantic Appearance Transfer", dated Jan. 2, 2022 (arXiv:2201.00424 [cs.CV], https://doi.org/10.48550/arXiv.2201.00424) (10 pages).
Diederik P. Kingma and Jimmy Ba entitled: "Adam: A Method for Stochastic Optimization", dated May 7, 2015 [arXiv:1412.6980 [cs.LG]; https://doi.org/10.48550/arXiv.1412.6980; Published as a conference paper at the 3rd International Conference for Learning Representations, San Diego, 2015] (15 pages).
A paper by Adam Paszke et al., "PyTorch: An Imperative Style, High-Performance Deep Learning Library" dated Dec. 3, 2019 [arXiv:1912.01703 [cs.LG]; https://doi.org/10.48550/arXiv.1912.01703; Published in "Advances in Neural Information Processing Systems 32" pp. 8024-8035. Curran Associates, Inc., 2019] (12 pages).
The manual "80186/80188 High-Integration 16-Bit Microprocessors" by Intel Corporation Nov. 1994 (34 pages).
JJoseph Ciaglia et al., "Absolute Beginner's Guide to Digital Photography", published on Apr. 2004 by Que Publishing (ISBN—0-7897-3120-7) (381 pages).
Al Bovik, "Handbook of Image & Video Processing", by Academic Press, ISBN: 0-12-119790-5, 2000 (800 pages).
Application Note No. AN1928/D (Revision 0—Feb. 20, 2001), "Roadrunner—Modular digital still camera reference design", Freescale Semiconductor, Inc. (30 pages).
A book "The SAR Handbook: Comprehensive Methodologies for Forest Monitoring and Biomass Estimation Book", edited by Africa Ixmucane Flores-Anderson; Kelsey E. Herndon; and Rajesh Bahadur Thapa; Emil Cherrington, published Apr. 2019 [DOI: 10.25966/nr2c-s697] (307 pages).
Gerhard Krieger, Irena Hajnsek, and Konstantinos P. Papathanass, "A Tutorial on Synthetic Aperture Radar", published Mar. 2013 in IEEE Geoscience and remote sensing magazine [2168-6831/13/$31.00 © 2013] entitled: (30 pages).
Adobe Digital Video Group publication, "A Digital Video Primer—An introduction to DV production, post-production, and delivery", updated and enhanced Mar. 2004 (58 pages).
Primer by Tektronix® entitled: "A Guide to Standard and High-Definition Digital Video Measurements", 2009 (112 pages).
IETF RFC 3640, "RTP Payload Format for Transport of MPEG-4 Elementary Streams", Nov. 2003 (43 pages).

(56) References Cited

OTHER PUBLICATIONS

White paper entitled: "Understanding MPEG-4: Technologies, Advantages, and Markets—An MPEGIF White Paper", published 2005 by The MPEG Industry Forum (Document No. mp-in-40182) (51 pages).
Gary J. Sullivan of Microsoft Corporation, "The H.264/MPEG4 Advanced Video Coding Standard and its Applications", Standards Report published in IEEE Communications Magazine, Aug. 2006 (10 pages).
IETF RFC 3984, "RTP Payload Format for H.264 Video", Feb. 2005 (83 pages).
Publication entitled: "An introduction to video content analysis—industry guide" published Aug. 2016 as Form No. 262 Issue 2 by British Security Industry Association (BSIA) (13 pages).
Paper entitled: "Overview of Existing Content Based Video Retrieval Systems" by Shripad A. Bhat, Omkar V. Sardessai, Preetesh P. Kunde and Sarvesh S. Shirodkar of the Department of Electronics and Telecommunication Engineering, Goa College of Engineering, Farmagudi Ponda Goa, published Feb. 2014 (8 pages).
Tinku Acharya and Ajoy K. Ray entitled: "Image Processing—Principles and Applications", published by Wiley-Interscience [ISBN: 13-978-0-471-71998-4] (2005) (451 pages).
John G. Proakis and Dimitris G. Manolakis, "Third Edition—Digital Signal Processing—Principles, Algorithms, and Application", published 1996 by Prentice-Hall Inc. [ISBN 0-13-394338-9] (1033 pages).
David Kriesel entitled: "A Brief Introduction to Neural Networks" (ZETA2-EN) [downloaded May 2015 from www.dkriesel.com] (244 pages).
Simon Haykin entitled: "Neural Networks and Learning Machines—Third Edition", published 2009 by Pearson Education, Inc. [ISBN—978-0-13-147139-9] (937 pages).
Juan A. Ramirez-Quintana, Mario I. Cacon-Murguia, and F. Chacon-Hinojos entitled: "Artificial Neural Image Processing Applications: A Survey", Engineering Letters, 20:1, EL_20_1_09 (Advance online publication: Feb. 27, 2012) (27 pages).
M. Egmont-Petersen, D. de Ridder, and H. Handels, "Image processing with neural networks—a review", by Pattern Recognition Society in Pattern Recognition 35 (2002) 2279-2301 (23 pages).
Christian Szegedy, Alexander Toshev, and Dumitru Erhan, "Deep Neural Networks for Object Detection", of Google, Inc. (downloaded Jul. 2015) (9 pages).
Dumitru Erhan, Christian Szegedy, Alexander Toshev, and Dragomir Anguelov (of Google, Inc., Mountain-View, California, U.S.A.), "Scalable Object Detection using Deep Neural Networks", a CVPR2014 paper provided by the Computer Vision Foundation (downloaded Jul. 2015) (8 pages).
Shawn McCann and Jim Reesman (both of Stanford University), "Object Detection using Convolutional Neural Networks" (downloaded Jul. 2015) (5 pages).
Mehdi Ebady Manaa, Nawfal Turki Obies, and Dr. Tawfiq A. Al-Assadi (of Department of Computer Science, Babylon University), "Object Classification using neural networks with Gray-level Co-occurrence Matrices (GLCM)", (downloaded Jul. 2015) (9 pages).
Dan C. Ciresan et al., "High-Performance Neural Networks for Visual Object Classification", a technical report No. IDSIA-01-11 Jan. 2011 published by IDSIA/USI-SUPSI (12 pages).
Yuhua Zheng et al. "Object Recognition using Neural Networks with Bottom-Up and top-Down Pathways" (downloaded Jul. 2015) (13 pages).
Karen Simonyan, Andrea Vedaldi, and Andrew Zisserman (all of Visual Geometry Group, University of Oxford), "Deep Inside Convolutional Networks: Visualising Image Classification Models and Saliency Maps" Apr. 19, 2014, (8 pages).
User's Guide Version 4 by Howard Demuth and Mark Beal, "Neural Network ToolBox—For Use with MATLAB®", MathWorks, Inc. (Headquartered in Natick, MA, U.S.A.) published Jul. 2002 (840 pages).

A book entitled: "Introduction to Deep Learning From Logical Calculus to Artificial Intelligence" by Sandro Skansi [ISSN 1863-7310 ISSN 2197-1781, ISBN 978-3-319-73003-5], published 2018 by Springer International Publishing AG (196 pages).
Weibo Liua, Zidong Wanga, Xiaohui Liua, Nianyin Zengb, Yurong Liuc, and Fuad E. Alsaadid, "A Survey of Deep Neural Network Architectures and Their Applications", published Dec. 2016 [DOI: 10.1016/j.neucom.2016.12.038] (31 pages).
Dilip K. Prasad, "Survey of The Problem of Object Detection In Real Images" published International Journal of Image Processing (IJIP), vol. 6, Issue 6—2012 (26 pages).
A. Ashbrook and N. A. Thacker, "Tutorial: Algorithms For 2-dimensional Object Recognition", published by the Imaging Science and Biomedical Engineering Division of the University of Manchester, Tina Memo No. 1996-003, Jan. 12, 1998 (15 pages).
Computer Vision: Mar. 2000 Chapter 4 entitled: "Pattern Recognition Concepts" (38 pages).
Isabelle Guyon, et al., "Hands-On Pattern Recognition—Challenges in Machine Learning, vol. 1", published by Microtome Publishing, 2011 (ISBN-13:978-0-9719777-1-6) (482 pages).
Paul Viola and Michael Jones, "Robust Real-Time Face Detection", International Journal of Computer Vision 2004 pp. 137-154 (18 pages).
Paul Viola and Michael Jones, "Rapid Object Detection using a Boosted Cascade of Simple Features", Accepted Conference on Computer Vision and Pattern Recognition 2001 (9 pages).
Technical report No. RL-TR-94-150 by Rome Laboratory, Air force Material Command, Griffiss Air Force Base, New York, entitled: "Neural Network Communications Signal Processing", published Aug. 1994 (128 pages).
Image-net.org/download-API, 2014 Stanford Vision Lab (3 pages).
Fei-Fei Li and Olga Russakovsky (ICCV 2013), "Analysis of large Scale Visual Recognition", (60 pages).
ImageNet presentation by Fei-Fei Li (of Computer Science Dept., Stanford University), "Crowdsourcing, benchmarking, & other cool things", 2010 Stanford Vision Lab (64 pages).
Alex Krizhevsky, Ilya Sutskever, and Geoffrey E. Hinton (all of University of Toronto), "ImageNet Classification with Deep Convolutional Neural Networks", May 18, 2015 (35 pages).
Joseph Redmon, Santosh Divvala, Ross Girshick, and Ali Farhadi, "You Only Look Once: Unified, Real-Time Object Detection", published May 9, 2016 (10 pages).
Juan Du of New Research and Development Center of Hisense, Qingdao 266071, China, "Understanding of Object Detection Based on CNN Family and YOLO", published 2018 in IOP Conf. Series: Journal of Physics: Conf. Series 1004 (2018) 012029 [doi :10.1088/1742-6596/1004/1/012029] (9 pages).
Joseph Redmon and Ali Farhadi, "YOLO9000: Better, Faster, Stronger", published 2016 (9 pages).
Duy Thanh Nguyen, Tuan Nghia Nguyen, Hyun Kim, and Hyuk-Jae Lee, "A High-Throughput and Power-Efficient FPGA Implementation of YOLO CNN for Object Detection", published Aug. 2019 [DOI: 10.1109/TVLSI.2019.2905242] in IEEE Transactions on Very Large Scale Integration (VLSI) Systems 27(8) (13 pages).
Ross Girshick, Jeff Donahue, Trevor Darrell, and Jitendra Malik, "Rich feature hierarchies for accurate object detection and semantic segmentation", published 2014 In Proc. IEEE Conf. on computer vision and pattern recognition (CVPR), pp. 580-587 (8 pages).
Ross Girshick of Microsoft Research, "Fast R-CNN", published Sep. 27, 2015 [arXiv:1504.08083v2 [cs. CV]] In Proc. IEEE Intl. Conf. on computer vision, pp. 1440-1448. 2015 (9 pages).
Shaoqing Ren, Kaiming He, Ross Girshick, and Jian Sun, "Faster R-CNN: Towards Real-Time Object Detection with Region Proposal networks", published 2015 (9 pages).
Tsung-Yi Lin, Priya Goyal, Ross Girshick, Kaiming He, and Piotr Dollar, "Focal Loss for Dense Object Detection", published Feb. 7, 2018 in IEEE Transactions on Pattern Analysis and Machine Intelligence. 42 (2): 318-327 [doi: 10.1109/TPAMI.2018.2858826; arXiv: 1708.02002v2 [cs.CV]] (10 pages).
Tsung-Yi Lin, Piotr Dollár, Ross Girshick, Kaiming He, Bharath Hariharan, and Serge Belongie, "Feature Pyramid Networks for Object Detection", published Apr. 19, 2017 [arXiv:1612.03144v2 [cs.CV]] (10 pages).

(56) References Cited

OTHER PUBLICATIONS

Mxing Li and Fengbo Ren, "Light-Weight RetinaNet for Object Detection", published May 24, 2019 [arXiv: 1905.10011v1 [cs.CV]] (10 pages).
Jie Zhou, Ganqu Cui, Shengding Hu, Zhengyan Zhang, Cheng Yang, Zhiyuan Liu, Lifeng Wang, Changcheng Li, and Maosong Sun, "Graph neural networks: A review of methods and applications", published at AI Open 2021 [arXiv:1812.08434 [cs.LG]] (25 pages).
Isaac Ronald Ward, Jack Joyner, Casey Lickfold, Stash Rowe, Yulan Guo, and Mohammed Bennamoun, "A Practical Guide to Graph Neural Networks", published 2020 [arXiv:2010.05234 [cs.LG]] (28 pages).
Rex Ying, Yuanfang Li, and Xin Li of Stanford University, "GraphNet: Recommendation system based on language and network structure", published 2017 by Stanford University (9 pages).
Anton Tsitsulin, John Palowitch, Bryan Perozzi, and Emmanuel Müller, "Graph Clustering with Graph Neural Networks", published Jun. 30, 2020 [arXiv:2006.16904v1 [cs.LG]] (13 pages).
Andrew G. Howard, Menglong Zhu, Bo Chen, Dmitry Kalenichenko, Weijun Wang, Tobias Weyand, Marco Andreetto, and Hartwig Adam of Google Inc., "MobileNets: Efficient Convolutional Neural Networks for Mobile Vision Applications", published Apr. 17, 2017 [arXiv:1704.04861v1 [cs. CV]] (9 pages).
Mark Sandler, Andrew Howard, Menglong Zhu, Andrey Zhmoginov, and Liang-Chieh Chen of Google Inc., "MobileNetV2: Inverted Residuals and Linear Bottlenecks", published Mar. 21, 2019 [arXiv:1801.04381v4 [cs.CV]] (14 pages).
Andrew Howard, Mark Sandler, Grace Chu, Liang-Chieh Chen, Bo Chen, Mingxing Tan, Weijun Wang, Yukun Zhu, Ruoming Pang, Vijay Vasudevan, Quoc V. Le, and Hartwig Adam, "Searching for MobileNetV3", published 2019 [arXiv:1905.02244 [cs.CV]] (11 pages).
Jonathan Long, Evan Shelhamer, and Trevor Darrell, "Fully Convolutional Networks for Semantic Segmentation", published Apr. 1, 2017 in IEEE Transactions on Pattern Analysis and Machine Intelligence ( vol. 39, Issue: 4) [DOI: 10.1109/TPAMI.2016.2572683] (10 pages).
Hongyang Gao and Shuiwang Ji, "Graph U-Nets", published 2019 [arXiv:1905.05178 [cs.LG]] (10 pages).
Olaf Ronneberger, Philipp Fischer, and Thomas Brox, "U-Net: Convolutional Networks for Biomedical Image Segmentation", published May 18, 2015 in Medical Image Computing and Computer-Assisted Intervention (MICCAI), Springer, LNCS, vol. 9351: 234-241 [arXiv:1505.04597v1 [cs.CV]] (8 pages).
Simonyan and Zisserman from Visual Geometry Group (VGG) at University of Oxford, "Very Deep Convolutional Networks for Large-Scale Image Recognition", published 2015 [arXiv:1409.1556 [cs.CV]] as a conference paper at ICLR 2015 (14 pages).
"VGG16—Convolutional Network for Classification and Detection", published Nov. 20, 2018 in 'Popular networks' (27 pages).
David G. Lowe of the Keypoints Computer Science Department University of British Columbia Vancouver, B.C., Canada, entitled: "Distinctive Image Features from Scale-Invariant", published Jan. 5, 2004 [International Journal of Computer Vision, 2004] (28 pages).
Tony Lindeberg entitled: "Scale Invariant Feature Transform", published May 2012 [DOI: 10.4249/scholarpedia.10491] (18 pages).
Herbert Bay, Andreas Ess, Tinne Tuytelaars, and Luc Van Gool, all of ETH Zurich, entitled: "SURF: Speeded Up Robust Features", presented at the ECCV 2006 conference and published 2008 at Computer Vision and Image Understanding (CVIU), vol. 110, No. 3, pp. 346-359, 2008 (14 pages).
Edward Rosten and Tom Drummond of the Department of Engineering, Cambridge University, UK, "Machine Learning for High-speed Corner Detection", published 2006 in Computer Vision—ECCV 2006 [Lecture Notes in Computer Science. vol. 3951. pp. 430-443. doi:10.1007/11744023_34; ISBN 978-3-540-33832-1. S2CID 1388140] (14 pages).

Article published in IEEE Transactions on Pattern Analysis and Machine Intelligence (vol. 32, Issue: 1, Jan. 2010) [DOI: 10.1109/TPAMI.2008.275] entitled: "FASTER and better: A Machine Learning Approach to Corner Detection" (36 pages).
DocID022930 Rev. 6 dated Apr. 2015 entitled: "SPBT2632C1A—Bluetooth® technology class-1 module" (27 pages).
Chapter 20: "Wireless Technologies" of the publication No. 1-587005-001-3 by Cisco Systems, Inc. (7/99) "Internetworking Technologies Handbook" (42 pages).
IPhone 6 technical specification (retrieved Oct. 2015 from www.apple.com/iphone-6/specs/) (32 pages).
User Guide, "iPhone User Guide For iOS 8.4 Software", dated 2015 (019-00155/2015-06) by Apple Inc. (196 pages).
User manual numbered English (EU), "SM-G925F SM-G925FQ SM-G925I User Manual" Mar. 2015 (Rev. 1.0) (145 pages).
Galaxy S6 Edge—Technical Specification (retrieved Oct. 2015 from www.samsung.com/us/explore/galaxy-s-6-features-and-specs) (1 page).
"Android Tutorial", downloaded from tutorialspoint.com on Jul. 2014 (216 pages).
"IOS Tutorial", downloaded from tutorialspoint.com on Jul. 2014 (185 pages).
Muhammad Ayoub Kamal, Hafiz Wahab Raza, Muhammad Mansoor Alam, and Mazliham Mohd Su'ud, "Highlight the Features of AWS, GCP and Microsoft Azure that Have an Impact when Choosing a Cloud Service Provider", 'International Journal of Recent Technology and Engineering (IJRTE)' ISSN: 2277-3878, vol. 8, Jan. 2020 (10 pages).
Dac-Nhuong Le et al., "Cloud Computing and Virtualization", published 2018 by John Wiley & Sons, Inc. [ISBN 978-1-119-48790-6] (223 pages).
EBook authored by Gustavo Alessandro Andrade Santana, "Data Center Virtualization Fundamentals", published 2014 by Cisco Systems, Inc. (Cisco Press) [ISBN-13: 978-1-58714-324-3] (1406 pages).
IBM RedBook entitled: "IBM PowerVM Virtualization—Introduction and Configuration" published by IBM Corporation Jun. 2013 (790 pages).
IBM Corporation, "Power Systems—Introduction to virtualization", published 2009 (54 pages).
Microsoft publication entitled: "Inside-Out Windows Server 2012", by William R. Stanek, published 2013 by Microsoft Press (800 pages).
"UNIX Tutorial" by tutorialspoint.com, downloaded on Jul. 2014 (152 pages).
"Windows Internals—Part 1" by Mark Russinovich, David A. Solomon, and Alex Ioescu, published by Microsoft Press in 2012 (752 pages).
"Windows Internals—Part 2", by Mark Russinovich, David A. Solomon, and Alex Ioescu, published by Microsoft Press in 2012 (672 pages).
Jerry Honeycutt, "Introducing Windows 8—An Overview for IT Professionals" Microsoft Press 2012 (168 pages).
Samsung Electronics Co., Ltd. presentation entitled: "Google™ Chrome OS User Guide" published 2011 (41 pages).
Application Note No. RES05B00008-0100/Rec. 1.00 by Renesas Technology Corp. entitled: "R8C Family—General RTOS Concepts", published Jan. 2010 (20 pages).
Walter Cedeno et al, "An Overview of Real-Time Operating Systems", The Association for Laboratory Automation, Feb. 2007 (6 pages).
Chapter 2 entitled: "Basic Concepts of Real Time Operating Systems" of a book entitled: "Hardware-Dependent Software—Principles and Practice", published 2009 [ISBN—978-1-4020-9435-4] by Springer Science + Business Media B.V. (304 pages).
Nicolas Melot, "Study of an operating system: FreeRTOS—Operating systems for embedded devices", (downloaded Jul. 2015) (39 pages).
Dr. Richard Wall entitled: "Carebot PIC32 MX7ck implementation of Free RTOS", (dated Sep. 23, 2013) (18 pages).
"FreeRTOS™ Modules" published in the www,freertos.org website dated Nov. 26, 2006 (112 pages).

(56) References Cited

OTHER PUBLICATIONS

Rich Goyette of Carleton University as part of 'SYSC5701: Operating System Methods for Real-Time Applications', entitled: "An Analysis and Description of the Inner Workings of the FreeRTOS Kernel", published Apr. 1, 2007 (46 pages).

Ashish Vaswani; Noam Shazeer; Niki Parmar; Jakob Uszkoreit; Llion Jones; Aidan N. Gomez; Lukasz Kaiser; and Illia Polosukhin, "Attention Is All You Need", dated Jun. 12, 2017 (arXiv:1706.03762 [cs.CL]; https://doi.org/10.48550/arXiv.1706.0376) (15 pages).

Alexey Dosovitskiy et al., "An Image is Worth 16x16 Words: Transformers for Image Recognition at Scale", dated Oct. 22, 2020 (arXiv:2010.11929 [cs.CV]; https://doi.org/10.48550/arXiv.2010.11929) (22 pages).

Mathilde Caron; Hugo Touvron; Ishan Misra; Hervé Jégou; Julien Mairal; Piotr Bojanowski; and Armand Joulin, "Emerging Properties in Self-Supervised Vision Transformers", dated Apr. 29, 2021 (arXiv:2104.14294 [cs.CV]) (21 pages).

International Search Report of PCT/IL2022/051346 dated Aug. 17, 2023.

Written Opinion of PCT/IL2022/051346 dated Aug. 17, 2023.

Park, S. et al., "Neural Crossbreed: Neutral Based Image Metamorphosis", ACM Transactions on Graphics, Publication (online) Sep. 2, 2020 (16 pages).

\* cited by examiner

METHOD AND SYSTEM FOR SEMANTIC APPEARANCE TRANSFER USING SPLICING ViT FEATURES

RELATED APPLICATION

The present application is a National Phase of International Application PCT/IL2022/051346, with an international filing date of Dec. 18, 2022, which claims priority from U.S. Provisional Application Ser. No. 63/293,842, which was filed on Dec. 27, 2021 and entitled: "Splicing ViT Features for Semantic Appearance Transfer", which are hereby incorporated herein by reference in their entirety.

TECHNICAL FIELD

This disclosure generally relates to an apparatus and method for semantically transferring the visual appearance of one natural image to another, and in particular to generate an image in which objects in a source structure image are "painted" with the visual appearance of their semantically related objects in a target appearance image, such as by using a pre-trained and fixed Vision Transformer (ViT) model.

BACKGROUND

Unless otherwise indicated herein, the materials described in this section are not prior art to the claims in this application and are not admitted to be prior art by inclusion in this section.

Digital photography is described in an article by Robert Berdan (downloaded from 'canadianphotographer.com' preceded by 'www.') entitled: "*Digital Photography Basics for Beginners*", and in a guide published on April 2004 by Que Publishing (ISBN: 0-7897-3120-7) entitled: "*Absolute Beginner's Guide to Digital Photography*" authored by Joseph Ciaglia et al., which are both incorporated in their entirety for all purposes as if fully set forth herein.

A digital camera 10 shown in FIG. 1 may be a digital still camera that converts captured image into an electric signal upon a specific control or can be a video camera, wherein the conversion between captured images to the electronic signal is continuous (e.g., 24 frames per second). The camera 10 is preferably a digital camera, wherein the video or still images are converted using an electronic image sensor 12. The digital camera 10 includes a lens 11 (or a few lenses) for focusing the received light centered around an optical axis 8 (referred to herein as a line-of-sight) onto the small semiconductor image sensor 12. The optical axis 8 is an imaginary line along which there is some degree of rotational symmetry in the optical system, and typically passes through the center of curvature of the lens 11 and commonly coincides with the axis of the rotational symmetry of the sensor 12. The image sensor 12 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as light-sensitive diodes. Linear or area arrays of light-sensitive elements may be used, and the light-sensitive sensors may support monochrome (black & white), color, or both. For example, the CCD sensor KAI-2093 Image Sensor 1920 (H)×1080 (V) Interline CCD Image Sensor or KAI-50100 Image Sensor 8176 (H)×6132 (V) Full-Frame CCD Image Sensor can be used, available from the Image Sensor Solutions, Eastman Kodak Company, Rochester, New York.

An image processor block 13 receives the analog signal from the image sensor 12. The Analog Front End (AFE) in the block 13 filters, amplifies, and digitizes the signal, using an analog-to-digital (A/D) converter. The AFE further provides Correlated Double Sampling (CDS) and provides a gain control to accommodate varying illumination conditions. In the case of a CCD-based sensor 12, a CCD AFE (Analog Front End) component may be used between the digital image processor 13 and the sensor 12. Such an AFE may be based on VSP2560 'CCD Analog Front End for Digital Cameras' available from Texas Instruments Incorporated of Dallas, Texas, U.S.A. The block 13 further contains a digital image processor, which receives the digital data from the AFE, and processes this digital representation of the image to handle various industry standards, and executes various computations and algorithms. Preferably, additional image enhancements may be performed by the block 13 such as generating greater pixel density or adjusting color balance, contrast, and luminance. Further, the block 13 may perform other data management functions and processing on the raw digital image data. Commonly, the timing relationship of the vertical/horizontal reference signals and the pixel clock are also handled in this block. Digital Media System-on-Chip device TMS320DM357 available from Texas Instruments Incorporated of Dallas, Texas, U.S.A. is an example of a device implementing in a single chip (and associated circuitry) part or all of the image processor 13, part or all of a video compressor 14 and part or all of a transceiver 15. In addition to a lens or lens system, color filters may be placed between the imaging optics and the photosensor array 12 to achieve desired color manipulation.

The processing block 13 converts the raw data received from the photosensor array 12 (which can be any internal camera format, including before or after Bayer translation) into a color-corrected image in a standard image file format. The camera 10 further comprises a connector 19, and a transmitter or a transceiver 15 is disposed between the connector 19 and the image processor 13. The transceiver 15 may further include isolation magnetic components (e.g., transformer-based), balancing, surge protection, and other suitable components required for providing a proper and standard interface via the connector 19. In the case of connecting to a wired medium, the connector 19 further contains protection circuitry for accommodating transients, over-voltage, lightning, and any other protection means for reducing or eliminating the damage from an unwanted signal over the wired medium. A band-pass filter may also be used for passing only the required communication signals, and for rejecting or stopping other signals in the described path. A transformer may be used for isolating and reducing common-mode interferences. Further, a wiring driver and wiring receivers may be used to transmit and receive the appropriate level of signal to and from the wired medium. An equalizer may also be used to compensate for any frequency-dependent characteristics of the wired medium.

Other image processing functions performed by the image processor 13 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast, and/or luminance.

The image processing may further include an algorithm for motion detection by comparing the current image with a reference image and counting the number of different pixels, where the image sensor 12 or the digital camera 10 are assumed to be in a fixed location and thus assumed to capture the same image. Since images naturally differ due to factors such as varying lighting, camera flicker, and CCD dark currents, pre-processing is useful to reduce the number of false positive alarms. More complex algorithms are necessary to detect motion when the camera itself is moving, or when the motion of a specific object must be detected in a field containing another movement that can be ignored. Further, the video or image processing may use, or be based on, the algorithms and techniques disclosed in the book entitled: "*Handbook of Image & Video Processing*", edited by Al Bovik, by Academic Press, ISBN: 0-12-119790-5, which is incorporated in its entirety for all purposes as if fully set forth herein.

A controller 18, located within the camera device or module 10, may be based on a discrete logic or an integrated device, such as a processor, microprocessor, or microcomputer, and may include a general-purpose device or may be a special purpose processing device, such as an ASIC, PAL, PLA, PLD, Field Programmable Gate Array (FPGA), Gate Array, or any other customized or programmable device. In the case of a programmable device as well as in other implementations, a memory is required. The controller 18 commonly includes a memory that may include a static RAM (random Access Memory), dynamic RAM, flash memory, ROM (Read Only Memory), or any other data storage medium. The memory may include data, programs, and/or instructions, and any other software or firmware executable by the processor. Control logic can be implemented in hardware or software, such as firmware stored in the memory. The controller 18 controls and monitors the device's operation, such as initialization, configuration, interface, and commands.

The digital camera device or module 10 requires power for its described functions, such as for capturing, storing, manipulating, or transmitting the image. A dedicated power source may be used such as a battery or a dedicated connection to an external power source via connector 19. The power supply may contain a DC/DC converter. In another embodiment, the power supply is power fed from the AC power supply via an AC plug and a cord and thus may include an AC/DC converter, for converting the AC power (commonly 115 VAC/60 Hz or 220 VAC/50 Hz) into the required DC voltage or voltages. Such power supplies are known in the art and typically involve converting 120 or 240 volt AC supplied by a power utility company to a well-regulated lower voltage DC for electronic devices. In one embodiment, the power supply is typically integrated into a single device or circuit for sharing common circuits. Further, the power supply may include a boost converter, such as a buck-boost converter, charge pump, inverter, and regulators as known in the art, as required for conversion of one form of electrical power to another desired form and voltage. While the power supply (either separated or integrated) can be an integral part and housed within the camera 10 enclosure, it may be enclosed as a separate housing connected via cable to the camera 10 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, to allow its transmission over a reduced bandwidth transmission system. The video compressor 14 (or video encoder) shown in FIG. 1 is disposed between the image processor 13 and the transceiver 15, allowing for compression of the digital video signal before its transmission over a cable or over-the-air. In some cases, compression may not be required, hence obviating the need for the compressor 14. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between parts of a single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 11 is positioned to collect optical energy representative of a subject or scenery, and to focus the optical energy onto the photosensor array 12. Commonly, the photosensor array 12 is a matrix of photosensitive pixels, which generates an electric signal that is representative of the optical energy directed at the pixel by the imaging optics. The captured image (still images or part of video data) may be stored in a memory 17, which may be volatile or non-volatile memory, and may be a built-in or removable media. Many stand-alone cameras use SD format, while a few use CompactFlash or other types. An LCD or TFT miniature display 16 typically serves as an Electronic ViewFinder (EVF) where the image captured by the lens is electronically displayed. The image on this display is used to assist in aiming the camera at the scene to be photographed. The sensor records the view through the lens; the view is then processed, and finally projected on a miniature display, which is viewable through the eyepiece. Electronic viewfinders are used in digital still cameras and in video cameras. Electronic viewfinders can show additional information, such as an image histogram, focal ratio, camera settings, battery charge, and remaining storage space. The display 16 may further display images captured earlier that are stored in the memory 17.

A digital camera is described in U.S. Pat. No. 6,897,891 to Itsukaichi entitled: "*Computer System Using a Camera That is Capable of Inputting Moving Picture or Still Picture Data*", in U.S. Patent Application Publication No. 2007/0195167 to Ishiyama entitled: "*Image Distribution System, Image Distribution Server, and Image Distribution Method*", in U.S. Patent Application Publication No. 2009/0102940 to Uchida entitled: "*Imaging Device and imaging Control Method*", and in U.S. Pat. No. 5,798,791 to Katayama et al. entitled: "*Multieye Imaging Apparatus*", which are all incorporated in their entirety for all purposes as if fully set forth herein.

A digital camera capable of being set to implement the function of a card reader or camera is disclosed in U.S.

Patent Application Publication 2002/0101515 to Yoshida et al. entitled: "*Digital camera and Method of Controlling Operation of Same*", which is incorporated in its entirety for all purposes as if fully set forth herein. When the digital camera capable of being set to implement the function of a card reader or camera is connected to a computer via a USB, the computer is notified of the function to which the camera has been set. When the computer and the digital camera are connected by the USB, a device request is transmitted from the computer to the digital camera. Upon receiving the device request, the digital camera determines whether its operation at the time of the USB connection is that of a card reader or PC camera. Information indicating the result of the determination is incorporated in a device descriptor, which the digital camera then transmits to the computer. Based on the device descriptor, the computer detects the type of operation to which the digital camera has been set. The driver that supports this operation is loaded and the relevant commands are transmitted from the computer to the digital camera.

A prior art example of a portable electronic camera connectable to a computer is disclosed in U.S. Pat. No. 5,402,170 to Parulski et al. entitled: "*Hand-Manipulated Electronic Camera Tethered to a Personal Computer*", a digital electronic camera that accepts various types of input/output cards or memory cards is disclosed in U.S. Pat. No. 7,432,952 to Fukuoka entitled: "*Digital Image Capturing Device having an Interface for Receiving a Control Program*", and the use of a disk drive assembly for transferring images out of an electronic camera is disclosed in U.S. Pat. No. 5,138,459 to Roberts et al., entitled: "*Electronic Still Video Camera with Direct Personal Computer (PC) Compatible Digital Format Output*", which are all incorporated in their entirety for all purposes as if fully set forth herein. A camera with human face detection means is disclosed in U.S. Pat. No. 6,940,545 to Ray et al., entitled: "*Face Detecting Camera and Method*", and in U.S. Patent Application Publication No. 2012/0249768 to Binder entitled: "*System and Method for Control Based on Face or Hand Gesture Detection*", which are both incorporated in their entirety for all purposes as if fully set forth herein. A digital still camera is described in an Application Note No. AN1928/D (Revision 0-20 Feb. 2001) by Freescale Semiconductor, Inc. entitled: "*Roadrunner—Modular digital still camera reference design*", which is incorporated in its entirety for all purposes as if fully set forth herein.

An imaging method is disclosed in U.S. Pat. No. 8,773,509 to Pan entitled: "*Imaging Device, Imaging Method and Recording Medium for Adjusting Imaging Conditions of Optical Systems Based on Viewpoint Images*", which is incorporated in its entirety for all purposes as if fully set forth herein. The method includes: calculating an amount of parallax between a reference optical system and an adjustment target optical system; setting coordinates of an imaging condition evaluation region corresponding to the first viewpoint image outputted by the reference optical system; calculating coordinates of an imaging condition evaluation region corresponding to the second viewpoint image outputted by the adjustment target optical system, based on the set coordinates of the imaging condition evaluation region corresponding to the first viewpoint image, and on the calculated amount of parallax; and adjusting imaging conditions of the reference optical system and the adjustment target optical system, based on image data in the imaging condition evaluation region corresponding to the first viewpoint image, at the set coordinates, and on image data in the imaging condition evaluation region corresponding to the second viewpoint image, at the calculated coordinates, and outputting the viewpoint images in the adjusted imaging conditions.

A portable hand-holdable digital camera is described in Patent Cooperation Treaty (PCT) International Publication Number WO 2012/013914 by Adam LOMAS entitled: "*Portable Hand-Holdable Digital Camera with Range Finder*", which is incorporated in its entirety for all purposes as if fully set forth herein. The digital camera comprises a camera housing having a display, a power button, a shoot button, a flash unit, and a battery compartment; capture means for capturing an image of an object in two-dimensional form and for outputting the captured two-dimensional image to the display; first range finder means including a zoomable lens unit supported by the housing for focusing on an object and calculation means for calculating a first distance of the object from the lens unit and thus a distance between points on the captured two-dimensional image viewed and selected on the display; and second range finder means including an emitted-beam range finder on the housing for separately calculating a second distance of the object from the emitted-beam range finder and for outputting the second distance to the calculation means of the first range finder means for combination therewith to improve distance determination accuracy.

Thermal camera. Thermal imaging is a method of improving visibility of objects in a dark environment by detecting the objects infrared radiation and creating an image based on that information. Thermal imaging, near-infrared illumination, and low-light imaging are the three most commonly used night vision technologies. Unlike the other two methods, thermal imaging works in environments without any ambient light. Like near-infrared illumination, thermal imaging can penetrate obscurants such as smoke, fog and haze. All objects emit infrared energy (heat) as a function of their temperature, and the infrared energy emitted by an object is known as its heat signature. In general, the hotter an object is, the more radiation it emits. A thermal imager (also known as a thermal camera) is essentially a heat sensor that is capable of detecting tiny differences in temperature. The device collects the infrared radiation from objects in the scene and creates an electronic image based on information about the temperature differences. Because objects are rarely precisely the same temperature as other objects around them, a thermal camera can detect them and they will appear as distinct in a thermal image.

A thermal camera, also known as thermographic camera, is a device that forms a heat zone image using infrared radiation, similar to a common camera that forms an image using visible light. Instead of the 400-700 nanometer range of the visible light camera, infrared cameras operate in wavelengths as long as 14,000 nm (14 μm). A major difference from optical cameras is that the focusing lenses cannot be made of glass, as glass blocks long-wave infrared light. Typically, the spectral range of thermal radiation is from 7 to 14 mkm. Special materials such as Germanium, calcium fluoride, crystalline silicon or newly developed special type of Chalcogenide glass must be used. Except for calcium fluoride all these materials are quite hard but have high refractive index (n=4 for germanium) which leads to very high Fresnel reflection from uncoated surfaces (up to more than 30%). For this reason, most of the lenses for thermal cameras have antireflective coatings.

LIDAR. Light Detection And Ranging—LIDAR—also known as Lidar, LiDAR or LADAR (sometimes Light Imaging, Detection, And Ranging), is a surveying technology that measures distance by illuminating a target with a laser light. Lidar is popularly used as a technology to make high-resolution maps, with applications in geodesy, geomatics, archaeology, geography, geology, geomorphology, seismology, forestry, atmospheric physics, Airborne Laser Swath Mapping (ALSM) and laser altimetry, as well as laser scanning or 3D scanning, with terrestrial, airborne and mobile applications. Lidar typically uses ultraviolet, visible, or near infrared light to image objects. It can target a wide range of materials, including non-metallic objects, rocks, rain, chemical compounds, aerosols, clouds and even single molecules. A narrow laser-beam can map physical features with very high resolutions; for example, an aircraft can map terrain at 30 cm resolution or better. Wavelengths vary to suit the target: from about 10 micrometers to the UV (approximately 250 nm). Typically light is reflected via backscattering. Different types of scattering are used for different LIDAR applications: most commonly Rayleigh scattering, Mie scattering, Raman scattering, and fluorescence. Based on different kinds of backscattering, the LIDAR can be accordingly referred to as Rayleigh Lidar, Mie Lidar, Raman Lidar, Na/Fe/K Fluorescence Lidar, and so on. Suitable combinations of wavelengths can allow for remote mapping of atmospheric contents by identifying wavelength-dependent changes in the intensity of the returned signal. Lidar has a wide range of applications, which can be divided into airborne and terrestrial types. These different types of applications require scanners with varying specifications based on the data's purpose, the size of the area to be captured, the range of measurement desired, the cost of equipment, and more.

Airborne LIDAR (also airborne laser scanning) is when a laser scanner, while attached to a plane during flight, creates a 3D point cloud model of the landscape. This is currently the most detailed and accurate method of creating digital elevation models, replacing photogrammetry. One major advantage in comparison with photogrammetry is the ability to filter out vegetation from the point cloud model to create a digital surface model where areas covered by vegetation can be visualized, including rivers, paths, cultural heritage sites, etc. Within the category of airborne LIDAR, there is sometimes a distinction made between high-altitude and low-altitude applications, but the main difference is a reduction in both accuracy and point density of data acquired at higher altitudes. Airborne LIDAR may also be used to create bathymetric models in shallow water. Drones are being used with laser scanners, as well as other remote sensors, as a more economical method to scan smaller areas. The possibility of drone remote sensing also eliminates any danger that crews of a manned aircraft may be subjected to in difficult terrain or remote areas. Airborne LIDAR sensors are used by companies in the remote sensing field. They can be used to create a DTM (Digital Terrain Model) or DEM (Digital Elevation Model); this is quite a common practice for larger areas as a plane can acquire 3-4 km wide swaths in a single flyover. Greater vertical accuracy of below 50 mm may be achieved with a lower flyover, even in forests, where it is able to give the height of the canopy as well as the ground elevation. Typically, a GNSS receiver configured over a georeferenced control point is needed to link the data in with the WGS (World Geodetic System).

Terrestrial applications of LIDAR (also terrestrial laser scanning) happen on the Earth's surface and may be stationary or mobile. Stationary terrestrial scanning is most common as a survey method, for example in conventional topography, monitoring, cultural heritage documentation and forensics. The 3D point clouds acquired from these types of scanners can be matched with digital images taken of the scanned area from the scanner's location to create realistic looking 3D models in a relatively short time when compared to other technologies. Each point in the point cloud is given the color of the pixel from the image taken located at the same angle as the laser beam that created the point.

Mobile LIDAR (also mobile laser scanning) is when two or more scanners are attached to a moving vehicle to collect data along a path. These scanners are almost always paired with other kinds of equipment, including GNSS receivers and IMUs. One example application is surveying streets, where power lines, exact bridge heights, bordering trees, etc. all need to be taken into account. Instead of collecting each of these measurements individually in the field with a tachymeter, a 3D model from a point cloud can be created where all of the measurements needed can be made, depending on the quality of the data collected. This eliminates the problem of forgetting to take a measurement, so long as the model is available, reliable and has an appropriate level of accuracy.

Autonomous vehicles use LIDAR for obstacle detection and avoidance to navigate safely through environments. Cost map or point cloud outputs from the LIDAR sensor provide the necessary data for robot software to determine where potential obstacles exist in the environment and where the robot is in relation to those potential obstacles. LIDAR sensors are commonly used in robotics or vehicle automation. The very first generations of automotive adaptive cruise control systems used only LIDAR sensors.

LIDAR technology is being used in robotics for the perception of the environment as well as object classification. The ability of LIDAR technology to provide three-dimensional elevation maps of the terrain, high precision distance to the ground, and approach velocity can enable safe landing of robotic and manned vehicles with a high degree of precision. LiDAR has been used in the railroad industry to generate asset health reports for asset management and by departments of transportation to assess their road conditions. LIDAR is used in Adaptive Cruise Control (ACC) systems for automobiles. Systems use a LIDAR device mounted on the front of the vehicle, such as the bumper, to monitor the distance between the vehicle and any vehicle in front of it. In the event the vehicle in front slows down or is too close, the ACC applies the brakes to slow the vehicle. When the road ahead is clear, the ACC allows the vehicle to accelerate to a speed preset by the driver. Any apparatus herein, which may be any of the systems, devices, modules, or functionalities described herein, may be integrated with, or used for, Light Detection And Ranging (LIDAR), such as airborne, terrestrial, automotive, or mobile LIDAR.

SAR. Synthetic-Aperture Radar (SAR) is a form of radar that is used to create two-dimensional images or three-dimensional reconstructions of objects, such as landscapes, by using the motion of the radar antenna over a target region to provide finer spatial resolution than conventional stationary beam-scanning radars. SAR is typically mounted on a moving platform, such as an aircraft or spacecraft, and has its origins in an advanced form of Side Looking Airborne Radar (SLAR). The distance the SAR device travels over a target during the period when the target scene is illuminated creates the large synthetic antenna aperture (the size of the antenna). Typically, the larger the aperture, the higher the image resolution will be, regardless of whether the aperture is physical (a large antenna) or synthetic (a moving antenna)—this allows SAR to create high-resolution images with comparatively small physical antennas. For a fixed antenna size and orientation, objects which are further away remain illuminated longer—therefore SAR has the property of creating larger synthetic apertures for more distant objects, which results in a consistent spatial resolution over a range of viewing distances. To create a SAR image, successive pulses of radio waves are transmitted to "illuminate" a target scene, and the echo of each pulse is received and recorded. The pulses are transmitted and the echoes received using a single beam-forming antenna, with wavelengths of a meter down to several millimeters. As the SAR device on board the aircraft or spacecraft moves, the antenna location relative to the target changes with time. Signal processing of the successive recorded radar echoes allows the combining of the recordings from these multiple antenna positions. This process forms the synthetic antenna aperture and allows the creation of higher-resolution images than would otherwise be possible with a given physical antenna. SAR is capable of high-resolution remote sensing, independent of flight altitude, and independent of weather, as SAR can select frequencies to avoid weather-caused signal attenuation. SAR has day and night imaging capability as illumination is provided by the SAR. SAR images have wide applications in remote sensing and mapping of surfaces of the Earth and other planets.

A synthetic-aperture radar is an imaging radar mounted on an instant moving platform, where Electromagnetic waves are transmitted sequentially, the echoes are collected, and the system electronics digitizes and stores the data for subsequent processing. As transmission and reception occur at different times, they map to different small positions. The well-ordered combination of the received signals builds a virtual aperture that is much longer than the physical antenna width. That is the source of the term "synthetic aperture," giving it the property of an imaging radar. The range direction is perpendicular to the flight track and perpendicular to the azimuth direction, which is also known as the along-track direction because it is in line with the position of the object within the antenna's field of view. The 3D processing is done in two stages. The azimuth and range direction are focused for the generation of 2D (azimuth-range) high-resolution images, after which a Digital Elevation Model (DEM) is used to measure the phase differences between complex images, which is determined from different look angles to recover the height information. This height information, along with the azimuth-range coordinates provided by 2-D SAR focusing, gives the third dimension, which is the elevation. The first step requires only standard processing algorithms, for the second step, additional pre-processing such as image co-registration and phase calibration is used.

Applied methods for forest monitoring and biomass estimation that has been developed to address pressing needs in the development of operational forest monitoring services are described in a book edited by Africa Ixmucane Flores-Anderson; Kelsey E. Herndon; and Rajesh Bahadur Thapa; Emil Cherrington, published April 2019 [DOI: 10.25966/nr2c-s697] entitled: "*The SAR Handbook: Comprehensive Methodologies for Forest Monitoring and Biomass Estimation Book*", which is incorporated in its entirety for all purposes as if fully set forth herein. Despite the existence of SAR technology with all-weather capability for over 30 years, the applied use of this technology for operational purposes has proven difficult. This handbook seeks to provide understandable, easy-to-assimilate technical material to remote sensing specialists that may not have expertise on SAR but are interested in leveraging SAR technology in the forestry sector. This introductory chapter explains the needs of regional stakeholders that initiated the development of this SAR handbook and the generation of applied training materials. It also explains the primary objectives of this handbook. To generate this applied content on a topic that is usually addressed from a research point of view, the authors followed a unique approach that involved the global SERVIR network. This process ensured that the content covered in this handbook actually addresses the needs of users attempting to apply cutting-edge scientific SAR processing and analysis methods. Intended users of this handbook include, but are not limited to forest and environmental managers and local scientists already working with satellite remote sensing datasets for forest monitoring.

A Synthetic Aperture Radar (SAR) that provides high-resolution, day-and-night and weather-independent images for a multitude of applications ranging from geoscience and climate change research, environmental and Earth system monitoring. 2-D and 3-D mapping, change detection, 4-D mapping (space and time), security-related applications up to planetary exploration, is described in a tutorial by Gerhard Krieger, Irena Hajnsek, and Konstantinos P. Papathanass, published March 2013 in IEEE Geoscience and remote sensing magazine [2168-6831/13/$31.00©2013] entitled: "*A Tutorial on Synthetic Aperture Radar*", which is incorporated in its entirety for all purposes as if fully set forth herein. This paper provides first a tutorial about the SAR principles and theory, followed by an overview of established techniques like polarimetry, interferometry and differential interferometry as well as of emerging techniques (e.g., polarimetric SAR interferometry, tomography and holographic tomography). Several application examples including the associated parameter inversion modeling are provided for each case. The paper also describes innovative technologies and concepts like digital beamforming, Multiple-Input Multiple-Output (MIMO) and bi- and multistatic configurations which are suitable means to fulfill the increasing user requirements. The paper concludes with a vision for SAR remote sensing.

Background information and hands-on processing exercises on the main concepts of Synthetic Aperture Radar (SAR) remote sensing are provides in chapter 2 entitled: "*CHAPTER 2 Spaceborne Synthetic Aperture Radar: Principles, Data Access, and Basic Processing Techniques*" of a book by Franz Meyer, which is incorporated in its entirety for all purposes as if fully set forth herein. After a short introduction on the peculiarities of the SAR image acquisition process, the remainder of this chapter is dedicated to supporting the reader in interpreting the often unfamiliar-looking SAR imagery. It describes how the appearance of a SAR image is influenced by sensor parameters (such as signal polarization and wavelength) as well as environmental factors (such as soil moisture and surface roughness). A comprehensive list of past, current, and planned SAR sensors is included to provide the reader with an overview of available SAR datasets. For each of these sensors, the main imaging properties are described and their most relevant applications listed. An explanation of SAR data types and product levels with their main uses and information on means of data access concludes the narrative part of this chapter and serves as a lead-in to a set of hands-on data processing techniques. These techniques use public domain software tools to walk the reader through some of the most relevant SAR image processing routines, including geocoding and radiometric terrain correction, interferometric SAR processing, and change detection.

Image. As used herein, the term "image" may refer to any 2D or 3D structured data (i.e., a data structure). The image data encoded in an image is structured as an array of pixels, each pixel storing pixel values. The array of pixels may be a 1D, 2D, or 3D array, depending upon the structure and dimensionality of the image. As used herein, the term "map," may refer to an image that is associated with a spatial coordinate system. That is, each pixel of a map is associated with one or more coordinates of the coordinate system, wherein the associated coordinates uniquely indicate a spatial location or position. In some embodiments, the pixel values for a particular pixel of a map may encode the coordinates associated with or corresponding to the particular map pixel.

The term "visual image," may refer to a 2D or 3D image, where the pixel values encode visual features (i.e., visual representations of tangible objects). Such encoded visual features within visual images include but are not limited to edges, surface textures, geometric shapes, colors, hues, lighting effects, and the likes. The visual features and/or visual representations may correspond to the tangible objects in the environment. The visual image data encoding visual images may be generated via various imagers or sensors that detect ElectroMagnetic (EM) waves or photons of various frequencies (or wavelengths). Imaging devices that may generate visual images include, but are not limited to cameras that detect visual wavelengths, InfraRed (IR) cameras, Ultra Violet (UV) cameras, Radio-Frequency (RF) detectors, microwave detectors, and the like. Such imaging devices may include LIght Detection And Ranging (LIDAR) cameras, Time-Of-Flight (TOF) cameras, or other laser-scanning-based cameras. Other imaging devices that generate visual images may include stereoscopic cameras, 3D cameras, and the like.

A digital image is a numeric representation (normally binary) of a two-dimensional image. A pixel (abbreviated px), pel, or picture element is the smallest addressable element in a raster image, or the smallest addressable element in an all-points addressable display device; so it is the smallest controllable element of a picture represented on the screen. Depending on whether the image resolution is fixed, it may be of a vector or raster type. Raster images have a finite set of digital values, called picture elements or pixels. The digital image contains a fixed number of rows and columns of pixels, which are the smallest individual element in an image, holding quantized values that represent the brightness of a given color at any specific point. Typically, the pixels are stored in computer memory as a raster image or raster map, a two-dimensional array of small integers, where these values are commonly transmitted or stored in a compressed form. The raster images can be created by a variety of input devices and techniques, such as digital cameras, scanners, coordinate-measuring machines, seismographic profiling, airborne radar, and more. Common image formats include GIF, JPEG, and PNG.

The Graphics Interchange Format (known by its acronym GIF) is a bitmap image format that supports up to 8 bits per pixel for each image, allowing a single image to reference its palette of up to 256 different colors chosen from the 24-bit RGB color space. It also supports animations and allows a separate palette of up to 256 colors for each frame. GIF images are compressed using the Lempel-Ziv-Welch (LZW) lossless data compression technique to reduce the file size without degrading the visual quality. The GIF (GRAPHICS INTERCHANGE FORMAT) Standard Version 89a is available from www.w3.org/Graphics/GIF/spcc-gif89a.txt.

JPEG (seen most often with the .jpg or .jpeg filename extension) is a commonly used method of lossy compression for digital images, particularly for those images produced by digital photography. The degree of compression can be adjusted, allowing a selectable tradeoff between storage size and image quality and typically achieves 10:1 compression with little perceptible loss in image quality. JPEG/Exif is the most common image format used by digital cameras and other photographic image capture devices, along with JPEG/JFIF. The term "JPEG" is an acronym for the Joint Photographic Experts Group, which created the standard. JPEG/JFIF supports a maximum image size of 65535×65535 pixels-one to four gigapixels (1000 megapixels), depending on the aspect ratio (from panoramic 3:1 to square). JPEG is standardized under as ISO/IEC 10918-1:1994 entitled: *"Information technology—Digital compression and coding of continuous-tone still images: Requirements and guidelines"*.

Portable Network Graphics (PNG) is a raster graphics file format that supports lossless data compression that was created as an improved replacement for Graphics Interchange Format (GIF), and is commonly used as lossless image compression format on the Internet. PNG supports palette-based images (with palettes of 24-bit RGB or 32-bit RGBA colors), grayscale images (with or without alpha channel), and full-color non-palette-based RGB images (with or without alpha channel). PNG was designed for transferring images on the Internet, not for professional-quality print graphics, and, therefore, does not support non-RGB color spaces such as CMYK. PNG was published as an ISO/IEC15948:2004 standard entitled: *"Information technology—Computer graphics and image processing—Portable Network Graphics (PNG): Functional specification"*.

Further, a digital image acquisition system that includes a portable apparatus for capturing digital images and a digital processing component for detecting, analyzing, invoking subsequent image captures, informing the photographer regarding motion blur, and reducing the camera motion blur in an image captured by the apparatus, is described in U.S. Pat. No. 8,244,053 entitled: "Method and Apparatus for Initiating Subsequent Exposures Based on Determination of Motion Blurring Artifacts", and in U.S. Pat. No. 8,285,067 entitled: "Method Notifying Users Regarding Motion Artifacts Based on Image Analysis", both to Steinberg et al. which are both incorporated in their entirety for all purposes as if fully set forth herein.

Furthermore, a camera that has the release button, a timer, a memory, and a control part, and the timer measures elapsed time after the depressing of the release button is released, used to prevent a shutter release moment to take a good picture from being missed by shortening time required for focusing when a release button is depressed again, is described in Japanese Patent Application Publication No. JP2008033200 to Hyo Hana entitled: "Camera", a through-image that is read by a face detection processing circuit, and the face of an object is detected, and is detected again by the face detection processing circuit while half-pressing a shutter button, used to provide an imaging apparatus capable of photographing a quickly moving child without fail, is described in a Japanese Patent Application Publication No. JP2007208922 to Uchida Akihiro entitled: "Imaging Apparatus", and a digital camera that executes image evaluation processing for automatically evaluating a photographic image (exposure condition evaluation, contrast evaluation, blur or focus blur evaluation), and used to enable an image photographing apparatus such as a digital camera to automatically correct a photographic image, is described in Japanese Patent Application Publication No. JP2006050494 to Kita Kazunori entitled: "Image Photographing Apparatus", which are all incorporated in their entirety for all purposes as if fully set forth herein.

Any devices that may generate visual image data encoding a visual image may be collected referred to herein as "camera". In various embodiments, the pixel values of a visual image encode information about the detected wave's/photon's intensity, amplitude, frequency, wavelength, polarization, and/or phase. That is, the pixel values of visual images encode various detected aspects waves/photons received from (i.e., reflected from or emitted by) tangible objects in the environment. The pixel values of visual images may be encoded in a Red-Green-Blue (RGB) format, a greyscale format, or any other such format. The term "visual map" may refer to a visual image that is a map. That is, a visual map is a visual image that is associated with a coordinate system. The term "visual-domain" may refer to encoding or representing visual features. Thus, visual images and visual maps may be referred to as being represented in a visual-domain.

Video. The term 'video' typically pertains to numerical or electrical representation or moving visual images, commonly referring to recording, reproducing, displaying, or broadcasting the moving visual images. Video, or a moving image in general, is created from a sequence of still images called frames, and by recording and then playing back frames in quick succession, an illusion of movement is created. Video can be edited by removing some frames and combining sequences of frames, called clips, together in a timeline. A Codec, short for 'coder-decoder', describes the method in which video data is encoded into a file and decoded when the file is played back. Most video is compressed during encoding, and so the terms codec and compressor are often used interchangeably. Codecs can be lossless or lossy, where lossless codecs are higher quality than lossy codecs, but produce larger file sizes. Transcoding is the process of converting from one codec to another. Common codecs include DV-PAL, HDV, H.264, MPEG-2, and MPEG-4. Digital video is further described in Adobe Digital Video Group publication updated and enhanced March 2004, entitled: "*A Digital Video Primer—An introduction to DV production, post-production, and delivery*", which is incorporated in its entirety for all purposes as if fully set forth herein.

Digital video data typically comprises a series of frames, including orthogonal bitmap digital images displayed in rapid succession at a constant rate, measured in Frames-Per-Second (FPS). In interlaced video each frame is composed of two halves of an image (referred to individually as fields, two consecutive fields compose a full frame), where the first half contains only the odd-numbered lines of a full frame, and the second half contains only the even-numbered lines.

Many types of video compression exist for serving digital video over the internet, and on optical disks. The file sizes of digital video used for professional editing are generally not practical for these purposes, and the video requires further compression with codecs such as Sorenson, H.264, and more recently, Apple ProRes especially for HD. Currently widely used formats for delivering video over the internet are MPEG-4, Quicktime, Flash, and Windows Media. Other PCM based formats include CCIR 601 commonly used for broadcast stations, MPEG-4 popular for online distribution of large videos and video recorded to flash memory, MPEG-2 used for DVDs, Super-VCDs, and many broadcast television formats, MPEG-1 typically used for video CDs, and H.264 (also known as MPEG-4 Part 10 or AVC) commonly used for Blu-ray Discs and some broadcast television formats.

The term 'Standard Definition' (SD) describes the frame size of a video, typically having either a 4:3 or 16:9 frame aspect ratio. The SD PAL standard defines 4:3 frame size and 720×576 pixels, (or 768×576 if using square pixels), while SD web video commonly uses a frame size of 640×480 pixels. Standard-Definition Television (SDTV) refers to a television system that uses a resolution that is not considered to be either high-definition television (1080i, 1080p, 1440p, 4K UHDTV, and 8K UHD) or enhanced-definition television (EDTV 480p). The two common SDTV signal types are 576i, with 576 interlaced lines of resolution, derived from the European-developed PAL and SECAM systems, and 480i based on the American National Television System Committee NTSC system. In North America, digital SDTV is broadcast in the same 4:3 aspect ratio as NTSC signals with widescreen content being center cut. However, in other parts of the world that used the PAL or SECAM color systems, standard-definition television is now usually shown with a 16:9 aspect ratio. Standards that support digital SDTV broadcast include DVB, ATSC, and ISDB.

The term 'High-Definition' (HD) refers multiple video formats, which use different frame sizes, frame rates and scanning methods, offering higher resolution and quality than standard-definition. Generally, any video image with considerably more than 480 horizontal lines (North America) or 576 horizontal lines (Europe) is considered high-definition, where 720 scan lines is commonly the minimum. HD video uses a 16:9 frame aspect ratio and frame sizes that are 1280×720 pixels (used for HD television and HD web video), 1920×1080 pixels (referred to as full-HD or full-raster), or 1440×1080 pixels (full-HD with non-square pixels).

High definition video (prerecorded and broadcast) is defined by the number of lines in the vertical display resolution, such as 1,080 or 720 lines, in contrast to regular digital television (DTV) using 480 lines (upon which NTSC is based, 480 visible scanlines out of 525) or 576 lines (upon which PAL/SECAM are based, 576 visible scanlines out of 625). HD is further defined by the scanning system being progressive scanning (p) or interlaced scanning (i). Progressive scanning (p) redraws an image frame (all of its lines) when refreshing each image, for example 720p/1080p. Interlaced scanning (i) draws the image field every other line or "odd numbered" lines during the first image refresh operation, and then draws the remaining "even numbered" lines during a second refreshing, for example 1080i. Interlaced scanning yields greater image resolution if a subject is not moving, but loses up to half of the resolution, and suffers "combing" artifacts when a subject is moving. HD video is further defined by the number of frames (or fields) per second (Hz), where in Europe 50 Hz (60 Hz in the USA) television broadcasting system is common. The 720p60 format is 1,280×720 pixels, progressive encoding with 60 frames per second (60 Hz). The 1080i50/1080i60 format is 1920×1080 pixels, interlaced encoding with 50/60 fields, (50/60 Hz) per second.

Currently common HD modes are defined as 720p, 1080i, 1080p, and 1440p. Video mode 720p relates to frame size of 1,280×720 (W×H) pixels, 921,600 pixels per image, progressive scanning, and frame rates of 23.976, 24, 25, 29.97, 30, 50, 59.94, 60, or 72 Hz. Video mode 1080i relates to frame size of 1,920×1,080 (W×H) pixels, 2,073,600 pixels per image, interlaced scanning, and frame rates of 25 (50 fields/s), 29.97 (59.94 fields/s), or 30 (60 fields/s) Hz. Video mode 1080p relates to frame size of 1,920×1,080 (W×H) pixels, 2,073,600 pixels per image, progressive scanning, and frame rates of 24 (23.976), 25, 30 (29.97), 50, or 60

(59.94) Hz. Similarly, video mode 1440p relates to frame size of 2,560×1,440 (W×H) pixels, 3,686,400 pixels per image, progressive scanning, and frame rates of 24 (23.976), 25, 30 (29.97), 50, or 60 (59.94) Hz. Digital video standards are further described in a published 2009 primer by Tektronix® entitled: "A Guide to Standard and High-Definition Digital Video Measurements", which is incorporated in its entirety for all purposes as if fully set forth herein.

MPEG-4. MPEG-4 is a method of defining compression of audio and visual (AV) digital data, designated as a standard for a group of audio and video coding formats, and related technology by the ISO/IEC Moving Picture Experts Group (MPEG) (ISO/IEC JTC1/SC29/WG11) under the formal standard ISO/IEC 14496-'Coding of audio-visual objects'. Typical uses of MPEG-4 include compression of AV data for the web (streaming media) and CD distribution, voice (telephone, videophone) and broadcast television applications. MPEG-4 provides a series of technologies for developers, for various service-providers and for end users, as well as enabling developers to create multimedia objects possessing better abilities of adaptability and flexibility to improve the quality of such services and technologies as digital television, animation graphics, the World Wide Web and their extensions. Transporting of MPEG-4 is described in IETF RFC 3640, entitled: "RTP Payload Format for Transport of MPEG-4 Elementary Streams", which is incorporated in its entirety for all purposes as if fully set forth herein. The MPEG-4 format can perform various functions such as multiplexing and synchronizing data, associating with media objects for efficiently transporting via various network channels. MPEG-4 is further described in a white paper published 2005 by The MPEG Industry Forum (Document Number mp-in-40182), entitled: "*Understanding MPEG-4: Technologies, Advantages, and Markets—An MPEGIF White Paper*", which is incorporated in its entirety for all purposes as if fully set forth herein.

H.264. H.264 (a.k.a. MPEG-4 Part 10, or Advanced Video Coding (MPEG-4 AVC)) is a commonly used video compression format for the recording, compression, and distribution of video content. H.264/MPEG-4 AVC is a block-oriented motion-compensation-based video compression standard ITU-T H.264, developed by the ITU-T Video Coding Experts Group (VCEG) together with the ISO/IEC JTC1 Moving Picture Experts Group (MPEG), defined in the ISO/IEC MPEG-4 AVC standard ISO/IEC 14496-10— MPEG-4 Part 10—'Advanced Video Coding'. H.264 is widely used by streaming internet sources, such as videos from Vimeo, YouTube, and the iTunes Store, web software such as the Adobe Flash Player and Microsoft Silverlight, and also various HDTV broadcasts over terrestrial (ATSC, ISDB-T, DVB-T or DVB-T2), cable (DVB-C), and satellite (DVB-S and DVB-S2). H.264 is further described in a Standards Report published in IEEE Communications Magazine, August 2006, by Gary J. Sullivan of Microsoft Corporation, entitled: "*The H.264/MPEG4 Advanced Video Coding Standard and its Applications*", and further in IETF RFC 3984 entitled: "RTP Payload Format for H.264 Video", which are both incorporated in their entirety for all purposes as if fully set forth herein.

VCA. Video Content Analysis (VCA), also known as video content analytics, is the capability of automatically analyzing video to detect and determine temporal and spatial events. VCA deals with the extraction of metadata from raw video to be used as components for further processing in applications such as search, summarization, classification or event detection. The purpose of video content analysis is to provide extracted features and identification of structure that constitute building blocks for video retrieval, video similarity finding, summarization and navigation. Video content analysis transforms the audio and image stream into a set of semantically meaningful representations. The ultimate goal is to extract structural and semantic content automatically, without any human intervention, at least for limited types of video domains. Algorithms to perform content analysis include those for detecting objects in video, recognizing specific objects, persons, locations, detecting dynamic events in video, associating keywords with image regions or motion. VCA is used in a wide range of domains including entertainment, health-care, retail, automotive, transport, home automation, flame and smoke detection, safety and security. The algorithms can be implemented as software on general purpose machines, or as hardware in specialized video processing units.

Many different functionalities can be implemented in VCA. Video Motion Detection is one of the simpler forms where motion is detected with regard to a fixed background scene. More advanced functionalities include video tracking and egomotion estimation. Based on the internal representation that VCA generates in the machine, it is possible to build other functionalities, such as identification, behavior analysis or other forms of situation awareness. VCA typically relies on good input video, so it is commonly combined with video enhancement technologies such as video denoising, image stabilization, unsharp masking and super-resolution. VCA is described in a publication entitled: "*An introduction to video content analysis—industry guide*" published August 2016 as Form No. 262 Issue 2 by British Security Industry Association (BSIA), and various content based retrieval systems are described in a paper entitled: "*Overview of Existing Content Based Video Retrieval Systems*" by Shripad A. Bhat, Omkar V. Sardessai, Preetesh P. Kunde and Sarvesh S. Shirodkar of the Department of Electronics and Telecommunication Engineering, Goa College of Engineering, Farmagudi Ponda Goa, published February 2014 in ISSN No: 2309-4893 International Journal of Advanced Engineering and Global Technology Vol-2, Issue-2, which are both incorporated in their entirety for all purposes as if fully set forth herein.

Any image processing herein may further include video enhancement such as video denoising, image stabilization, unsharp masking, and super-resolution. Further, the image processing may include a Video Content Analysis (VCA), where the video content is analyzed to detect and determine temporal events based on multiple images, and is commonly used for entertainment, healthcare, retail, automotive, transport, home automation, safety and security. The VCA functionalities include Video Motion Detection (VMD), video tracking, and egomotion estimation, as well as identification, behavior analysis, and other forms of situation awareness. A dynamic masking functionality involves blocking a part of the video signal based on the video signal itself, for example because of privacy concerns. The egomotion estimation functionality involves the determining of the location of a camera or estimating the camera motion relative to a rigid scene, by analyzing its output signal. Motion detection is used to determine the presence of a relevant motion in the observed scene, while an object detection is used to determine the presence of a type of object or entity, for example, a person or car, as well as fire and smoke detection. Similarly, face recognition and Automatic Number Plate Recognition may be used to recognize, and therefore possibly identify persons or cars. Tamper detection is used to determine whether the camera or the output signal is tampered with, and video tracking is used to determine the location of persons or objects in the video signal, possibly with regard to an external reference grid. A pattern is defined as any form in an image having discernible characteristics that provide a distinctive identity when contrasted with other forms. Pattern recognition may also be used, for ascertaining differences, as well as similarities, between patterns under observation and partitioning the patterns into appropriate categories based on these perceived differences and similarities; and may include any procedure for correctly identifying a discrete pattern, such as an alphanumeric character, as a member of a predefined pattern category. Further, the video or image processing may use, or be based on, the algorithms and techniques disclosed in the book entitled: "*Handbook of Image & Video Processing*", edited by Al Bovik, published by Academic Press, [ISBN: 0-12-119790-5], and in the book published by Wiley-Interscience [ISBN: 13-978-0-471-71998-4] (2005) by Tinku Acharya and Ajoy K. Ray entitled: "*Image Processing—Principles and Applications*", which are both incorporated in their entirety for all purposes as if fully set forth herein.

DSP. A Digital Signal Processor (DSP) is a specialized microprocessor (or a SIP block), with its architecture optimized for the operational needs of digital signal processing, serving the goal of DSPs is usually to measure, filter and/or compress continuous real-world analog signals. Most general-purpose microprocessors can also execute digital signal processing algorithms successfully, but dedicated DSPs usually have better power efficiency thus they are more suitable in portable devices such as mobile phones because of power consumption constraints. DSPs often use special memory architectures that are able to fetch multiple data and/or instructions at the same time. Digital signal processing algorithms typically require a large number of mathematical operations to be performed quickly and repeatedly on a series of data samples. Signals (perhaps from audio or video sensors) are constantly converted from analog to digital, manipulated digitally, and then converted back to analog form. Many DSP applications have constraints on latency; that is, for the system to work, the DSP operation must be completed within some fixed time, and deferred (or batch) processing is not viable. A specialized digital signal processor, however, will tend to provide a lower-cost solution, with better performance, lower latency, and no requirements for specialized cooling or large batteries. The architecture of a digital signal processor is optimized specifically for digital signal processing. Most also support some of the features as an applications processor or microcontroller, since signal processing is rarely the only task of a system. Some useful features for optimizing DSP algorithms are outlined below.

Hardware features visible through DSP instruction sets commonly include hardware modulo addressing, allowing circular buffers to be implemented without having to constantly test for wrapping; a memory architecture designed for streaming data, using DMA extensively and expecting code to be written to know about cache hierarchies and the associated delays; driving multiple arithmetic units may require memory architectures to support several accesses per instruction cycle; separate program and data memories (Harvard architecture), and sometimes concurrent access on multiple data buses; and special SIMD (single instruction, multiple data) operations. Digital signal processing is further described in a book by John G. Proakis and Dimitris G. Manolakis, published 1996 by Prentice-Hall Inc. [ISBN 0-13-394338-9] entitled: "*Third Edition—DIGITAL SIGNAL PROCESSING—Principles, Algorithms, and Application*", and in a book by Steven W. Smith entitled: "*The Scientist and Engineer's Guide to—Digital Signal Processing—Second Edition*", published by California Technical Publishing [ISBN 0-9960176-7-6], which are both incorporated in their entirety for all purposes as if fully set forth herein.

Neural networks. Neural Networks (or Artificial Neural Networks (ANNs)) are a family of statistical learning models inspired by biological neural networks (the central nervous systems of animals, in particular the brain) and are used to estimate or approximate functions that may depend on a large number of inputs and are generally unknown. Artificial neural networks are generally presented as systems of interconnected "neurons" which send messages to each other. The connections have numeric weights that can be tuned based on experience, making neural nets adaptive to inputs and capable of learning. For example, a neural network for handwriting recognition is defined by a set of input neurons that may be activated by the pixels of an input image. After being weighted and transformed by a function (determined by the network designer), the activations of these neurons are then passed on to other neurons, and this process is repeated until finally, an output neuron is activated, and determines which character was read. Like other machine learning methods—systems that learn from data—neural networks have been used to solve a wide variety of tasks that are hard to solve using ordinary rule-based programming, including computer vision and speech recognition. A class of statistical models is typically referred to as "Neural" if it contains sets of adaptive weights, i.e. numerical parameters that are tuned by a learning algorithm, and capability of approximating non-linear functions from their inputs. The adaptive weights can be thought of as connection strengths between neurons, which are activated during training and prediction. Neural Networks are described in a book by David Kriesel entitled: "A Brief Introduction to Neural Networks" (ZETA2-EN) [downloaded 5/2015 from www.dkriesel.com], which is incorporated in its entirety for all purposes as if fully set forth herein. Neural Networks are further described in a book by Simon Haykin published 2009 by Pearson Education, Inc. [ISBN-978-0-13-147139-9] entitled: "*Neural Networks and Learning Machines—Third Edition*", which is incorporated in its entirety for all purposes as if fully set forth herein.

Neural networks based techniques may be used for image processing, as described in an article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", in an article published 2002 by Pattern Recognition Society in Pattern Recognition 35 (2002) 2279-2301 [PII: S0031-3203 (01) 00178-9] authored by M. Egmont-Petersen, D. de Ridder, and H. Handels entitled: "*Image processing with neural networks—a review*", and in an article by Dick de Ridder et al. (of the Utrecht University, Utrecht, The Netherlands) entitled: "*Nonlinear image processing using artificial neural networks*", which are all incorporated in their entirety for all purposes as if fully set forth herein.

Neural networks may be used for object detection as described in an article by Christian Szegedy, Alexander Toshev, and Dumitru Erhan (of Google, Inc.) (downloaded 7/2015) entitled: "*Deep Neural Networks for Object Detection*", in a CVPR2014 paper provided by the Computer Vision Foundation by Dumitru Erhan, Christian Szegedy, Alexander Toshev, and Dragomir Anguelov (of Google, Inc., Mountain-View, California, U.S.A.) (downloaded 7/2015) entitled: "*Scalable Object Detection using Deep Neural Networks*", and in an article by Shawn McCann and Jim Reesman (both of Stanford University) (downloaded 7/2015) entitled: "*Object Detection using Convolutional Neural Networks*", which are all incorporated in their entirety for all purposes as if fully set forth herein.

Using neural networks for object recognition or classification is described in an article (downloaded 7/2015) by Mehdi Ebady Manaa, Nawfal Turki Obics, and Dr. Tawfiq A. Al-Assadi (of Department of Computer Science, Babylon University), entitled: "*Object Classification using neural networks with Gray-level Co-occurrence Matrices (GLCM)*", in a technical report No. IDSIA-01-11 Jan. 2001 published by IDSIA/USI-SUPSI and authored by Dan C. Ciresan et al. entitled: "*High-Performance Neural Networks for Visual Object Classification*", in an article by Yuhua Zheng et al. (downloaded 7/2015) entitled: "Object Recognition using Neural Networks with Bottom-Up and top-Down Pathways", and in an article (downloaded 7/2015) by Karen Simonyan, Andrea Vedaldi, and Andrew Zisserman (all of Visual Geometry Group, University of Oxford), entitled: "*Deep Inside Convolutional Networks: Visualising Image Classification Models and Saliency Maps*", which are all incorporated in their entirety for all purposes as if fully set forth herein.

Using neural networks for object recognition or classification is further described in U.S. Pat. No. 6,018,728 to Spence et al. entitled: "Method and Apparatus for Training a Neural Network to Learn Hierarchical Representations of Objects and to Detect and Classify Objects with Uncertain Training Data", in U.S. Pat. No. 6,038,337 to Lawrence et al. entitled: "Method and Apparatus for Object Recognition", in U.S. Pat. No. 8,345,984 to Ji et al. entitled: "3D Convolutional Neural Networks for Automatic Human Action Recognition", and in U.S. Pat. No. 8,705,849 to Prokhorov entitled: "Method and System for Object Recognition Based on a Trainable Dynamic System", which are all incorporated in their entirety for all purposes as if fully set forth herein.

Actual ANN implementation may be based on, or may use, the MATLB® ANN described in the User's Guide Version 4 published July 2002 by The MathWorks, Inc. (Headquartered in Natick, MA, U.S.A.) entitled: "*Neural Network ToolBox—For Use with MATLAB®*" by Howard Demuth and Mark Beale, which is incorporated in its entirety for all purposes as if fully set forth herein. An VHDL IP core that is a configurable feedforward Artificial Neural Network (ANN) for implementation in FPGAs is available (under the Name: artificial_neural_network, created Jun. 2, 2016 and updated Oct. 11, 2016) from OpenCores organization, downloadable from http://opencores.org/. This IP performs full feedforward connections between consecutive layers. All neurons' outputs of a layer become the inputs for the next layer. This ANN architecture is also known as Multi-Layer Perceptron (MLP) when is trained with a supervised learning algorithm. Different kinds of activation functions can be added easily coding them in the provided VHDL template. This IP core is provided in two parts: kernel plus wrapper. The kernel is the optimized ANN with basic logic interfaces. The kernel should be instantiated inside a wrapper to connect it with the user's system buses. Currently, an example wrapper is provided for instantiate it on Xilinx Vivado, which uses AXI4 interfaces for AMBA buses.

Dynamic neural networks are the most advanced in that they dynamically can, based on rules, form new connections and even new neural units while disabling others. In a Feedforward Neural Network (FNN), the information moves in only one direction-forward: From the input nodes data goes through the hidden nodes (if any) and to the output nodes. There are no cycles or loops in the network. Feedforward networks can be constructed from different types of units, e.g. binary McCulloch-Pitts neurons, the simplest example being the perceptron. Contrary to feedforward networks, Recurrent Neural Networks (RNNs) are models with bi-directional data flow. While a feedforward network propagates data linearly from input to output, RNNs also propagate data from later processing stages to earlier stages. RNNs can be used as general sequence processors.

Any ANN herein may be based on, may use, or may be trained or used, using the schemes, arrangements, or techniques described in the book by David Kriesel entitled: "*A Brief Introduction to Neural Networks*" (ZETA2-EN) [downloaded 5/2015 from www.dkriesel.com], in the book by Simon Haykin published 2009 by Pearson Education, Inc. [ISBN-978-0-13-147139-9] entitled: "*Neural Networks and Learning Machines-Third Edition*", in the article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", or in the article entitled: "*Image processing with neural networks-a review*", and in the article by Dick de Ridder et al. (of the Utrecht University, Utrecht, The Netherlands) entitled: "*Nonlinear image processing using artificial neural networks*".

Any object detection herein using ANN may be based on, may use, or may be trained or used, using the schemes, arrangements, or techniques described in the article by Christian Szegedy, Alexander Toshev, and Dumitru Erhan (of Google, Inc.) entitled: "*Deep Neural Networks for Object Detection*", in the CVPR2014 paper provided by the Computer Vision Foundation entitled: "*Scalable Object Detection using Deep Neural Networks*", in the article by Shawn McCann and Jim Reesman entitled: "*Object Detection using Convolutional Neural Networks*", or in any other document mentioned herein.

Any object recognition or classification herein using ANN may be based on, may use, or may be trained or used, using the schemes, arrangements, or techniques described in the article by Mehdi Ebady Manaa, Nawfal Turki Obies, and Dr. Tawfiq A. Al-Assadi entitled: "*Object Classification using neural networks with Gray-level Co-occurrence Matrices (GLCM)*", in the technical report No. IDSIA-01-11 entitled: "*High-Performance Neural Networks for Visual Object Classification*", in the article by Yuhua Zheng et al. entitled: "*Object Recognition using Neural Networks with Bottom-Up and top-Down Pathways*", in the article by Karen Simonyan, Andrea Vedaldi, and Andrew Zisserman, entitled: "*Deep Inside Convolutional Networks: Visualising Image Classification Models and Saliency Maps*", or in any other document mentioned herein.

A logical representation example of a simple feed-forward Artificial Neural Network (ANN) 20 is shown in FIG. 2. The ANN 20 provides three inputs designated as IN #1 22*a*, IN #2 22*b*, and IN #3 22*c*, which connects to three respective neuron units forming an input layer 21*a*. Each neural unit is linked to some, or to all, of a next layer 21*b*, with links that may be enforced or inhibit by associating weights as part of the training process. An output layer 21*d* consists of two neuron units that feeds two outputs OUT #1 23*a* and OUT #2 23*b*. Another layer 21*c* is coupled between the layer 21*b* and the output layer 21*d*. The intervening layers 21*b* and 21*c* are referred to as hidden layers. While three inputs are exampled in the ANN 20, any number of inputs may be equally used, and while two output are exampled in the ANN 20, any number of outputs may equally be used. Further, the ANN 20 uses four layers, consisting of an input layer, an output layer, and two hidden layers. However, any number of layers may be used. For example, the number of layers may be equal to, or above than, 3, 4, 5, 7, 10, 15, 20, 25, 30, 35, 40, 45, or 50 layers. Similarly, an ANN may have any number below 4, 5, 7, 10, 15, 20, 25, 30, 35, 40, 45, or 50 layers.

DNN. A Deep Neural Network (DNN) is an artificial neural network (ANN) with multiple layers between the input and output layers. For example, a DNN that is trained to recognize dog breeds will go over the given image and calculate the probability that the dog in the image is a certain breed. The user can review the results and select which probabilities the network should display (above a certain threshold, etc.) and return the proposed label. Each mathematical manipulation as such is considered a layer, and complex DNN have many layers, hence the name "deep" networks. DNNs can model complex non-linear relationships. DNN architectures generate compositional models where the object is expressed as a layered composition of primitives. The extra layers enable composition of features from lower layers, potentially modeling complex data with fewer units than a similarly performing shallow network. Deep architectures include many variants of a few basic approaches. Each architecture has found success in specific domains. It is not always possible to compare the performance of multiple architectures, unless they have been evaluated on the same data sets. DNN is described in a book entitled: "*Introduction to Deep Learning From Logical Calculus to Artificial Intelligence*" by Sandro Skansi [ISSN 1863-7310 ISSN 2197-1781, ISBN 978-3-319-73003-5], published 2018 by Springer International Publishing AG, which is incorporated in its entirety for all purposes as if fully set forth herein.

Deep Neural Networks (DNNs), which employ deep architectures can represent functions with higher complexity if the numbers of layers and units in a single layer are increased. Given enough labeled training datasets and suitable models, deep learning approaches can help humans establish mapping functions for operation convenience. In this paper, four main deep architectures are recalled and other methods (e.g., sparse coding) are also briefly discussed. Additionally, some recent advances in the field of deep learning are described. The purpose of this article is to provide a timely review and introduction on the deep learning technologies and their applications. It is aimed to provide the readers with a background on different deep learning architectures and also the latest development as well as achievements in this area. The rest of the paper is organized as follows. In Sections II-V, four main deep learning architectures, which are Restricted Boltzmann Machines (RBMs), Deep Belief Networks (DBNs), Auto-Encoder (AE), and Convolutional Neural Networks (CNNs), are reviewed, respectively. Comparisons are made among these deep architectures and recent developments on these algorithms are discussed. A schematic diagram 20a of an RBM, a schematic diagram 20b of a DBN, and a schematic structure 20c of a CNN are shown in FIG. 2a.

DNNs are typically feedforward networks in which data flows from the input layer to the output layer without looping back. At first, the DNN creates a map of virtual neurons and assigns random numerical values, or "weights", to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data. Recurrent neural networks (RNNs), in which data can flow in any direction, are used for applications such as language modeling. Long short-term memory is particularly effective for this use. Convolutional deep neural networks (CNNs) are used in computer vision. CNNs also have been applied to acoustic modeling for Automatic Speech Recognition (ASR).

Since the proposal of a fast-learning algorithm for deep belief networks in 2006, the deep learning techniques have drawn ever-increasing research interests because of their inherent capability of overcoming the drawback of traditional algorithms dependent on hand-designed features. Deep learning approaches have also been found to be suitable for big data analysis with successful applications to computer vision, pattern recognition, speech recognition, natural language processing, and recommendation systems.

Widely-used deep learning architectures and their practical applications are discussed in a paper entitled: "*A Survey of Deep Neural Network Architectures and Their Applications*" by Weibo Liua, Zidong Wanga, Xiaohui Liua, Nianyin Zengb, Yurong Liuc, and Fuad E. Alsaadid, published December 2016 [DOI: 10.1016/j.neucom.2016.12.038] in Neurocomputing 234, which is incorporated in its entirety for all purposes as if fully set forth herein. An up-to-date overview is provided on four deep learning architectures, namely, autoencoder, convolutional neural network, deep belief network, and restricted Boltzmann machine. Different types of deep neural networks are surveyed and recent progresses are summarized. Applications of deep learning techniques on some selected areas (speech recognition, pattern recognition and computer vision) are highlighted. A list of future research topics is finally given with clear justifications.

RBM. Restricted Boltzmann machine (RBM) is a generative stochastic artificial neural network that can learn a probability distribution over its set of inputs. As their name implies, RBMs are a variant of Boltzmann machines, with the restriction that their neurons must form a bipartite graph: a pair of nodes from each of the two groups of units (commonly referred to as the "visible" and "hidden" units respectively) may have a symmetric connection between them; and there are no connections between nodes within a group. By contrast, "unrestricted" Boltzmann machines may have connections between hidden units. This restriction allows for more efficient training algorithms than are available for the general class of Boltzmann machines, in particular the gradient-based contrastive divergence algorithm. Restricted Boltzmann machines can also be used in deep learning networks. In particular, deep belief networks can be formed by "stacking" RBMs and optionally fine-tuning the resulting deep network with gradient descent and back-propagation DBN. A Deep Belief Network (DBN) is a generative graphical model, or alternatively a class of deep neural network, composed of multiple layers of latent variables ("hidden units"), with connections between the layers but not between units within each layer. When trained on a set of examples without supervision, a DBN can learn to probabilistically reconstruct its inputs. The layers then act as feature detectors. After this learning step, a DBN can be further trained with supervision to perform classification. DBNs can be viewed as a composition of simple, unsupervised networks such Boltzmann machines (RBMs) as restricted or autoencoders, where each sub-network's hidden layer serves as the visible layer for the next. An RBM is an undirected, generative energy-based model with a "visible" input layer and a hidden layer and connections between but not within layers. This composition leads to a fast, layer-by-layer unsupervised training procedure, where contrastive divergence is applied to each sub-network in turn, starting from the "lowest" pair of layers (the lowest visible layer is a training set).

Dynamic neural networks are the most advanced in that they dynamically can, based on rules, form new connections and even new neural units while disabling others. In a Feedforward Neural Network (FNN), the information moves in only one direction-forward: From the input nodes data goes through the hidden nodes (if any) and to the output nodes. There are no cycles or loops in the network. Feedforward networks can be constructed from different types of units, e.g., binary McCulloch-Pitts neurons, the simplest example being the perceptron. Contrary to feedforward networks, Recurrent Neural Networks (RNNs) are models with bi-directional data flow. While a feedforward network propagates data linearly from input to output, RNNs also propagate data from later processing stages to earlier stages. RNNs can be used as general sequence processors.

A waveform analysis assembly (10) that includes a sensor (12) for detecting physiological electrical and mechanical signals produced by the body is disclosed in U.S. Pat. No. 5,092,343 to Spitzer et al. entitled: "Waveform analysis apparatus and method using neural network techniques", which is incorporated in its entirety for all purposes as if fully set forth herein. An extraction neural network (22, 22') will learn a repetitive waveform of the electrical signal, store the waveform in memory (18), extract the waveform from the electrical signal, store the location times of occurrences of the waveform, and subtract the waveform from the electrical signal. Each significantly different waveform in the electrical signal is learned and extracted. A single or multilayer layer neural network (22, 22') accomplishes the learning and extraction with either multiple passes over the electrical signal or accomplishes the learning and extraction of all waveforms in a single pass over the electrical signal. A reducer (20) receives the stored waveforms and times and reduces them into features characterizing the waveforms. A classifier neural network (36) analyzes the features by classifying them through non-linear mapping techniques within the network representing diseased states and produces results of diseased states based on learned features of the normal and patient groups.

A method for analyzing data is disclosed in U.S. Pat. No. 8,898,093 to Helmsen entitled: "Systems and methods for analyzing data using deep belief networks (DBN) and identifying a pattern in a graph", which is incorporated in its entirety for all purposes as if fully set forth herein. The method includes generating, using a processing device, a graph from raw data, the graph including a plurality of nodes and edges, deriving, using the processing device, at least one label for each node using a deep belief network, and identifying, using the processing device, a predetermined pattern in the graph based at least in part on the labeled nodes.

Object detection. Object detection (a.k.a. 'object recognition') is a process of detecting and finding semantic instances of real-world objects, typically of a certain class (such as humans, buildings, or cars), in digital images and videos. Object detection techniques are described in an article published International Journal of Image Processing (IJIP), Volume 6, Issue 6-2012, entitled: "*Survey of The Problem of Object Detection In Real Images*" by Dilip K. Prasad, and in a tutorial by A. Ashbrook and N. A. Thacker entitled: "*Tutorial: Algorithms For 2-dimensional Object Recognition*" published by the Imaging Science and Biomedical Engineering Division of the University of Manchester, which are both incorporated in their entirety for all purposes as if fully set forth herein. Various object detection techniques are based on pattern recognition, described in the Computer Vision: March 2000 Chapter 4 entitled: "*Pattern Recognition Concepts*", and in a book entitled: "*Hands-On Pattern Recognition—Challenges in Machine Learning, Volume 1*", published by Microtome Publishing, 2011 (ISBN-13:978-0-9719777-1-6), which are both incorporated in their entirety for all purposes as if fully set forth herein.

Various object detection (or recognition) schemes in general, and face detection techniques in particular, are based on using Haar-like features (Haar wavelets) instead of the usual image intensities. A Haar-like feature considers adjacent rectangular regions at a specific location in a detection window, sums up the pixel intensities in each region, and calculates the difference between these sums. This difference is then used to categorize subsections of an image. Viola-Jones object detection framework, when applied to a face detection using Haar features, is based on the assumption that all human faces share some similar properties, such as the eyes region is darker than the upper checks, and the nose bridge region is brighter than the eyes. The Haar-features are used by the Viola-Jones object detection framework, described in articles by Paul Viola and Michael Jones, such as the International Journal of Computer Vision 2004 article entitled: "*Robust Real-Time Face Detection*" and in the Accepted Conference on Computer Vision and Pattern Recognition 2001 article entitled: "*Rapid Object Detection using a Boosted Cascade of Simple Features*", which are both incorporated in their entirety for all purposes as if fully set forth herein.

Object detection is the problem of localization and classifying a specific object in an image which consists of multiple objects. Typical image classifiers use to carry out the task of detecting an object by scanning the entire image to locate the object. The process of scanning the entire image begins with a pre-defined window which produces a Boolean result that is true if the specified object is present in the scanned section of the image and false if it is not. After scanning the entire image with the window, the size of the window is increased which is used for scanning the image again. Systems like Deformable Parts Model (DPM) uses this technique which is called Sliding Window.

Neural networks based techniques may be used for image processing, as described in an article in Engineering Letters, 20:1. EL_20_1_09 (Advance online publication: 27 Feb. 2012) by Juan A. Ramirez-*Quintana*, Mario I. Cacon-Murguia, and F. Chacon-Hinojos entitled: "*Artificial Neural Image Processing Applications: A Survey*", in an article published 2002 by Pattern Recognition Society in Pattern Recognition 35 (2002) 2279-2301 [PII: S0031-3203 (01) 00178-9] authored by M. Egmont-Petersen, D. de Ridder, and H. Handels entitled: "*Image processing with neural networks—a review*", and in an article by Dick de Ridder et al. (of the Utrecht University, Utrecht, The Netherlands) entitled: "*Nonlinear image processing using artificial neural networks*", which are all incorporated in their entirety for all purposes as if fully set forth herein.

Neural networks may be used for object detection as described in an article by Christian Szegedy, Alexander Toshev, and Dumitru Erhan (of Google, Inc.) (downloaded 7/2015) entitled: "Deep Neural Networks for Object Detection", in a CVPR2014 paper provided by the Computer Vision Foundation by Dumitru Erhan, Christian Szegedy, Alexander Toshev, and Dragomir Anguelov (of Google, Inc., Mountain-View, California, U.S.A.) (downloaded 7/2015)

entitled: "Scalable Object Detection using Deep Neural Networks", and in an article by Shawn McCann and Jim Reesman (both of Stanford University) (downloaded 7/2015) entitled: "*Object Detection using Convolutional Neural Networks*", which are all incorporated in their entirety for all purposes as if fully set forth herein.

Using neural networks for object recognition or classification is described in an article (downloaded 7/2015) by Mehdi Ebady Manaa, Nawfal Turki Obies, and Dr. Tawfiq A. Al-Assadi (of Department of Computer Science, Babylon University), entitled: "*Object Classification using neural networks with Gray-level Co-occurrence Matrices (GLCM)*", in a technical report No. IDSIA-01-11 Jan. 2001 published by IDSIA/USI-SUPSI and authored by Dan C. Ciresan et al. entitled: "*High-Performance Neural Networks for Visual Object Classification*", in an article by Yuhua Zheng et al. (downloaded 7/2015) entitled: "*Object Recognition using Neural Networks with Bottom-Up and top-Down Pathways*", and in an article (downloaded 7/2015) by Karen Simonyan, Andrea Vedaldi, and Andrew Zisserman (all of Visual Geometry Group, University of Oxford), entitled: "*Deep Inside Convolutional Networks: Visualising Image Classification Models and Saliency Maps*", which are all incorporated in their entirety for all purposes as if fully set forth herein.

Using neural networks for object recognition or classification is further described in U.S. Pat. No. 6,018,728 to Spence et al. entitled: "Method and Apparatus for Training a Neural Network to Learn Hierarchical Representations of Objects and to Detect and Classify Objects with Uncertain Training Data", in U.S. Pat. No. 6,038,337 to Lawrence et al. entitled: "Method and Apparatus for Object Recognition", in U.S. Pat. No. 8,345,984 to Ji et al. entitled: "3D Convolutional Neural Networks for Automatic Human Action Recognition", and in U.S. Pat. No. 8,705,849 to Prokhorov entitled: "Method and System for Object Recognition Based on a Trainable Dynamic System", which are all incorporated in their entirety for all purposes as if fully set forth herein.

Signal processing using ANN is described in a final technical report No. RL-TR-94-150 published August 1994 by Rome Laboratory, Air force Material Command, Griffiss Air Force Base, New York, entitled: "*NEURAL NETWORK COMMUNICATIONS SIGNAL PROCESSING*", which is incorporated in its entirety for all purposes as if fully set forth herein. The technical report describes the program goals to develop and implement a neural network and communications signal processing simulation system for the purpose of exploring the applicability of neural network technology to communications signal processing; demonstrate several configurations of the simulation to illustrate the system's ability to model many types of neural network based communications systems; and use the simulation to identify the neural network configurations to be included in the conceptual design cf a neural network transceiver that could be implemented in a follow-on program.

Actual ANN implementation may be based on, or may use, the MATLB® ANN described in the User's Guide Version 4 published July 2002 by The MathWorks, Inc. (Headquartered in Natick, MA, U.S.A.) entitled: "*Neural Network ToolBox—For Use with MATLAB®*" by Howard Demuth and Mark Beale, which is incorporated in its entirety for all purposes as if fully set forth herein. An VHDL IP core that is a configurable feedforward Artificial Neural Network (ANN) for implementation in FPGAs is available (under the Name: artificial_neural_network, created Jun. 2, 2016 and updated Oct. 11, 2016) from Open-Cores organization, downloadable from http://opencores.org/. This IP performs full feedforward connections between consecutive layers. All neurons' outputs of a layer become the inputs for the next layer. This ANN architecture is also known as Multi-Layer Perceptron (MLP) when is trained with a supervised learning algorithm. Different kinds of activation functions can be added easily coding them in the provided VHDL template. This IP core is provided in two parts: kernel plus wrapper. The kernel is the optimized ANN with basic logic interfaces. The kernel should be instantiated inside a wrapper to connect it with the user's system buses. Currently, an example wrapper is provided for instantiate it on Xilinx Vivado, which uses AXI4 interfaces for AMBA buses.

Dynamic neural networks are the most advanced in that they dynamically can, based on rules, form new connections and even new neural units while disabling others. In a Feedforward Neural Network (FNN), the information moves in only one direction-forward: From the input nodes data goes through the hidden nodes (if any) and to the output nodes. There are no cycles or loops in the network. Feedforward networks can be constructed from different types of units, e.g. binary McCulloch-Pitts neurons, the simplest example being the perceptron. Contrary to feedforward networks, Recurrent Neural Networks (RNNs) are models with bi-directional data flow. While a feedforward network propagates data linearly from input to output, RNNs also propagate data from later processing stages to earlier stages. RNNs can be used as general sequence processors.

CNN. A Convolutional Neural Network (CNN, or ConvNet) is a class of artificial neural network, most commonly applied for analyzing visual imagery. They are also known as shift invariant or Space Invariant Artificial Neural Networks (SIANN), based on the shared-weight architecture of the convolution kernels or filters that slide along input features and provide translation equivariant responses known as feature maps. Counter-intuitively, most convolutional neural networks are only equivariant, as opposed to invariant, to translation CNNs are regularized versions of multilayer perceptrons that typically include fully connected networks, where each neuron in one layer is connected to all neurons in the next layer. Typical ways of regularization, or preventing overfitting, include: penalizing parameters during training (such as weight decay) or trimming connectivity (such as skipped connections or dropout). CNNs approach towards regularization involve taking advantage of the hierarchical pattern in data and assemble patterns of increasing complexity using smaller and simpler patterns embossed in their filters. CNNs use relatively little pre-processing compared to other image classification algorithms. This means that the network learns to optimize the filters (or kernels) through automated learning, whereas in traditional algorithms these filters are hand-engineered. This independence from prior knowledge and human intervention in feature extraction is a major advantage.

Systems and methods that provide a unified end-to-end detection pipeline for object detection that achieves impressive performance in detecting very small and highly overlapped objects in face and car images are presented in U.S. Pat. No. 9,881,234 to Huang et al. entitled: "Systems and methods for end-to-end object detection", which is incorporated in its entirety for all purposes as if fully set forth herein. Various embodiments of the present disclosure provide for an accurate and efficient one-stage FCN-based object detector that may be optimized end-to-end during training. Certain embodiments train the object detector on a single scale using jitter-augmentation integrated landmark localization information through joint multi-task learning to improve the performance and accuracy of end-to-end object detection. Various embodiments apply hard negative mining techniques during training to bootstrap detection performance. The presented are systems and methods are highly suitable for situations where region proposal generation methods may fail, and they outperform many existing sliding window fashion FCN detection frameworks when detecting objects at small scales and under heavy occlusion conditions.

A technology for multi-perspective detection of objects is disclosed in U.S. Pat. No. 10,706,335 to Gautam et al. entitled: "Multi-perspective detection of objects", which is incorporated in its entirety for all purposes as if fully set forth herein. The technology may involve a computing system that (i) generates (a) a first feature map based on a first visual input from a first perspective of a scene utilizing at least one first neural network and (b) a second feature map based on a second visual input from a second, different perspective of the scene utilizing at least one second neural network, where the first perspective and the second perspective share a common dimension, (ii) based on the first feature map and a portion of the second feature map corresponding to the common dimension, generates cross-referenced data for the first visual input, (iii) based on the second feature map and a portion of the first feature map corresponding to the common dimension, generates cross-referenced data for the second visual input, and (iv) based on the cross-referenced data, performs object detection on the scene.

A method and a system for implementing neural network models on edge devices in an Internet of Things (IoT) network are disclosed in U.S. Patent Application Publication No. 2020/0380306 to HADA et al. entitled: "System and method for implementing neural network models on edge devices in iot networks", which is incorporated in its entirety for all purposes as if fully set forth herein. In an embodiment, the method may include receiving a neural network model trained and configured to detect objects from images, and iteratively assigning a new value to each of a plurality of parameters associated with the neural network model to generate a re-configured neural network model in each iteration. The method may further include deploying for a current iteration the re-configured neural network on the edge device. The method may further include computing for the current iteration, a trade-off value based on a detection accuracy associated with the at least one object detected in the image and resource utilization data associated with the edge device, and selecting the re-configured neural network model, based on the trade-off value calculated for the current iteration.

Imagenet. Project ImageNet is an exampler of a pre-trained neural network, described in the website www.image-net.org/(preceded by http://) whose API is described in a web page image-net.org/download-API (preceded by http://), a copy of which is incorporated in its entirety for all purposes as if fully set forth herein. The project is further described in a presentation by Fei-Fei Li and Olga Russakovsky (ICCV 2013) entitled: "*Analysis of large Scale Visual Recognition*", in an ImageNet presentation by Fei-Fei Li (of Computer Science Dept., Stanford University) entitled: "*Crowdsourcing, Outsourcing, benchmarking, & other cool things*", and in an article (downloaded 7/2015) by Alex Krizhevsky, Ilya Sutskever, and Geoffrey E. Hinton (all of University of Toronto) entitled: "*ImageNet Classification with Deep Convolutional Neural Networks*", which are both incorporated in their entirety for all purposes as if fully set forth herein.

The ImageNet project is a large visual database designed for use in visual object recognition software research. More than 14 million images have been hand-annotated by the project to indicate what objects are pictured and in at least one million of the images, bounding boxes are also provided. The database of annotations of third-party image URLs is freely available directly from ImageNet, though the actual images are not owned by ImageNet. ImageNet crowd-sources its annotation process. Image-level annotations indicate the presence or absence of an object class in an image, such as "there are tigers in this image" or "there are no tigers in this image". Object-level annotations provide a bounding box around the (visible part of the) indicated object. ImageNet uses a variant of the broad WordNet schema to categorize objects, augmented with 120 categories of dog breeds to showcase fine-grained classification.

YOLO. You Only Look Once (YOLO) is a new approach to object detection. While other object detection repurposes classifiers perform detection, YOLO object detection is defined as a regression problem to spatially separated bounding boxes and associated class probabilities. A single neural network predicts bounding boxes and class probabilities directly from full images in one evaluation. Since the whole detection pipeline is a single network, it can be optimized end-to-end directly on detection performance. YOLO makes more localization errors but is less likely to predict false positives on background, and further learns very general representations of objects. It outperforms other detection methods, including Deformable Parts Model (DPM) and R-CNN, when generalizing from natural images to other domains like artwork.

After classification, post-processing is used to refine the bounding boxes, eliminate duplicate detections, and rescore the boxes based on other objects in the scene. The object detection is framed as a single regression problem, straight from image pixels to bounding box coordinates and class probabilities, so that only looking once (YOLO) at an image predicts what objects are present and where they are. A single convolutional network simultaneously predicts multiple bounding boxes and class probabilities for those boxes. YOLO trains on full images and directly optimizes detection performance.

In one example, YOLO is implemented as a CNN and has been evaluated on the PASCAL VOC detection dataset. It consists of a total of 24 convolutional layers followed by 2 fully connected layers. The layers are separated by their functionality in the following manner: First 20 convolutional layers followed by an average pooling layer and a fully connected layer is pre-trained on the ImageNet 1000-class classification dataset; the pretraining for classification is performed on dataset with resolution 224×224; and the layers comprise of 1×1 reduction layers and 3×3 convolutional layers. Last 4 convolutional layers followed by 2 fully connected layers are added to train the network for object detection, that requires more granular detail hence the resolution of the dataset is bumped to 448×448. The final layer predicts the class probabilities and bounding boxes, and uses a linear activation whereas the other convolutional layers use leaky ReLU activation. The input is 448×448 image and the output is the class prediction of the object enclosed in the bounding box.

The YOLO approach to object detection describing frame object detection as a regression problem to spatially separated bounding boxes and associated class probabilities is described in an article authored by Joseph Redmon, Santosh Divvala, Ross Girshick, and Ali Farhadi, published 9 May 2016 and entitled: "*You Only Look Once: Unified, Real-Time*

*Object Detection*", which is incorporated in its entirety for all purposes as if fully set forth herein. A single neural network predicts bounding boxes and class probabilities directly from full images in one evaluation. Since the whole detection pipeline is a single network, it can be optimized end-to-end directly on detection performance. The base YOLO model processes images in real-time at 45 frames per second while a smaller version of the network, Fast YOLO, processes an astounding 155 frames per second while still achieving double the mAP of other real-time detectors. Compared to state-of-the-art detection systems, YOLO makes more localization errors but is less likely to predict false positives on background. Further, YOLO learns very general representations of objects.

Based on the general introduction to the background and the core solution CNN, one of the best CNN representatives You Only Look Once (YOLO), which breaks through the CNN family's tradition and innovates a complete new way of solving the object detection with most simple and high efficient way, is described in an article authored by Juan Du of New Research and Development Center of Hisense, Qingdao 266071, China, published 2018 in IOP Conf. Series: Journal of Physics: Conf. Series 1004 (2018) 012029 [doi: 10.1088/1742-6596/1004/1/012029], entitled: "*Understanding of Object Detection Based on CNN Family and YOLO*", which is incorporated in their entirety for all purposes as if fully set forth herein. As a key use of image processing, object detection has boomed along with the unprecedented advancement of Convolutional Neural Network (CNN) and its variants. When CNN series develops to Faster Region with CNN (R-CNN), the Mean Average Precision (mAP) has reached 76.4, whereas, the Frame Per Second (FPS) of Faster R-CNN remains 5 to 18 which is far slower than the real-time effect. Thus, the most urgent requirement of object detection improvement is to accelerate the speed. Its fastest speed has achieved the exciting unparalleled result with FPS 155, and its mAP can also reach up to 78.6, both of which have surpassed the performance of Faster R-CNN greatly.

YOLO9000 is a state-of-the-art, real-time object detection system that can detect over 9000 object categories, and is described in an article authored by Joseph Redmon and Ali Farhadi, published 2016 and entitled: "*YOLO9000: Better, Faster, Stronger*", which is incorporated in its entirety for all purposes as if fully set forth herein. The article proposes various improvements to the YOLO detection method, and the improved model, YOLOv2, is state-of-the-art on standard detection tasks like PASCAL VOC and COCO. Using a novel, multi-scale training method the same YOLOv2 model can run at varying sizes, offers an easy tradeoff between speed and accuracy. At 67 FPS, YOLOv2 gets 76.8 mAP on VOC 2007. At 40 FPS, YOLOv2 gets 78.6 mAP, outperforming state-of-the-art methods like Faster RCNN with ResNet and SSD while still running significantly faster.

A Tera-OPS streaming hardware accelerator implementing a YOLO (You-Only-Look-One) CNN for real-time object detection with high throughput and power efficiency, is described in an article authored by Duy Thanh Nguyen, Tuan Nghia Nguyen, Hyun Kim, and Hyuk-Jac Lee, published August 2019 [DOI: 10.1109/TVLSI.2019.2905242] in IEEE Transactions on Very Large Scale Integration (VLSI) Systems 27 (8), entitled: "*A High-Throughput and Power-Efficient FPGA Implementation of YOLO CNN for Object Detection*", which is incorporated in their entirety for all purposes as if fully set forth herein. Convolutional neural networks (CNNs) require numerous computations and external memory accesses. Frequent accesses to off-chip memory cause slow processing and large power dissipation. The parameters of the YOLO CNN are retrained and quantized with PASCAL VOC dataset using binary weight and flexible low-bit activation. The binary weight enables storing the entire network model in Block RAMs of a field programmable gate array (FPGA) to reduce off-chip accesses aggressively and thereby achieve significant performance enhancement. In the proposed design, all convolutional layers are fully pipelined for enhanced hardware utilization. The input image is delivered to the accelerator line by line. Similarly, the output from previous layer is transmitted to the next layer line by line. The intermediate data are fully reused across layers thereby eliminating external memory accesses. The decreased DRAM accesses reduce DRAM power consumption. Furthermore, as the convolutional layers are fully parameterized, it is easy to scale up the network. In this streaming design, each convolution layer is mapped to a dedicated hardware block. Therefore, it outperforms the "one-size-fit-all" designs in both performance and power efficiency. This CNN implemented using VC707 FPGA achieves a throughput of 1.877 TOPS at 200 MHz with batch processing while consuming 18.29 W of on-chip power, which shows the best power efficiency compared to previous research. As for object detection accuracy, it achieves a mean Average Precision (mAP) of 64.16% for PASCAL VOC 2007 dataset that is only 2.63% lower than the mAP of the same YOLO network with full precision.

R-CNN. Regions with CNN features (R-CNN) family is a family of machine learning models used to bypass the problem of selecting a huge number of regions. The R-CNN uses selective search to extract just 2000 regions from the image, referred to as region proposals. Then, instead of trying to classify a huge number of regions, only 2000 regions are handled. These 2000 region proposals are generated using a selective search algorithm, that includes Generating initial sub-segmentation for generating many candidate regions, using greedy algorithm to recursively combine similar regions into larger ones, and using the generated regions to produce the final candidate region proposals. These 2000 candidate region proposals are warped into a square and fed into a convolutional neural network that produces a 4096-dimensional feature vector as output. The CNN acts as a feature extractor and the output dense layer consists of the features extracted from the image and the extracted features are fed into an SVM to classify the presence of the object within that candidate region proposal. In addition to predicting the presence of an object within the region proposals, the algorithm also predicts four values which are offset values to increase the precision of the bounding box. For example, given a region proposal, the algorithm would have predicted the presence of a person but the face of that person within that region proposal could've been cut in half. Therefore, the offset values help in adjusting the bounding box of the region proposal.

The original goal of R-CNN was to take an input image and produce a set of bounding boxes as output, where each bounding box contains an object and also the category (e.g., car or pedestrian) of the object. Then R-CNN has been extended to perform other computer vision tasks. R-CNN is used with a given an input image, and begins by applying a mechanism called Selective Search to extract Regions Of Interest (ROI), where each ROI is a rectangle that may represent the boundary of an object in image. Depending on the scenario, there may be as many as two thousand ROIs. After that, each ROI is fed through a neural network to produce output features. For each ROI's output features, a collection of support-vector machine classifiers is used to determine what type of object (if any) is contained within the ROI. While the original R-CNN independently computed the neural network features on each of as many as two thousand regions of interest, Fast R-CNN runs the neural network once on the whole image. At the end of the network is a novel method called ROIPooling, which slices out each ROI from the network's output tensor, reshapes it, and classifies it. As in the original R-CNN, the Fast R-CNN uses Selective Search to generate its region proposals. While Fast R-CNN used Selective Search to generate ROIs, Faster R-CNN integrates the ROI generation into the neural network itself. Mask R-CNN adds instance segmentation, and also replaced ROIPooling with a new method called ROIAlign, which can represent fractions of a pixel, and Mesh R-CNN adds the ability to generate a 3D mesh from a 2D image. R-CNN and Fast R-CNN are primarily image classifier networks which are used for object detection by using Region Proposal method to generate potential bounding boxes in an image, run the classifier on these boxes, and after classification, perform post processing to tighten the boundaries of the bounding boxes and remove duplicates.

Regions with CNN features (R-CNN) that combines two key insights: (1) one can apply high-capacity convolutional neural networks (CNNs) to bottom-up region proposals in order to localize and segment objects and (2) when labeled training data is scarce, supervised pre-training for an auxiliary task, followed by domain-specific fine-tuning, yields a significant performance boost, is described in an article authored by Ross Girshick, Jeff Donahue, Trevor Darrell, and Jitendra Malik, published 2014 In Proc. IEEE Conf. on computer vision and pattern recognition (CVPR), pp. 580-587, entitled: "*Rich feature hierarchies for accurate object detection and semantic segmentation*", which is incorporated in its entirety for all purposes as if fully set forth herein. Object detection performance, as measured on the canonical PASCAL VOC dataset, has plateaued, and the best-performing methods are complex ensemble systems that typically combine multiple low-level image features with high-level context. The proposed R-CNN is a simple and scalable detection algorithm that improves mean average precision (mAP) by more than 30% relative to the previous best result on VOC 2012-achieving a mAP of 53.3%. Source code for the complete system is available at http://www.cs.berkeley.edu/rbg/renn.

Fast R-CNN. Fast R-CNN solves some of the drawbacks of R-CNN to build a faster object detection algorithm. Instead of feeding the region proposals to the CNN, the input image is fed to the CNN to generate a convolutional feature map. From the convolutional feature map, the regions of proposals are identified and warped into squares, and by using a RoI pooling layer they are reshaped into a fixed size so that it can be fed into a fully connected layer. From the RoI feature vector, a softmax layer is used to predict the class of the proposed region and also the offset values for the bounding box. The reason "Fast R-CNN" is faster than R-CNN is because 2000 region proposals don't have to be fed to the convolutional neural network every time. Instead, the convolution operation is done only once per image and a feature map is generated from it.

A Fast Region-based Convolutional Network method (Fast R-CNN) for object detection is disclosed in an article authored by Ross Girshick of Microsoft Research published 27 Sep. 2015 [arXiv: 1504.08083v2 [cs.CV]] In Proc. IEEE Intl. Conf. on computer vision, pp. 1440-1448. 2015, entitled: "*Fast R-CNN*", which is incorporated in its entirety for all purposes as if fully set forth herein. Fast R-CNN builds on previous work to efficiently classify object proposals using deep convolutional networks, and employs several innovations to improve training and testing speed while also increasing detection accuracy. Fast R-CNN trains the very deep VGG16 network 9× faster than R-CNN, is 213× faster at test-time, and achieves a higher mAP on PASCAL VOC 2012. Compared to SPPnet, Fast R-CNN trains VGG16 3× faster, tests 10× faster, and is more accurate. Fast R-CNN is implemented in Python and C++ (using Caffe) and is available under the open-source MIT License at https://github.com/rbgirshick/fast-renn.

Faster R-CNN. In Faster R-CNN, similar to Fast R-CNN, the image is provided as an input to a convolutional network which provides a convolutional feature map. However, instead of using selective search algorithm on the feature map to identify the region proposals, a separate network is used to predict the region proposals. The predicted region proposals are then reshaped using a RoI pooling layer which is then used to classify the image within the proposed region and predict the offset values for the bounding boxes.

A Region Proposal Network (RPN) that shares full-image convolutional features with the detection network, thus enabling nearly cost-free region proposals, is described in an article authored by Shaoqing Ren, Kaiming He, Ross Girshick, and Jian Sun, published 2015, entitled: "Faster R-CNN: Towards Real-Time Object Detection with Region Proposal networks", which is incorporated in its entirety for all purposes as if fully set forth herein. State-of-the-art object detection networks depend on region proposal algorithms to hypothesize object locations. Advances like SPP-net and Fast R-CNN have reduced the running time of these detection networks, exposing region proposal computation as a bottleneck. An RPN is a fully-convolutional network that simultaneously predicts object bounds and objectness scores at each position. RPNs are trained end-to-end to generate high quality region proposals, which are used by Fast R-CNN for detection. With a simple alternating optimization, RPN and Fast R-CNN can be trained to share convolutional features. For the very deep VGG-16 model, a described detection system has a frame rate of 5 fps (including all steps) on a GPU, while achieving state-of-the-art object detection accuracy on PASCAL VOC 2007 (73.2% mAP) and 2012 (70.4% mAP) using 300 proposals per image.

RetinaNet. RetinaNet is one of the one-stage object detection models that has proven to work well with dense and small-scale objects, that has become a popular object detection model to be used with aerial and satellite imagery. RetinaNet has been formed by making two improvements over existing single stage object detection models-Feature Pyramid Networks (FPN) and Focal Loss. Traditionally, in computer vision, featurized image pyramids have been used to detect objects with varying scales in an image. Featurized image pyramids are feature pyramids built upon image pyramids, where an image is subsampled into lower resolution and smaller size images (thus, forming a pyramid). Hand-engineered features are then extracted from each layer in the pyramid to detect the objects, which makes the pyramid scale-invariant. With the advent of deep learning, these hand-engineered features were replaced by CNNs. Later, the pyramid itself was derived from the inherent pyramidal hierarchical structure of the CNNs. In a CNN architecture, the output size of feature maps decreases after each successive block of convolutional operations, and forms a pyramidal structure.

FPN. Feature Pyramid Network (FPN) is an architecture that utilize the pyramid structure. In one example, pyramidal feature hierarchy is utilized by models such as Single Shot detector, but it doesn't reuse the multi-scale feature maps from different layers. Feature Pyramid Network (FPN) makes up for the shortcomings in these variations, and creates an architecture with rich semantics at all levels as it combines low-resolution semantically strong features with high-resolution semantically weak features, which is achieved by creating a top-down pathway with lateral connections to bottom-up convolutional layers. FPN is built in a fully convolutional fashion, which can take an image of an arbitrary size and output proportionally sized feature maps at multiple levels. Higher level feature maps contain grid cells that cover larger regions of the image and is therefore more suitable for detecting larger objects; on the contrary, grid cells from lower-level feature maps are better at detecting smaller objects. With the help of the top-down pathway and lateral connections, it is not required to use much extra computation, and every level of the resulting feature maps can be both semantically and spatially strong. These feature maps can be used independently to make predictions and thus contributes to a model that is scale-invariant and can provide better performance both in terms of speed and accuracy.

The construction of FPN involves two pathways which are connected with lateral connections: Bottom-up pathway and Top-down pathway and lateral connections. The bottom-up pathway of building FPN is accomplished by choosing the last feature map of each group of consecutive layers that output feature maps of the same scale. These chosen feature maps will be used as the foundation of the feature pyramid. Using nearest neighbor upsampling, the last feature map from the bottom-up pathway is expanded to the same scale as the second-to-last feature map. These two feature maps are then merged by element-wise addition to form a new feature map. This process is iterated until each feature map from the bottom-up pathway has a corresponding new feature map connected with lateral connections.

RetinaNet architecture incorporates FPN and adds classification and regression subnetworks to create an object detection model. There are four major components of a RetinaNet model architecture: (a) Bottom-up Pathway—The backbone network (e.g., ResNet) calculates the feature maps at different scales, irrespective of the input image size or the backbone; (b) Top-down pathway and Lateral connections—The top down pathway upsamples the spatially coarser feature maps from higher pyramid levels, and the lateral connections merge the top-down layers and the bottom-up layers with the same spatial size; (c) Classification subnetwork—It predicts the probability of an object being present at each spatial location for each anchor box and object class; and (d) Regression subnetwork—which regresses the offset for the bounding boxes from the anchor boxes for each ground-truth object.

Focal Loss (FL) is an enhancement over Cross-Entropy Loss (CE) and is introduced to handle the class imbalance problem with single-stage object detection models. Single Stage models suffer from an extreme foreground-background class imbalance problem due to dense sampling of anchor boxes (possible object locations). In RetinaNet, at each pyramid layer there can be thousands of anchor boxes. Only a few will be assigned to a ground-truth object while the vast majority will be background class. These easy examples (detections with high probabilities) although resulting in small loss values can collectively overwhelm the model. Focal Loss reduces the loss contribution from easy examples and increases the importance of correcting misclassified examples.

RetinaNet is a composite network composed of a backbone network called Feature Pyramid Net, which is built on top of ResNet and is responsible for computing convolutional feature maps of an entire image; a subnetwork responsible for performing object classification using the backbone's output; and a subnetwork responsible for performing bounding box regression using the backbone's output. RetinaNet adopts the Feature Pyramid Network (FPN) as its backbone, which is in turn built on top of ResNet (ResNet-50, ResNet-101 or ResNet-152) in a fully convolutional fashion. The fully convolutional nature enables the network to take an image of an arbitrary size and outputs proportionally sized feature maps at multiple levels in the feature pyramid.

The highest accuracy object detectors to date are based on a two-stage approach popularized by R-CNN, where a classifier is applied to a sparse set of candidate object locations. In contrast, one-stage detectors that are applied over a regular, dense sampling of possible object locations have the potential to be faster and simpler, but have trailed the accuracy of two-stage detectors thus far.

The extreme foreground-background class imbalance encountered during training of dense detectors is the central cause for these differences, as described in an article authored by Tsung-Yi Lin, Priya Goyal, Ross Girshick, Kaiming He, and Piotr Dollár, published 7 Feb. 2018 in IEEE Transactions on Pattern Analysis and Machine Intelligence. 42 (2): 318-327 [doi: 10.1109/TPAMI.2018.2858826; arXiv: 1708.02002v2 [cs.CV]], entitled: "*Focal Loss for Dense Object Detection*", which is incorporated in its entirety for all purposes as if fully set forth herein. This class imbalance may be addressed by reshaping the standard cross entropy loss such that it down-weights the loss assigned to well-classified examples. The Focal Loss focuses training on a sparse set of hard examples and prevents the vast number of easy negatives from overwhelming the detector during training. To evaluate the effectiveness of our loss, the paper discloses designing and training RetinaNet—a simple dense detector. The results show that when trained with the focal loss, RetinaNet is able to match the speed of previous one-stage detectors while surpassing the accuracy of all existing state-of-the-art two-stage detectors.

Feature pyramids are a basic component in recognition systems for detecting objects at different scales. Recent deep learning object detectors have avoided pyramid representations, in part because they are computing and memory intensive. The exploitation of inherent multi-scale, pyramidal hierarchy of deep convolutional networks to construct feature pyramids with marginal extra cost is described in an article authored by Tsung-Yi Lin, Piotr Dollár, Ross Girshick, Kaiming He, Bharath Hariharan, and Serge Belongie, published 19 Apr. 2017 [arXiv: 1612.03144v2 [cs.CV]], entitled: "*Feature Pyramid Networks for Object Detection*", which is incorporated in its entirety for all purposes as if fully set forth herein. A top-down architecture with lateral connections is developed for building high-level semantic feature maps at all scales. This architecture, called a Feature Pyramid Network (FPN), shows significant improvement as a generic feature extractor in several applications.

Object detection has gained great progress driven by the development of deep learning. Compared with a widely studied task—classification, generally speaking, object detection even needs one or two orders of magnitude more FLOPs (floating point operations) in processing the inference task. To enable a practical application, it is essential to explore effective runtime and accuracy trade-off scheme.

Recently, a growing number of studies are intended for object detection on resource constraint devices, such as YOLOv1, YOLOv2, SSD, MobileNetv2-SSDLite, whose accuracy on COCO test-dev detection results are yield to mAP around 22-25% (mAP-20-tier). On the contrary, very few studies discuss the computation and accuracy trade-off scheme for mAP-30-tier detection networks. The insights of why RetinaNet gives effective computation and accuracy trade-off for object detection, and how to build a light-weight RetinaNet, is illustrated in an article authored by Yixing Li and Fengbo Ren published 24 May 2019 [arXiv: 1905.10011v1 [cs.CV]] entitled: "*Light-Weight RetinaNet for Object Detection*", which is incorporated in its entirety for all purposes as if fully set forth herein. The article proposed reduced FLOPs in computational-intensive layers and keep other layer the same, shows a constantly better FLOPs-mAP trade-off line. Quantitatively, the proposed method results in 0.1% mAP improvement at 1.15×FLOPs reduction and 0.3% mAP improvement at 1.8×FLOPs reduction.

GNN. A Graph Neural Network (GNN) is a class of neural networks for processing data represented by graph data structures. Several variants of the simple Message Passing Neural Network (MPNN) framework have been proposed, and these models optimize GNNs for use on larger graphs and apply them to domains such as social networks, citation networks, and online communities. It has been mathematically proven that GNNs are a weak form of the Weisfeiler-Lehman graph isomorphism test, so any GNN model is at least as powerful as this test.

Graph Neural Networks (GNNs) are neural models that capture the dependence of graphs via message passing between the nodes of graphs, and are described in an article by Jie Zhou, Ganqu Cui, Shengding Hu, Zhengyan Zhang, Cheng Yang, Zhiyuan Liu, Lifeng Wang, Changcheng Li, and Maosong at Sun published AI Open 2021 [arXiv: 1812.08434 [cs.LG]], entitled: "*Graph neural networks: A review of methods and applications*", which is incorporated in its entirety for all purposes as if fully set forth herein. Variants of GNNs such as Graph Convolutional Network (GCN), Graph Attention Network (GAT), Graph Recurrent Network (GRN) have demonstrated ground-breaking performances on many deep learning tasks. A general design pipeline for GNN models and variants of each component, systematically categorize the applications, are described.

Graph Neural Networks (GNNs) are in the field of artificial intelligence due to their unique ability to ingest relatively unstructured data types as input data, and are described in an article authored by Isaac Ronald Ward, Jack Joyner, Casey Lickfold, Stash Rowe, Yulan Guo, and Mohammed Bennamoun, published 2020 [arXiv: 2010.05234 [cs.LG]] entitled: "A Practical Guide to Graph Neural Networks", which is incorporated in its entirety for all purposes as if fully set forth herein. Although some elements of the GNN architecture are conceptually similar in operation to traditional neural networks (and neural network variants), other elements represent a departure from traditional deep learning techniques. The article exposes the power and novelty of GNNs to the average deep learning enthusiast by collating and presenting details on the motivations, concepts, mathematics, and applications of the most common types of GNNs.

GraphNet is an example of a GNN. Recommendation systems that are widely used in many popular online services use either network structure or language features. A scalable and efficient recommendation system that combines both language content and complex social network structure is presented in an article authored by Rex Ying, Yuanfang Li, and Xin Li of Stanford University, published 2017 by Stanford University, entitled: "*GraphNet: Recommendation system based on language and network structure*", which is incorporated in its entirety for all purposes as if fully set forth herein. Given a dataset consisting of objects created and commented on by users, the system predicts other content that the user may be interested in. The efficacy of the system is presented through the task of recommending posts to reddit users based on their previous posts and comments. The language feature using GloVe vectors is extracted and sequential model, and use attention mechanism, multi-layer perceptron and max pooling to learn hidden representations for users and posts, so the method is able to achieve the state-of-the-art performance. The general framework consists of the following steps: (1) extract language features from contents of users; (2) for each user and post, sample intelligently a set of similar users and posts; (3) for each user and post, use a deep architecture to aggregate information from the features of its sampled similar users and posts and output a representation for each user and post, which captures both its language features and the network structure; and (4) use a loss function specific to the task to train the model.

Graph Neural Networks (GNNs) have achieved state-of-the-art results on many graph-analysis tasks such as node classification and link prediction. Unsupervised training of GNN pooling in terms of their clustering capabilities is described in an article by Anton Tsitsulin, John Palowitch, Bryan Perozzi, and Emmanuel Müller published 30 Jun. 2020 [arXiv: 2006.16904v1 [cs.LG]] entitled: "*Graph Clustering with Graph Neural Networks*", which is incorporated in its entirety for all purposes as if fully set forth herein. The article draws a connection between graph clustering and graph pooling: intuitively, a good graph clustering is expected from a GNN pooling layer. Counterintuitively, this is not true for state-of-the-art pooling methods, such as MinCut pooling. Deep Modularity Networks (DMON) is used to address these deficiencies, by using an unsupervised pooling method inspired by the modularity measure of clustering quality, so it tackles recovery of the challenging clustering structure of real-world graphs.

MobileNet. MobileNets is a class of efficient models for mobile and embedded vision applications, which are based on a streamlined architecture that uses depthwise separable convolutions to build light weight deep neural networks. Two simple global hyperparameters are used for efficiently trading off between latency and accuracy, allowing to choose the right sized model for their application based on the constraints of the problem. Extensive experiments on resource and accuracy tradeoffs and showing strong performance compared to other popular models on ImageNet classification are described in an article authored by Andrew G. Howard, Menglong Zhu, Bo Chen, Dmitry Kalenichenko, Weijun Wang, Tobias Weyand, Marco Andreetto, and Hartwig Adam of Google Inc., published 17 Apr. 2017 [arXiv: 1704.04861v1 [cs.CV]] entitled: "*MobileNets: Efficient Convolutional Neural Networks for Mobile Vision Applications*", which is incorporated in its entirety for all purposes as if fully set forth herein. The article demonstrates the effectiveness of MobileNets across a wide range of applications and use cases including object detection, fine-grain classification, face attributes and large scale geo-localization. The system uses an efficient network architecture and a set of two hyper-parameters in order to build very small, low latency models that can be easily matched to the design requirements for mobile and embedded vision applications, and describes the MobileNet architecture and two hyper-parameters width multiplier and resolution multiplier to define smaller and more efficient MobileNets.

A new mobile architecture, MobileNetV2, that is specifically tailored for mobile and resource constrained environments and improves the state-of-the-art performance of mobile models on multiple tasks and benchmarks as well as across a spectrum of different model sizes, is described in an article by Mark Sandler, Andrew Howard, Menglong Zhu, Andrey Zhmoginov, and Liang-Chich Chen of Google Inc., published 21 Mar. 2019 [arXiv: 1801.04381v4 [cs.CV]] entitled: "*MobileNetV2: Inverted Residuals and Linear Bottlenecks*", which is incorporated in its entirety for all purposes as if fully set forth herein. The article describes efficient ways of applying these mobile models to object detection in a novel framework referred to as SSDLite, and further demonstrates how to build mobile semantic segmentation models through a reduced form of DeepLabv3 (referred to as Mobile DeepLabv3), is based on an inverted residual structure where the shortcut connections are between the thin bottleneck layers. The intermediate expansion layer uses lightweight depth-wise convolutions to filter features as a source of non-linearity. The scheme allows for decoupling of the input/output domains from the expressiveness of the transformation, which provides a convenient framework for further analysis.

MobileNetV3 is tuned to mobile phone CPUs through a combination of hardware aware network architecture search (NAS) complemented by the NetAdapt algorithm and then subsequently improved through novel architecture advances. The next generation of MobileNets based on a combination of complementary search techniques as well as a novel architecture design, and is described in an article authored by Andrew Howard, Mark Sandler, Grace Chu, Liang-Chich Chen, Bo Chen, Mingxing Tan, Weijun Wang, Yukun Zhu, Ruoming Pang, Vijay Vasudevan, Quoc V. Le, and Hartwig Adam published 2019 [arXiv: 1905.02244 [cs.CV]] entitled: "*Searching for MobileNetV3*", which is incorporated in its entirety for all purposes as if fully set forth herein. This article describes the exploration of how automated search algorithms and network design can work together to harness complementary approaches improving the overall state of the art, and describes best possible mobile computer vision architectures optimizing the accuracy-latency trade off on mobile devices, by introducing (1) complementary search techniques, (2) new efficient versions of nonlinearities practical for the mobile setting. (3) new efficient network design, (4) a new efficient segmentation decoder.

U-Net. U-Net is a convolutional neural network that was developed for biomedical image segmentation at the Computer Science Department of the University of Freiburg. The network is based on the fully convolutional network and its architecture was modified and extended to work with fewer training images and to yield more precise segmentations. For example, segmentation of a 512×512 image takes less than a second on a modern GPU. The main idea is to supplement a usual contracting network by successive layers, where pooling operations are replaced by upsampling operators. These layers increase the resolution of the output, and a successive convolutional layer can then learn to assemble a precise output based on this information. One important modification in U-Net is that there are a large number of feature channels in the upsampling part, which allow the network to propagate context information to higher resolution layers. As a consequence, the expansive path is more or less symmetric to the contracting part, and yields a u-shaped architecture. The network only uses the valid part of each convolution without any fully connected layers. To predict the pixels in the border region of the image, the missing context is extrapolated by mirroring the input image. The network consists of a contracting path and an expansive path, which gives it the u-shaped architecture. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

Convolutional networks are powerful visual models that yield hierarchies of features, which when trained end-to-end, pixels-to-pixels, exceed the state-of-the-art in semantic segmentation, using a "fully convolutional" networks that take input of arbitrary size and produce correspondingly-sized output with efficient inference and learning. Such "fully convolutional" networks are described in an article authored by Jonathan Long, Evan Shelhamer, and Trevor Darrell, published Apr. 1 2017 in IEEE Transactions on Pattern Analysis and Machine Intelligence (Volume: 39, Issue: 4) [DOI: 10.1109/TPAMI.2016.2572683], entitled: "*Fully Convolutional Networks for Semantic Segmentation*", which is incorporated in its entirety for all purposes as if fully set forth herein. The article describes the space of fully convolutional networks, explains their application to spatially dense prediction tasks, and draws connections to prior models. A skip architecture is defined, that combines semantic information from a deep, coarse layer with appearance information from a shallow, fine layer to produce accurate and detailed segmentations. The article shows that a fully convolutional network (FCN) trained end-to-end, pixels-to-pixels on semantic segmentation exceeds the state-of-the-art without further machinery.

Convolutional neural networks can naturally operate on images, but have significant challenges in dealing with graph data. Given images are special cases of graphs with nodes lie on 2D lattices, graph embedding tasks have a natural correspondence with image pixelwise prediction tasks such as segmentation. While encoder-decoder architectures like U-Nets have been successfully applied on many image pixelwise prediction tasks, similar methods are lacking for graph data, since pooling and up-sampling operations are not natural on graph data. An encoder-decoder model on graph, known as the graph U-Nets and based on gPool and gUnpool layers, is described in an article authored by Hongyang Gao and Shuiwang Ji published 2019 [arXiv: 1905.05178 [cs.LG]] entitled: "*Graph U-Nets*", which is incorporated in its entirety for all purposes as if fully set forth herein. The gPool layer adaptively selects some nodes to form a smaller graph based on their scalar projection values on a trainable projection vector. The gUnpool layer as the inverse operation of the gPool layer. The gUnpool layer restores the graph into its original structure using the position information of nodes selected in the corresponding gPool layer.

A network and training strategy that relies on the strong use of data augmentation to use the available annotated samples more efficiently is described in an article authored by Olaf Ronneberger, Philipp Fischer, and Thomas Brox, published 18 May 2015 in Medical Image Computing and Computer-Assisted Intervention (MICCAI), Springer, LNCS, Vol. 9351:234-241 [arXiv: 1505.04597v1 [cs.CV]], entitled: "*U-Net: Convolutional Networks for Biomedical*

*Image Segmentation*", which is incorporated in its entirety for all purposes as if fully set forth herein. The architecture consists of a contracting path to capture context and a symmetric expanding path that enables precise localization. Such a network can be trained end-to-end from very few images and outperforms the prior best method (a sliding-window convolutional network) on the ISBI challenge for segmentation of neuronal structures in electron microscopic stacks. The architecture further works with very few training images and yields more precise segmentations. The main idea in is to supplement a usual contracting network by successive layers, where pooling operators are replaced by upsampling operators. Hence, these layers increase the resolution of the output. In order to localize, high resolution features from the contracting path are combined with the upsampled output. A successive convolution layer can then learn to assemble a more precise output based on this information. One important modification in our architecture is that in the upsampling part there is a large number of feature channels, which allow the network to propagate context information to higher resolution layers. As a consequence, the expansive path is more or less symmetric to the contracting path, and yields a u-shaped architecture. The network does not have any fully connected layers and only uses the valid part of each convolution, i.e., the segmentation map only contains the pixels, for which the full context is available in the input image.

VGG Net. VGG Net is a pre-trained Convolutional Neural Network (CNN) invented by Simonyan and Zisserman from Visual Geometry Group (VGG) at University of Oxford, described in an article published 2015 [arXiv: 1409.1556 [cs.CV]] as a conference paper at ICLR 2015 entitled: "*Very Deep Convolutional Networks for Large-Scale Image Recognition*", which is incorporated in its entirety for all purposes as if fully set forth herein. The VGG Net extracts the features (feature extractor) that can distinguish the objects and is used to classify unseen objects, and was invented with the purpose of enhancing classification accuracy by increasing the depth of the CNNs. VGG 16 and VGG 19, having 16 and 19 weight layers, respectively, have been used for object recognition. VGG Net takes input of 224×224 RGB images and passes them through a stack of convolutional layers with the fixed filter size of 3×3 and the stride of 1. There are five max pooling filters embedded between convolutional layers in order to down-sample the input representation. The stack of convolutional layers are followed by 3 fully connected layers, having 4096, 4096 and 1000 channels, respectively, and the last layer is a soft-max layer. A thorough evaluation of networks of increasing depth is using an architecture with very small (3×3) convolution filters, which shows that a significant improvement on the prior-art configurations can be achieved by pushing the depth to 16-19 weight layers.

The VGG16 model achieves 92.7% top-5 test accuracy in ImageNet, which is a dataset of over 14 million images belonging to 1000 classes, and is described in an article published 20 Nov. 2018 in 'Popular networks', entitled: "*VGG16-Convolutional Network for Classification and Detection*", which is incorporated in its entirety for all purposes as if fully set forth herein. The input to cov1 layer is of fixed size 224×224 RGB image. The image is passed through a stack of convolutional (conv.) layers, where the filters were used with a very small receptive field: 3×3 (which is the smallest size to capture the notion of left/right, up/down, and center). In one of the configurations, it also utilizes 1×1 convolution filters, which can be seen as a linear transformation of the input channels (followed by non-linearity). The convolution stride is fixed to 1 pixel; the spatial padding of conv. layer input is such that the spatial resolution is preserved after convolution, i.e., the padding is 1-pixel for 3×3 conv. layers. Spatial pooling is carried out by five max-pooling layers, which follow some of the conv. layers (not all the conv. layers are followed by max-pooling). Max-pooling is performed over a 2×2 pixel window, with stride 2. Three Fully-Connected (FC) layers follow a stack of convolutional layers (which has a different depth in different architectures): the first two have 4096 channels each, the third performs 1000-way ILSVRC classification and thus contains 1000 channels (one for each class). The final layer is the soft-max layer. The configuration of the fully connected layers is the same in all networks. All hidden layers are equipped with the rectification (ReLU) non-linearity. It is also noted that none of the networks (except for one) contain Local Response Normalization (LRN), such normalization does not improve the performance on the ILSVRC dataset, but leads to increased memory consumption and computation time.

SIFT. The Scale-Invariant Feature Transform (SIFT) is a computer vision algorithm to detect, describe, and match local features in images, invented by David Lowe in 1999, and used in applications that include object recognition, robotic mapping and navigation, image stitching, 3D modeling, gesture recognition, video tracking, individual identification of wildlife and match moving. SIFT keypoints of objects are first extracted from a set of reference images and stored in a database. An object is recognized in a new image by individually comparing each feature from the new image to this database and finding candidate matching features based on Euclidean distance of their feature vectors. From the full set of matches, subsets of keypoints that agree on the object and its location, scale, and orientation in the new image are identified to filter out good matches. The determination of consistent clusters is performed rapidly by using an efficient hash table implementation of the generalised Hough transform. Each cluster of 3 or more features that agree on an object and its pose is then subject to further detailed model verification and subsequently outliers are discarded. Finally, the probability that a particular set of features indicates the presence of an object is computed, given the accuracy of fit and number of probable false matches. Object matches that pass all these tests can be identified as correct with high confidence.

For any object in an image, interesting points on the object can be extracted to provide a "feature description" of the object. This description, extracted from a training image, can then be used to identify the object when attempting to locate the object in a test image containing many other objects. To perform reliable recognition, it is important that the features extracted from the training image be detectable even under changes in image scale, noise and illumination. Such points usually lie on high-contrast regions of the image, such as object edges. Another important characteristic of these features is that the relative positions between them in the original scene shouldn't change from one image to another. For example, if only the four corners of a door were used as features, they would work regardless of the door's position; but if points in the frame were also used, the recognition would fail if the door is opened or closed. Similarly, features located in articulated or flexible objects would typically not work if any change in their internal geometry happens between two images in the set being processed. However, in practice SIFT detects and uses a much larger number of features from the images, which reduces the contribution of the errors caused by these local variations in the average error of all feature matching errors.

SIFT transforms an image into a large collection of feature vectors, each of which is invariant to image translation, scaling, and rotation, partially invariant to illumination changes, and robust to local geometric distortion. These features share similar properties with neurons in the primary visual cortex that are encoding basic forms, color, and movement for object detection in primate vision. Key locations are defined as maxima and minima of the result of difference of Gaussians function applied in scale space to a series of smoothed and resampled images. Low-contrast candidate points and edge response points along an edge are discarded. Dominant orientations are assigned to localized key points. These steps ensure that the key points are more stable for matching and recognition. SIFT descriptors robust to local affine distortion are then obtained by considering pixels around a radius of the key location, blurring, and resampling local image orientation planes.

A SIFT method for extracting distinctive invariant features from images that can be used to perform reliable matching between different views of an object or scene is described in a paper by David G. Lowe of the Keypoints Computer Science Department University of British Columbia Vancouver, B.C., Canada, entitled: "*Distinctive Image Features from Scale-Invariant*", published Jan. 5, 2004 [International Journal of Computer Vision, 2004], which is incorporated in its entirety for all purposes as if fully set forth herein. The features are invariant to image scale and rotation, and are shown to provide robust matching across a a substantial range of affine distortion, change in 3D viewpoint, addition of noise, and change in illumination. The features are highly distinctive, in the sense that a single feature can be correctly matched with high probability against a large database of features from many images. This paper also describes an approach to using these features for object recognition. The recognition proceeds by matching individual features to a database of features from known objects using a fast nearest-neighbor algorithm, followed by a Hough transform to identify clusters belonging to a single object, and finally performing verification through least-squares solution for consistent pose parameters.

Scale Invariant Feature Transform (SIFT) is an image descriptor for image-based matching and recognition, and is described in a paper by Tony Lindeberg entitled: "*Scale Invariant Feature Transform*", published May 2012 [DOI: 10.4249/scholarpedia. 10491], which is incorporated in its entirety for all purposes as if fully set forth herein. This descriptor as well as related image descriptors are used for a large number of purposes in computer vision related to point matching between different views of a 3-D scene and view-based object recognition. The SIFT descriptor is invariant to translations, rotations and scaling transformations in the image domain and robust to moderate perspective transformations and illumination variations. Experimentally, the SIFT descriptor has been proven to be very useful in practice for image matching and object recognition under real-world conditions. In its original formulation, the SIFT descriptor comprised a method for detecting interest points from a greylevel image at which statistics of local gradient directions of image intensities were accumulated to give a summarizing description of the local image structures in a local neighbourhood around each interest point, with the intention that this descriptor should be used for matching corresponding interest points between different images. Later, the SIFT descriptor has also been applied at dense grids (dense SIFT) which have been shown to lead to better performance for tasks such as object categorization, texture classification, image alignment and biometrics. The SIFT descriptor has also been extended from grey-level to colour images and from 2-D spatial images to 2+1-D spatio-temporal video.

A method and apparatus for identifying scale invariant features in an image and a further method and apparatus for using such scale invariant features to locate an object in an image are disclosed in U.S. Pat. No. 6,711,293 to Lowe entitled: "Method and apparatus for identifying scale invariant features in an image and use of same for locating an object in an image", which is incorporated in its entirety for all purposes as if fully set forth herein. The method and apparatus for identifying scale invariant features may involve the use of a processor circuit for producing a plurality of component subregion descriptors for each subregion of a pixel region about pixel amplitude extrema in a plurality of difference images produced from the image. This may involve producing a plurality of difference images by blurring an initial image to produce a blurred image and by subtracting the blurred image from the initial image to produce the difference image. For each difference image, pixel amplitude extrema are located and a corresponding pixel region is defined about each pixel amplitude extremum. Each pixel region is divided into subregions and a plurality of component subregion descriptors are produced for each subregion. These component subregion descriptors are correlated with component subregion descriptors of an image under consideration and an object is indicated as being detected when a sufficient number of component subregion descriptors (scale invariant features) define an aggregate correlation exceeding a threshold correlation with component subregion descriptors (scale invariant features) associated with the object.

SURF. Speeded-Up Robust Features (SURF) is a local feature detector and descriptor, that can be used for tasks such as object recognition, image registration, classification, or 3D reconstruction. It is partly inspired by the scale-invariant feature transform (SIFT) descriptor. The standard version of SURF is several times faster than SIFT and claimed to be more robust against different image transformations than SIFT. To detect interest points, SURF uses an integer approximation of the determinant of Hessian blob detector, which can be computed with 3 integer operations using a precomputed integral image. Its feature descriptor is based on the sum of the Haar wavelet response around the point of interest. These can also be computed with the aid of the integral image. SURF descriptors have been used to locate and recognize objects, people or faces, to reconstruct 3D scenes, to track objects and to extract points of interest. The image is transformed into coordinates, using the multi-resolution pyramid technique, to copy the original image with Pyramidal Gaussian or Laplacian Pyramid shape to obtain an image with the same size but with reduced bandwidth. This achieves a special blurring effect on the original image, called Scale-Space and ensures that the points of interest are scale invariant.

A scale- and rotation-invariant interest point detector and descriptor, coined SURF (Speeded Up Robust Features), is described in a paper by Herbert Bay, Andreas Ess, Tinne Tuytelaars, and Luc Van Gool, all of ETH Zurich, entitled: "*SURF: Speeded Up Robust Features*", presented at the ECCV 2006 conference and published 2008 at Computer Vision and Image Understanding (CVIU), Vol. 110, No. 3, pp. 346-359, 2008, which is incorporated in its entirety for all purposes as if fully set forth herein. The SURF approximates or even outperforms previously proposed schemes with respect to repeatability, distinctiveness, and robustness, yet can be computed and compared much faster. This is achieved by relying on integral images for image convolutions; by building on the strengths of the leading existing detectors and descriptors (in casu, using a Hessian matrix-based measure for the detector, and a distribution-based descriptor); and by simplifying these methods to the essential. This leads to a combination of novel detection, description, and matching steps. The paper presents experimental results on a standard evaluation set, as well as on imagery obtained in the context of a real-life object recognition application. Both show SURF's strong performance.

Methods and apparatus for operating on images, in particular methods and apparatus for interest point detection and/or description working under different scales and with different rotations, e.g., for scale-invariant and rotation-invariant interest point detection and/or description, are disclosed in U.S. Pat. No. 8,165,401 to Funayama et al. entitled: "Robust interest point detector and descriptor", which is incorporated in its entirety for all purposes as if fully set forth herein. The described invention can provide improved or alternative apparatus and methods for matching interest points either in the same image or in a different image. The described invention can provide alternative or improved software for implementing any of the methods of the invention. The described invention can provide alternative or improved data structures created by multiple filtering operations to generate a plurality of filtered images as well as data structures for storing the filtered images themselves, e.g., as stored in memory or transmitted through a network. The described invention can provide alternative or improved data structures including descriptors of interest points in images, e.g., as stored in memory or transmitted through a network as well as data structures associating such descriptors with an original copy of the image or an image derived therefrom, e.g., a thumbnail image.

FAST. Features from Accelerated Segment Test (FAST) is a corner detection method, which could be used to extract feature points and later used to track and map objects in many computer vision tasks. The most promising advantage of the FAST corner detector is its computational efficiency, where it is indeed faster than many other well-known feature extraction methods, such as Difference of Gaussians (DoG) used by the SIFT, SUSAN, and Harris detectors. Moreover, when machine learning techniques are applied, superior performance in terms of computation time and resources can be realized.

FAST is described in a paper by Edward Rosten and Tom Drummond of the Department of Engineering, Cambridge University, UK, published 2006 in Computer Vision-ECCV 2006 [Lecture Notes in Computer Science. Vol. 3951. pp. 430-443. doi: 10.1007/11744023_34; ISBN 978-3-540-33832-1. S2CID 1388140], entitled: "*Machine Learning for High-speed Corner Detection*", which is incorporated in its entirety for all purposes as if fully set forth herein. Where feature points are used in real-time frame-rate applications, a high-speed feature detector is necessary. Feature detectors such as SIFT (DoG), Harris, and SUSAN are good methods which yield high-quality features, however they are too computationally intensive for use in real-time applications of any complexity. The paper shows that machine learning can be used to derive a feature detector which can fully process live PAL video using less than 7% of the available processing time. By comparison neither the Harris detector (120%) nor the detection stage of SIFT (300%) can operate at full frame rate. Clearly a high-speed detector is of limited use if the features produced are unsuitable for downstream processing. In particular, the same scene viewed from two different positions should yield features which correspond to the same real-world 3D locations. The paper further provides a comparison of corner detectors based on this criterion applied to 3D scenes. This comparison supports a number of claims made elsewhere concerning existing corner detectors.

FAST is further described in an article published in IEEE Transactions on Pattern Analysis and Machine Intelligence (Volume: 32, Issue: 1, January 2010) [DOI: 10.1109/TPAMI.2008.275] entitled: "*FASTER and better: A Machine Learning Approach to Corner Detection*", which is incorporated in its entirety for all purposes as if fully set forth herein. The repeatability and efficiency of a corner detector determines how likely it is to be useful in a real-world application. The repeatability is important because the same scene viewed from different positions should yield features which correspond to the same real-world 3D locations. The efficiency is important because this determines whether the detector combined with further processing can operate at frame rate. Three advances are described in this article. First, a new heuristic for feature detection is presented and, using machine learning, a feature detector is derived which can fully process live PAL video using less than 5 percent of the available processing time. By comparison, most other detectors cannot even operate at frame rate (Harris detector 115 percent, SIFT 195 percent). Second, the article generalizes the detector, allowing it to be optimized for repeatability, with little loss of efficiency. Third, the article carries out a rigorous comparison of corner detectors based on the above repeatability criterion applied to 3D scenes, and shows that, despite being principally constructed for speed, on these stringent tests, the heuristic detector significantly outperforms existing feature detectors. Finally, the comparison demonstrates that using machine learning produces significant improvements in repeatability, yielding a detector that is both very fast and of very high quality.

In one example, part of, or all of, the steps, methods, or flow charts described herein are executed (independently or in cooperation) by a client device, or any device such as the device 35 shown in FIG. 3. Alternatively or in addition, part of, or all of, the steps, methods, or flow charts described herein are executed (independently or in cooperation) by a server device, such as server 24 shown as part on the arrangement 30 shown in FIG. 3. In one example, a client device (such as the device 35) and a server (such as the server 24) cooperatively perform part of, or all of, the steps, methods, or flow charts described herein. For example, lower computing power processor 26 may be used in the device 35, since the heavy or resourceful computations are performed at a remote server. Such scheme may obviate the need for expensive and resourceful device. In another example, memory resources may be saved at the client device by using data stored at a server. The storage 33 in the device 35 may store the Instructions 37a and the Operating System 37b. The device 35 may mainly be used for interfacing the user 36, while the major storing and processing resources and activities are provided by the server 24.

The output component 34 may include a color display for displaying screen elements or for organizing on-screen items and controls for data entry. Further, the device may support the display of split-screen views. The input component 38 may include dedicated hard controls for frequently used/accessed functions (e.g., repeat system message). Many systems used re-configurable keys/buttons whose function change depending on the application. For example, a switch may be used to activate the voice recognition system and it may increase system reliability. The input component 38 and the output component 34 may further cooperate to provide both auditory and visual feedback to confirm driver inputs and availability of the speech command. Further, a strategy to alert drivers through auditory tones/beeps in advance of the presentation of information, and/or changes in display status, may be used. This may limit the need for drivers to continuously monitor the system, or repeat system messages.

The device 35 may serve as a client device and may access data, such as retrieving data from, or sending data to, the server 24 over the Internet 25, such as via an ISP. The communication with the server 24 may be via a wireless network 39, by using the antenna 29 and the wireless transceiver 28 in the device 35.

A diagrammatic representation of a machine in the example forms of the computing device 35 within which a set of instructions, for causing the machine to perform any one or more of the methods discussed herein, may be executed. An example of the device 35 that may be used with any of the steps, methods, or flow-charts herein is schematically described as part of an arrangement 30 shown in FIG. 3. The components in the device 35 communicate over a bus 32. The computing device 35 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in an LAN, an intranet, an extranet, or the Internet. The machine may operate in the capacity of a server machine in client-server network environment. The machine may be a Personal Computer (PC), a Set-Top Box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The device 35 may also include an interface bus for facilitating communication from various interface devices (for example, one or more output components 34, one or more peripheral interfaces, and one or more communication components such as the wireless transceiver 28) to the basic configuration via the bus/interface controller that controls the bus 32. Some of the example output components include a graphics processing unit and an audio processing unit, which may be configured to communicate to various external devices such as a display or speakers via one or more A/V ports. One or more example peripheral interfaces may include a serial interface controller or a parallel interface controller, which may be configured to communicate with external devices such as input components (for example, keyboard, mouse, pen, voice input device, touch input device, etc.) or other peripheral output devices (for example, printer, scanner, etc.) via one or more I/O ports.

The device 35 may be part of, may include, or may be integrated with, a general-purpose computing device, arranged in accordance with at least some embodiments described herein. In an example basic configuration, the device 35 may include one or more processors 26 and one or more memories or any other computer readable media. A dedicated memory bus may be used to communicate between the processor 26 and the device memories, such as the ROM 31b, the main memory 31a, and a storage 33.

Depending on the desired configuration, the processor 26 may be of any type, including but not limited to a microprocessor (µP), a microcontroller (µC), a digital signal processor (DSP), or any combination thereof. The processor 26 may include one or more levels of caching, such as a cache memory, a processor core, and registers. The example processor core may include an arithmetic logic unit (ALU), a floating-point unit (FPU), a digital signal processing core (DSP Core), or any combination thereof. An example memory controller may also be used with the processor 26, or in some implementations, the memory controller may be an internal part of the processor 26.

Depending on the desired configuration, the device memories may be of any type including but not limited to volatile memory (such as RAM), non-volatile memory (such as ROM, flash memory, etc.) or any combination thereof. The storage 33 may correspond to the storage device 31a, and may be part of, may comprise, or may be integrated with the ROM 31b and the main memory 31a. The storage 33 may include an operating system 37b, instruction set 37a that may include steps or part of, or whole of, the flow-charts described herein. The storage 33 may further include a control module, and program data, which may include path data. Any of the memories or storages of the device 35 may include read-only memory (ROM), such as ROM 31b, flash memory, Dynamic Random Access Memory (DRAM) such as synchronous DRAM (SDRAM), a static memory (e.g., flash memory, static random-access-memory (SRAM)) and a data storage device, which communicate with each other via the bus 32.

The device 35 may have additional features or functionality, and additional interfaces to facilitate communications between the basic configuration shown in FIG. 3 and any desired devices and interfaces. For example, a bus/interface controller may be used to facilitate communications between the basic configuration and one or more data storage devices via a storage interface bus. The data storage devices may be one or more removable storage devices, one or more non-removable storage devices, or a combination thereof. Examples of the removable storage and the non-removable storage devices include magnetic disk devices such as flexible disk drives and hard-disk drives (HDDs), optical disk drives such as compact disk (CD) drives or Digital-Versatile-Disk (DVD) drives, Solid-State Drives (SSDs), and tape drives to name a few. Example computer storage media may include volatile and nonvolatile, removable and non-removable media implemented in any method or technology for storage of information, such as computer readable instructions, data structures, program modules, or other data.

The device 35 may receive inputs from a user 36 via an input component 38, which may correspond with the input device 18 or cursor control 18a shown as part of the computer 11 in FIG. 1. In one example, the input component 38 may be used for receiving instructions from the user 36. The device 35 notifies or outputs information to the user 36 using an output component 34, which may correspond to the display 17 shown as part of the computer 11 in FIG. 1. In one example, the output component 34 may be used for displaying guidance to the user 36.

The interface with the user 36 may be based on the input component 38 and the output component 34. For example, receiving input (visually or acoustically) from the user 36 via the input component 38. Similarly, outputting data (visually or acoustically) to the user 36 via the output component 34. The input component 38 may be a piece of computer hardware equipment used to provide data and control signals to an information processing system such as a computer or information appliance. Such input component 38 may be an integrated or a peripheral input device (e.g., hard/soft keyboard, mouse, resistive or capacitive touch display, etc.). Examples of input components include keyboards, mouse, scanners, digital cameras and joysticks. Input components 38 can be categorized based on the modality of input (e.g., mechanical motion, audio, visual, etc.), whether the input is discrete (e.g., pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input components used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

In the case of wireless networking, the wireless network 39 may use any type of modulation, such as Amplitude Modulation (AM), a Frequency Modulation (FM), or a Phase Modulation (PM). Further, the wireless network 39 may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in a wireless transceiver is SPBT2632C1A Bluetooth module available from STMicroelectronics NV and described in the data sheet DoclD022930 Rev. 6 dated April 2015 entitled: "*SPBT2632C1A-Bluetooth® technology class-1 module*", which is incorporated in its entirety for all purposes as if fully set forth herein.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20: "*Wireless Technologies*" of the publication number 1-587005-001-3 by Cisco Systems, Inc. (7/99) entitled: "*Internetworking Technologies Handbook*", which is incorporated in its entirety for all purposes as if fully set forth herein.

Alternatively or in addition, the networking or the communication with the of the wireless-capable device 35 with the server 24 over the wireless network 39 may be using, may be according to, may be compatible with, or may be based on, Near Field Communication (NFC) using passive or active communication mode, and may use the 13.56 MHz frequency band, and data rate may be 106 Kb/s, 212 Kb/s, or 424 Kb/s, and the modulation may be Amplitude-Shift-Keying (ASK), and may be according to, may be compatible with, or based on, ISO/IEC 18092, ECMA-340, ISO/IEC 21481, or ECMA-352. In such a case, the wireless transceiver 28 may be an NFC transceiver and the respective antenna 29 may be an NFC antenna.

Alternatively or in addition, the networking or the communication with the of the wireless-capable device 35 with the server 24 over the wireless network 39 may be using, may be according to, may be compatible with, or may be based on, a Wireless Personal Area Network (WPAN) that may be according to, may be compatible with, or based on, Bluetooth™ or IEEE 802.15.1-2005 standards, and the wireless transceiver 28 may be a WPAN modem, and the respective antenna 29 may be a WPAN antenna. The WPAN may be a wireless control network according to, may be compatible with, or based on, ZigBee™ or Z-Wave™ standards, such as IEEE 802.15.4-2003.

Alternatively or in addition, the networking or the communication with the of the wireless-capable device 35 with the server 24 over the wireless network 39 may be using, may be according to, may be compatible with, or may be based on, a Wireless Local Area Network (WLAN) that may be according to, may be compatible with, or based on, IEEE 802.11a, IEEE 802.11b, IEEE 802.11g, IEEE 802.11n, or IEEE 802.11ac standards, and the wireless transceiver 28 may be a WLAN modem, and the respective antenna 29 may be a WLAN antenna.

Alternatively or in addition, the networking or the communication with the of the wireless-capable device 35 with the server 24 over the wireless network 39 may be using, may be according to, may be compatible with, or may be based on, a wireless broadband network or a Wireless Wide Area Network (WWAN), and the wireless transceiver 28 may be a WWAN modem, and the respective antenna 29 may be a WWAN antenna. The WWAN may be a WiMAX network such as according to, may be compatible with, or based on, IEEE 802.16-2009, and the wireless transceiver 28 may be a WiMAX modem, and the respective antenna 29 may be a WiMAX antenna. Alternatively or in addition, the WWAN may be a cellular telephone network and the wireless transceiver 28 may be a cellular modem, and the respective antenna 29 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on, or may be compatible with, IEEE 802.20-2008. Alternatively or in addition, the WWAN may be a satellite network, and the wireless transceiver 28 may be a satellite modem, and the respective antenna 29 may be a satellite antenna.

Alternatively or in addition, the networking or the communication with the of the wireless-capable device 35 with the server 24 over the wireless network 39 may be using, may be according to, may be compatible with, or may be based on, a licensed or an unlicensed radio frequency band, such as the Industrial, Scientific and Medical (ISM) radio band. For example, an unlicensed radio frequency band may be used that may be about 60 GHZ, may be based on beamforming, and may support a data rate of above 7 Gb/s, such as according to, may be compatible with, or based on, WiGig™, IEEE 802.11ad, WirelessHD™ or IEEE 802.15.3c-2009, and may be operative to carry uncompressed video data, and may be according to, may be compatible with, or based on, WHDI™. Alternatively or in addition, the wireless network may use a white space spectrum that may be an analog television channel consisting of a 6 MHZ, 7 MHz or 8 MHz frequency band, and allocated in the 54-806 MHz band. The wireless network may be operative for channel bonding, and may use two or more analog television channels, and may be based on Wireless Regional Area Network (WRAN) standard using OFDMA modulation. Further, the wireless communication may be based on geographically-based cognitive radio, and may be according to, may be compatible with, or based on, IEEE 802.22 or IEEE 802.11af standards.

Display. The Output Component 34 may include a display for presentation of visual data or information, commonly on a screen. A display typically consists of an array of light emitters (typically in a matrix form), and commonly provides a visual depiction of a single, integrated, or organized set of information, such as text, graphics, image or video. A display may be a monochrome (a.k.a. black-and-white) type, which typically displays two colors, one for the background and one for the foreground. A display may be a gray-scale type, which is capable of displaying different shades of gray, or may be a color type, capable of displaying multiple colors, anywhere from 16 to over many millions different colors, and may be based on Red, Green, and Blue (RGB) separate signals. A video display is designed for presenting video content. The screen is the actual location where the information is actually optically visualized by humans. The screen may be an integral part of the display. Alternatively or in addition, the display may be an image or video projector, that projects an image (or a video consisting of moving images) onto a screen surface, which is a separate component and is not mechanically enclosed with the display housing. Most projectors create an image by shining a light through a small transparent image, but some newer types of projectors can project the image directly, by using lasers. A projector may be based on an Eidophor, Liquid Crystal on Silicon (LCOS or LCOS), or LCD, or may use Digital Light Processing (DLP™) technology, and may further be MEMS based. A virtual retinal display, or retinal projector, is a projector that projects an image directly on the retina instead of using an external projection screen. Common display resolutions used today include SVGA (800×600 pixels), XGA (1024×768 pixels), 720p (1280×720 pixels), and 1080p (1920×1080 pixels). Standard-Definition (SD) standards, such as used in SD Television (SDTV), are referred to as 576i, derived from the European-developed PAL and SECAM systems with 576 interlaced lines of resolution; and 480i, based on the American National Television System Committee (ANTSC) NTSC system. High-Definition (HD) video refers to any video system of higher resolution than standard-definition (SD) video, and most commonly involves display resolutions of 1,280×720 pixels (720p) or 1,920×1,080 pixels (1080i/1080p). A display may be a 3D (3-Dimensions) display, which is the display device capable of conveying a stereoscopic perception of 3-D depth to the viewer. The basic technique is to present offset images that are displayed separately to the left and right eye. Both of these 2-D offset images are then combined in the brain to give the perception of 3-D depth. The display may present the information as scrolling, static, bold or flashing.

A display may be an analog display having an analog signal input. Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Alternatively or in addition, a display may be a digital display, having a digital input interface. Standard digital interfaces such as an IEEE1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video and DVB (Digital Video Broadcast). In some cases, an adaptor is required in order to connect an analog display to the digital data. For example, the adaptor may convert between composite video (PAL, NTSC) or S-Video and DVI or HDTV signal. Various user controls can be available to allow the user to control and effect the display operations, such as an on/off switch, a reset button and others. Other exemplary controls involve display associated settings such as contrast, brightness and zoom.

A display may be a Cathode-Ray Tube (CRT) display, which is based on moving an electron beam back and forth across the back of the screen. Such a display commonly comprises a vacuum tube containing an electron gun (a source of electrons), and a fluorescent screen used to view images. It further has a means to accelerate and deflect the electron beam onto the fluorescent screen to create the images. Each time the beam makes a pass across the screen, it lights up phosphor dots on the inside of the glass tube, thereby illuminating the active portions of the screen. By drawing many such lines from the top to the bottom of the screen, it creates an entire image. A CRT display may be a shadow mask or an aperture grille type.

A display may be a Liquid Crystal Display (LCD) display, which utilize two sheets of polarizing material with a liquid crystal solution between them. An electric current passed through the liquid causes the crystals to align so that light cannot pass through them. Each crystal, therefore, is like a shutter, either allowing a backlit light to pass through or blocking the light. In monochrome LCD, images usually appear as blue or dark gray images on top of a grayish-white background. Color LCD displays commonly use passive matrix and Thin Film Transistor (TFT) (or active-matrix) for producing color. Recent passive-matrix displays are using new CSTN and DSTN technologies to produce sharp colors rivaling active-matrix displays.

Some LCD displays use Cold-Cathode Fluorescent Lamps (CCFLs) for backlight illumination. An LED-backlit LCD is a flat panel display that uses LED backlighting instead of the cold cathode fluorescent (CCFL) backlighting, allowing for a thinner panel, lower power consumption, better heat dissipation, a brighter display, and better contrast levels. Three forms of LED may be used: White edge-LEDs around the rim of the screen, using a special diffusion panel to spread the light evenly behind the screen (the most usual form currently), an array of LEDs arranged behind the screen whose brightness are not controlled individually, and a dynamic "local dimming" array of LEDs that are controlled individually or in clusters to achieve a modulated backlight light pattern. A Blue Phase Mode LCD is an LCD technology that uses highly twisted cholesteric phases in a blue phase, in order to improve the temporal response of liquid crystal displays (LCDs).

A Field Emission Display (FED) is a display technology that uses large-area field electron emission sources to provide the electrons that strike colored phosphor, to produce a color image as an electronic visual display. In a general sense, a FED consists of a matrix of cathode ray tubes, each tube producing a single sub-pixel, grouped in threes to form red-green-blue (RGB) pixels. FEDs combine the advantages of CRTs, namely their high contrast levels and very fast response times, with the packaging advantages of LCD and other flat panel technologies. They also offer the possibility of requiring less power, about half that of an LCD system. FED display operates like a conventional cathode ray tube (CRT) with an electron gun that uses high voltage (10 kV) to accelerate electrons which in turn excite the phosphors, but instead of a single electron gun, a FED display contains a grid of individual nanoscopic electron guns. A FED screen is constructed by laying down a series of metal stripes onto a glass plate to form a series of cathode lines.

A display may be an Organic Light-Emitting Diode (OLED) display, a display device that sandwiches carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electro luminescent light. Unlike LCDs, which require backlighting, OLED displays are emissive devices-they emit light rather than modulate transmitted or reflected light. There are two main families of OLEDs: those based on small molecules and those employing polymers. Adding mobile ions to an OLED creates a light-emitting electrochemical cell or LEC, which has a slightly different mode of operation. OLED displays can use either Passive-Matrix (PMOLED) or active-matrix addressing schemes. Active-Matrix OLEDs (AMOLED) require a thin-film transistor backplane to switch each individual pixel on or off, but allow for higher resolution and larger display sizes.

A display may be an Electroluminescent Displays (ELDs) type, which is a flat panel display created by sandwiching a layer of electroluminescent material such as GaAs between two layers of conductors. When current flows, the layer of material emits radiation in the form of visible light. Electroluminescence (EL) is an optical and electrical phenomenon where a material emits light in response to an electric current passed through it, or to a strong electric field. A display may be based on an Electronic Paper Display (EPD) (a.k.a. e-paper and electronic ink) display technology which is designed to mimic the appearance of ordinary ink on paper. Unlike conventional backlit flat panel displays which emit light, electronic paper displays reflect light like ordinary paper. Many of the technologies can hold static text and images indefinitely without using electricity, while allowing images to be changed later. Flexible electronic paper uses plastic substrates and plastic electronics for the display backplane. A display may be a Vacuum Fluorescent Display (VFD) that emits a very bright light with high contrast and can support display elements of various colors. VFDs can display seven-segment numerals, multi-segment alphanumeric characters or can be made in a dot-matrix to display different alphanumeric characters and symbols.

A display may be a laser video display or a laser video projector. A Laser display requires lasers in three distinct wavelengths-red, green, and blue. Frequency doubling can be used to provide the green wavelengths, and a small semiconductor laser such as Vertical-External-Cavity Surface-Emitting-Laser (VECSEL) or a Vertical-Cavity Surface-Emitting Laser (VCSEL) may be used. Several types of lasers can be used as the frequency doubled sources: fiber lasers, inter cavity doubled lasers, external cavity doubled lasers, cVCSELs, and OPSLs (Optically Pumped Semiconductor Lasers). Among the inter-cavity doubled lasers VCSELs have shown much promise and potential to be the basis for a mass-produced frequency doubled laser. A VECSEL is a vertical cavity, and is composed of two mirrors. On top of one of them is a diode as the active medium. These lasers combine high overall efficiency with good beam quality. The light from the high power IR-laser diodes is converted into visible light by means of extra-cavity wave-guided second harmonic generation. Laser-pulses with about 10 KHZ repetition rate and various lengths are sent to a Digital Micromirror Device where each mirror directs the pulse either onto the screen or into the dump.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, California, U.S.A. and described in iPhone 6 technical specification (retrieved 10/2015 from www.apple.com/iphone-6/specs/), and in a User Guide dated 2015 (019-00155/2015-06) by Apple Inc. entitled: "*iPhone User Guide For iOS 8.4 Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), 03/2015 (Rev. 1.0) entitled: "*SM-G925F SM-G925FQ SM-G9251 User Manual*" and having features and specification described in "*Galaxy S6 Edge-Technical Specification*" (retrieved 10/2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infra-red blaster. Currently popular mobile OSs are Android, Symbian, Apple IOS, BlackBerry, MeeGo, Windows Phone, and Bada. Mobile devices with mobile communications capabilities (e.g. smartphones) typically contain two mobile operating systems—a main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "*IOS Tutorial*", downloaded from tutorialspoint.com on July 2014, which is incorporated in its entirety for all purposes as if fully set forth herein.

Cloud. The term "Cloud" or "Cloud computing" as used herein is defined as a technology infrastructure facilitating supplement, consumption and delivery of IT services, and generally refers to any group of networked computers capable of delivering computing services (such as computations, applications, data access, and data management and storage resources) to end users. This disclosure does not limit the type (such as public or private) of the cloud as well as the underlying system architecture used by the cloud. The IT services are internet based and may involve elastic provisioning of dynamically scalable and time virtualized resources. Although such virtualization environments can be privately deployed and used within local area or wide area networks owned by an enterprise, a number of "cloud service providers" host virtualization environments accessible through the public internet (the "public cloud") that is generally open to anyone, or through private IP or other type of network accessible only by entities given access to it (a "private cloud."). Using a cloud-based control server or using the system above may allow for reduced capital or operational expenditures. The users may further access the system using a web browser regardless of their location or what device they are using, and the virtualization technology allows servers and storage devices to be shared and utilization be increased. Examples of public cloud providers include Amazon AWS, Microsoft Azure and Google GCP. Comparison of service features such as computation, storage, and infrastructure of the three cloud service providers (AWS, Microsoft Azure, GCP) is disclosed in an article entitled: "*Highlight the Features of AWS, GCP and Microsoft Azure that Have an Impact when Choosing a Cloud Service Provider*" by Muhammad Ayoub Kamal, Hafiz Wahab Raza, Muhammad Mansoor Alam, and Mazliham Mohd Su'ud, published January 2020 in 'International Journal of Recent Technology and Engineering (IJRTE)' ISSN: 2277-3878, Volume-8 by Blue Eyes Intelligence Engineering & Sciences Publication [DOI: 10.35940/ijrte.D8573.018520], which is incorporated in its entirety for all purposes as if fully set forth herein.

The term "Software as a Service (SaaS)" as used herein in this application, is defined as a model of software deployment whereby a provider licenses a Software Application (SA) to customers for use as a service on demand. Similarly, an "Infrastructure as a Service" (IaaS) allows enterprises to access virtualized computing systems through the public Internet. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy. The service is supplied and consumed over the Internet, thus eliminating requirements to install and run applications locally on a site of a customer as well as simplifying maintenance and support. Particularly it is advantageous in massive business applications. Licensing is a common form of billing for the service and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases, the customer is a business organization that is using the SaaS for business purposes such as business software; hence, stability and data security are primary requirements. As part of a cloud service arrangement, any computer system may also be emulated using software running on a hardware computer system. This virtualization allows for multiple instances of a computer system, each referred to as virtual machine, to run on a single machine. Each virtual machine behaves like a computer system running directly on hardware. It is isolated from the other virtual machines, as would two hardware computers. Each virtual machine comprises an instance of an operating system (the "guest operating system"). There is a host operating system running directly on the hardware that supports the software that emulates the hardware, and the emulation software is referred to as a hypervisor.

The term "cloud-based" generally refers to a hosted service that is remotely located from a data source and configured to receive, store and process data delivered by the data source over a network. Cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ (GCP) as examples. In contrast, a "private" cloud-based service may include one or more servers that host services provided to a single subscriber (enterprise) and a hybrid cloud-based service may be a combination of certain functionality from a public cloud-based service and a private cloud-based service.

Cloud computing and virtualization is described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in a eBook authored by Gustavo Alessandro Andrade Santana and published 2014 by Cisco Systems, Inc. (Cisco Press) [ISBN-13:978-1-58714-324-3] entitled: "*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

Server. The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

A server device (in server/client architecture) typically offers information resources, services, and applications to clients, using a server dedicated or oriented operating system. A server device may consist of, be based on, include, or be included in a work-station. Current popular server operating systems are based on Microsoft Windows (by Microsoft Corporation, headquartered in Redmond, Washington, U.S.A.), Unix, and Linux-based solutions, such as the 'Windows Server 2012' server operating system, which is a part of the Microsoft 'Windows Server' OS family, that was released by Microsoft in 2012. 'Windows Server 2012' provides enterprise-class datacenter and hybrid cloud solutions that are simple to deploy, cost-effective, application-specific, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating system is widely used in servers. It is a multitasking, multiuser computer operating system that exists in many variants, and is characterized by a modular design that is sometimes called the "Unix philosophy", meaning the OS provides a set of simple tools, which each performs a limited, well-defined function, with a unified filesystem as the primary means of communication, and a shell scripting and command language to combine the tools to perform complex workflows. Unix was designed to be portable, multi-tasking and multi-user in a time-sharing configuration, and Unix systems are characterized by various concepts: the use of plain text for storing data, a hierarchical file system, treating devices and certain types of Inter-Process Communication (IPC) as files, the use of a large number of software tools, and small programs that can be strung together through a command line interpreter using pipes, as opposed to using a single monolithic program that includes all of the same functionality. Unix operating system consists of many utilities along with the master control program, the kernel. The kernel provides services to start and stop programs, handles the file system and other common "low level" tasks that most programs share, and schedules access to avoid conflicts when programs try to access the same resource, or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

Client. The term 'client' typically refers to an application (or a device executing the application) used for retrieving or rendering resources, or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

A client device (in server/client architecture) typically receives information resources, services, and applications from servers, and is using a client dedicated or oriented operating system. The client device may consist of, be based on, include, or be included in, the a workstation or a computer system. Current popular client operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part 1*" and "*Windows Internals—Part 2*", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05B00008-0100/Rcc. 1.00 published January 2010 by Renesas Technology Corp. entitled: "*R8C Family—General RTOS Concepts*", in JAJA Technology Review article published February 2007 [1535-5535/ $32.00] by The Association for Laboratory Automation [doi: 10.1016/j.jala.2006.10.016] entitled: "*An Overview of Real-Time Operating Systems*", and in Chapter 2 entitled: "*Basic Concepts of Real Time Operating Systems*" of a book published 2009 [ISBN-978-1-4020-9435-4] by Springer Science+Business Media B.V. entitled: "*Hardware-Dependent Software—Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is $\frac{1}{1000}$ of a second to $\frac{1}{100}$ of a second, via an interrupt from a hardware timer, but this interval is often changed to suit a particular application. FreeRTOS™ is described in a paper by Nicolas Melot (downloaded 7/2015) entitled: "Study of an operating system: *FreeRTOS—Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "*FreeRTOS™ Modules*" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32- and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

µC/OS. Micro-Controller Operating Systems (MicroC/ OS, stylized as µC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

Transformer. As used herein, a 'transformer' is a deep learning model that adopts the mechanism of self-attention, differentially weighting the significance of each part of the input data. It is used primarily in the fields of Natural Language Processing (NLP) and Computer Vision (CV). Like recurrent neural networks (RNNs), transformers are designed to process sequential input data, such as natural language, with applications towards tasks such as translation and text summarization. However, unlike RNNs, transformers process the entire input all at once. The attention mechanism provides context for any position in the input sequence. For example, if the input data is a natural language sentence, the transformer does not have to process one word at a time. This allows for more parallelization than RNNs and therefore reduces training times.

A new simple network architecture, a Transformer, that is based solely on attention mechanisms, dispensing with recurrence and convolutions entirely, is described in an article by Ashish Vaswani; Noam Shazeer; Niki Parmar; Jakob Uszkoreit; Llion Jones; Aidan N. Gomez; Lukasz Kaiser; and Illia Polosukhin dated 12 Jun. 2017 (arXiv: 1706.03762 [cs.CL]; https://doi.org/10.48550/arXiv.1706.0376) and entitled: "*Attention Is All You Need*", which is incorporated in its entirety for all purposes as if fully set forth herein. The dominant sequence transduction models are based on complex recurrent or convolutional neural networks in an encoder-decoder configuration. The best performing models also connect the encoder and decoder through an attention mechanism. Experiments on two machine translation tasks show these models to be superior in quality while being more parallelizable and requiring significantly less time to train. The article shows that the transformer generalizes well to other tasks by applying it successfully to English constituency parsing both with large and limited training data.

Like earlier seq2seq models, the original Transformer model architecture uses an encoder-decoder architecture. First, the input text is parsed into tokens by a byte pair encoding tokenizer, and each token is converted via a word embedding into a vector. Then, positional information of the token is added to the word embedding. The encoder consists of encoding layers that process the input iteratively one layer after another, while the decoder consists of decoding layers that do the same thing to the encoder's output. The function of each encoder layer is to generate encodings that contain information about which parts of the inputs are relevant to each other. It passes its encodings to the next encoder layer as inputs. Each decoder layer does the opposite, taking all the encodings and using their incorporated contextual information to generate an output sequence. To achieve this, each encoder and decoder layer makes use of an attention mechanism. For each input, attention weighs the relevance of every other input and draws from them to produce the output. Each decoder layer has an additional attention mechanism that draws information from the outputs of previous decoders, before the decoder layer draws information from the encodings. Both the encoder and decoder layers have a feed-forward neural network for additional processing of the outputs and contain residual connections and layer normalization steps.

The transformer building blocks are scaled dot-product attention units. When a sentence is passed into a transformer model, attention weights are calculated between every token simultaneously. The attention unit produces embeddings for every token in context that contain information about the token itself along with a weighted combination of other relevant tokens each weighted by its attention weight. One set of matrices is called an attention head, and each layer in a transformer model has multiple attention heads. While each attention head attends to the tokens that are relevant to each token, with multiple attention heads the model can do this for different definitions of "relevance". In addition, the influence field representing relevance can become progressively dilated in successive layers. Many transformer attention heads encode relevance relations that are meaningful to humans. For example, attention heads can attend mostly to the next word, while others mainly attend from verbs to their direct objects. The computations for each attention head can be performed in parallel, which allows for fast processing. The outputs for the attention layer are concatenated to pass into the feed-forward neural network layers.

Each encoder consists of two major components: a self-attention mechanism and a feed-forward neural network. The self-attention mechanism accepts input encodings from the previous encoder and weighs their relevance to each other to generate output encodings. The feed-forward neural network further processes each output encoding individually. These output encodings are then passed to the next encoder as its input, as well as to the decoders. The first encoder takes positional information and embeddings of the input sequence as its input, rather than encodings. The positional information is necessary for the transformer to make use of the order of the sequence, because no other part of the transformer makes use of this. The encoder is bidirectional. Attention can be placed on tokens before and after the current token.

Each decoder consists of three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention. Like the first encoder, the first decoder takes positional information and embeddings of the output sequence as its input, rather than encodings. The transformer must not use the current or future output to predict an output, so the output sequence must be partially masked to prevent this reverse information flow. This allows for autoregressive text generation. For all attention heads, attention can't be placed on following tokens. The last decoder is followed by a final linear transformation and softmax layer, to produce the output probabilities over the vocabulary.

Vision Transformer (ViT). A Vision Transformer (ViT) is a transformer that is targeted at vision processing tasks such as image recognition. Transformers measure the relationships between pairs of input tokens (words in the case of text strings), termed attention. The cost is quadratic in the number of tokens. For images, the basic unit of analysis is the pixel. However, computing relationships for every pixel pair in a typical image is prohibitive in terms of memory and computation. Instead, VIT computes relationships among pixels in various small sections of the image (e.g., 16×16 pixels), at a drastically reduced cost. The sections (with positional embeddings) are placed in a sequence. The embeddings are learnable vectors. Each section is arranged into a linear sequence and multiplied by the embedding matrix. The result, with the position embedding is fed to the transformer. As in the case of BERT, a fundamental role in classification tasks is played by the class token. A special token that is used as the only input of the final MLP Head as it has been influenced by all the others. The architecture for image classification is the most common and uses only the Transformer Encoder in order to transform the various input tokens. However, there are also other applications in which the decoder part of the traditional Transformer Architecture is also used. Using ViT, an image is split into non-overlapping patches and receives a [CLS] token. They are positionally embedded and passed through transformer layers. Each patch is directly associated with a set of different features each layer: a key, query, value and token; each can be used as patch descriptors.

A transformer in machine learning is a deep learning model that uses the mechanisms of attention, differentially weighing the significance of each part of the input data. Transformers in machine learning are composed of multiple self-attention layers. The ViT model represents an input image as a series of image patches, and directly predicts class labels for the image. The self-attention layer in ViT makes it possible to embed information globally across the overall image. The model also learns on training data to encode the relative location of the image patches to reconstruct the structure of the image. In one example, a ViT model may use 16×16 convolution with a 16 stride.

ViT is described in a paper by Alexey Dosovitskiy; Lucas Beyer; Alexander Kolesnikov; Dirk Weissenborn; Xiaohua Zhai; Thomas Unterthiner; Mostafa Dehghani; Matthias Minderer; Georg Heigold; Sylvain Gelly; Jakob Uszkoreit; and Neil Houlsby, dated 22 Oct. 2020 (arXiv: 2010.11929 [cs.CV]; https://doi.org/10.48550/arXiv.2010.11929), entitled: "*An Image is Worth 16×16 Words: Transformers for Image Recognition at Scale*", which is incorporated in its entirety for all purposes as if fully set forth herein. While the Transformer architecture has become the de-facto standard for natural language processing tasks, its applications to computer vision remain limited. In vision, attention is either applied in conjunction with convolutional networks, or used to replace certain components of convolutional networks while keeping their overall structure in place. The paper shows that this reliance on CNNs is not necessary and a pure transformer applied directly to sequences of image patches can perform very well on image classification tasks. When pre-trained on large amounts of data and transferred to multiple mid-sized or small image recognition benchmarks (ImageNet, CIFAR-100, VTAB, etc.), Vision Transformer (ViT) attains excellent results compared to state-of-the-art convolutional networks while requiring substantially fewer computational resources to train.

An example of an architecture 40 of a Vision Transformer (ViT) is shown in FIG. 4. In this model, an input image 41 is split into nine (9) 3×3 fixed sized portions (patches) designated as 41*a*, 41*b*, 41*c*, 41*d*, 41*e*, 41*f*, 41*g*. 41*h*, and 41*i*. The image patches 41*a*-41*i* are flattened as part of a "Linear Projection of Flattened Patches" 42 to create lower-dimensional linear embeddings from the flattened image patches. Positional embeddings are added to these lower-dimensional linear embeddings, such as a location 1 43*a*, location 2 43*b*, location 3 43*c*, location 4 43*d*, location 5 43*e*, location 6 43*f*, location 7 43*g*, location 8 43*h*, location 9 43*i*, and location 0 43*j* (extra learnable (class embedding). The resulting sequences are fed as an input to a state-of-the-art transformer encoder 44. The ViT model is pre-trained with image labels, which is then fully supervised on a big dataset, and then the downstream dataset is fine-tuned for image classification 45*a* using a Multi-Layer Perceptron (MLP) layer Head 45, that typically contains a two-layer with Gaussian Error Linear Unit (GELU).

The Transformer Encoder 44 may include one or more layers. A layer (Lx) 46 of the Transformer Encoder 44 that may be part of, consists of, or may comprise, the transformer encoder 44, is fed by Embedded Patches 41', that may correspond to the output or input of the "Linear Projection of Flattened Patches" 42. A normalizing in each of a 'Norm' function 47*a* and 'Norm' function 47*b* may include a Layer Norm (LN), added prior to the respective blocks as it does not include any new dependencies between the training images, for helping the training time and the overall performance. A Multi-Head Self Attention Layer (MSP) 48 concentrates all the attention outputs linearly to the right dimensions. The many attention heads help train local and global dependencies in an image. Then the downstream dataset is fine-tuned for image classification using a Multi-Layer Perceptron (MLP) layer Head 45*b*. In the case of image classification, the MLP layer 45*b* (as well as MLP 45) may implement the classification head, using one hidden layer at pre-training time and a single linear layer for fine-tuning.

The performance of a vision transformer model depends on decisions such as that of the optimizer, network depth, and dataset-specific hyperparameters. Compared to ViT, CNNs are easier to optimize. The disparity on a pure transformer is to marry a transformer to a CNN front end. The usual ViT stem leverages a 16*16 convolution with a 16 stride. In comparison, a 3*3 convolution with stride 2 increases the stability and elevates precision. CNN turns basic pixels into a feature map. Later, the feature map is translated by a tokenizer into a sequence of tokens that are then inputted into the transformer. The transformer then applies the attention technique to create a sequence of output tokens. Eventually, a projector reconnects the output tokens to the feature map. The latter allows the examination to navigate potentially crucial pixel-level details. This thereby lowers the number of tokens that need to be studied, lowering costs significantly. The vision transformer model is trained on a huge dataset even before the process of fine-tuning. The only change is to disregard the MLP layer and add a new D times KD*K layer, where K is the number of classes of the small dataset. To fine-tune in better resolutions, the 2D representation of the pre-trained position embeddings is done. This is because the trainable liner layers model the positional embeddings.

DINO-ViT. A DINO-ViT is a ViT model trained without labels, using a self-distillation approach. Self-supervised method is applied onto Vision Transformer (ViT), which forms DINO, a form of self-Distillation with no labels. It is found that the self-supervised ViT features contain explicit information about the semantic segmentation of an image, as shown above. And the extracted features are also excellent k-NN classifiers. DINO-ViT is described in a paper that describes self-supervised learning provides new properties to Vision Transformer (ViT) that stand out compared to convolutional networks (convnets), by Mathilde Caron; Hugo Touvron; Ishan Misra; Hervé Jégou; Julien Mairal; Piotr Bojanowski; and Armand dated April 2021 Joulin, 29 (arXiv: 2104.14294 [cs.CV]) entitled: "*Emerging Properties in Self-Supervised Vision Transformers*", which is incorporated in its entirety for all purposes as if fully set forth herein. Beyond the fact that adapting self-supervised methods to this architecture works particularly well, the paper makes the following observations: first, self-supervised ViT features contain explicit information about the semantic segmentation of an image, which does not emerge as clearly with supervised ViTs, nor with convnets. Second, these features are also excellent k-NN classifiers, reaching 78.3% top-1 on ImageNet with a small ViT. The study also underlines the importance of momentum encoder, multi-crop training, and the use of small patches with ViTs. The findings are implemented into a simple self-supervised method, called DINO, which we interpret as a form of self-distillation with no labels. The synergy between DINO and ViTs by achieving 80.1% top-1 on ImageNet in linear evaluation with ViT-Base.

Deep Image Prior. Deep image prior is a type of convolutional neural network used to enhance a given image with no prior training data other than the image itself. A neural network is randomly initialized and used as prior to solve inverse problems such as noise reduction, super-resolution, and inpainting. Image statistics are captured by the structure of a convolutional image generator rather than by any previously learned capabilities. Deep convolutional networks have become a popular tool for image generation and restoration. Generally, their excellent performance is imputed to their ability to learn realistic image priors from a large number of example images. A paper by Dmitry Ulyanov; Andrea Vedaldi; and Victor Lempitsky, entitled: "*Deep Image Prior*" dated May 17, 2020 [arXiv: 1711.10925 [cs.CV]; arXiv: 1711.10925v4 [cs.CV]; https://doi.org/10.48550/arXiv.1711.10925; https://doi.org/10.1007/s11263-020-1303-4], which is incorporated in its entirety for all purposes as if fully set forth herein, shows that on the contrary, the structure of a generator network is sufficient to capture a great deal of low-level image statistics prior to any learning. In order to do so, the paper shows that a randomly-initialized neural network can be used as a handcrafted prior with excellent results in standard inverse problems such as denoising, super-resolution, and inpainting. Furthermore, the same prior can be used to invert deep neural representations to diagnose them, and to restore images based on flash-no flash input pairs. Apart from its diverse applications, the paper approach highlights the inductive bias captured by standard generator network architectures. It also bridges the gap between two very popular families of image restoration methods: learning-based methods using deep convolutional networks and learning-free methods based on handcrafted image priors such as self-similarity. Code and supplementary material are available at this https URL.

Database. A database is an organized collection of data, typically managed by a DataBase Management System (DBMS) that organizes the storage of data and performs other functions such as the creation, maintenance, and usage of the database storage structures. The data is typically organized to model aspects of reality in a way that supports processes requiring information. Databases commonly also provide users with a user interface and front-end that enables the users to query the database, often in complex manners that require processing and organization of the data. The term "database" is used herein to refer to a database, or to both a database and the DBMS used to manipulate it. Database Management Systems (DBMS) are typically computer software applications that interact with the user, other applications, and the database itself to capture and analyze data, typically providing various functions that allow entry, storage and retrieval of large quantities of information, as well as providing ways to manage how that information is organized. A general-purpose DBMS is designed to allow the definition, creation, querying, update, and administration of databases. Examples of DBMSs include MySQL, PostgreSQL, Microsoft SQL Server, Oracle, Sybase and IBM DB2. Database technology and application is described in a document published by Telemark University College entitled "Introduction to Database Systems", authored by Hans-Petter Halvorsen (dated 2014 Mar. 3), which is incorporated in its entirety for all purposes as if fully set forth herein.

SQL. Structured Query Language (SQL) is a widely-used programming language for working with relational databases, designed for managing data held in a relational database management system (RDBMS), or for stream processing in a relational data stream management system (RDSMS).SQL consists of a data definition language and a data manipulation language. The scope of SQL includes data insert, query, update and delete, schema creation and modification, and data access control. Although SQL is often described as, and largely is, a declarative language (4GL), it also includes procedural elements. SQL is designed for querying data contained in a relational database, and is a set-based, declarative query language. The SQL is standardized as ISO/IEC 9075:2011 standard: "*Information technology—Database languages—SQL*". The ISO/IEC 9075 standard is complemented by ISO/IEC 13249 standard: "SQL Multimedia and Application Packages" that defines interfaces and packages based on SQL. The aim is a unified access to typical database applications like text, pictures, data mining or spatial data. SQL is described in the tutorial entitled: "*Oracle/SQL Tutorial*" by Michael Gertz of University of California, which is incorporated in its entirety for all purposes as if fully set forth herein.

Wireless. Any embodiment herein may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g. 802.11k, 802.11n, 802.11r, 802.16, 802.16d, 802.16c, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, wireless communication may be based on wireless technologies that are described in Chapter 20: "*Wireless Technologies*" of the publication number 1-587005-001-3 by Cisco Systems, Inc. (7/99) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks—second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low-voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors, or horns, which serve to direct the radio waves into a beam or other desired radiation pattern.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHZ and 2.500 GHZ, a 5.8 GHz band that includes the frequency band 5.725-5.875 GHZ, a 24 GHz band that includes the frequency band 24.000-24.250 GHZ, a 61 GHz band that includes the frequency band 61.000-61.500 GHz, a 122 GHz band that includes the frequency band 122.000-123.000 GHZ, and a 244 GHz band that includes the frequency band 244.000-246.000 GHZ.

ZigBee. ZigBee is a standard for a suite of high-level communication protocols using small, low-power digital radios based on an IEEE 802 standard for Personal Area Network (PAN). Applications include wireless light switches, electrical meters with in-home displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for several tasks, which include the keeping of device roles, management of requests to join a network, device discovery, and security. Because ZigBee nodes can go from sleep to active mode in 30 ms or less, the latency can be low and devices can be responsive, particularly compared to Bluetooth wake-up delays, which are typically around three seconds. ZigBee nodes can sleep most of the time, thus the average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network since it is the device that started the network originally. It can store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of time, thereby giving long battery life. A ZED requires the least amount of memory and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems, and household appliances. Z-Wave communicates using a low-power wireless technology designed specifically for remote control applications. Z-Wave operates in the sub-gigahertz frequency range, around 900 MHZ. This band competes with some cordless telephones and other consumer electronics devices but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and uses intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHZ ISM band: 908.42 MHZ (United States); 868.42 MHZ (Europe); 919.82 MHZ (Hong Kong); and 921.42 MHZ (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHZ (a.k.a. 2.4 GHZ); and the C band, 5.725-5.875 GHZ (a.k.a. 5 GHZ). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game because the setup is easy and an access point is not required.

A node/client with a WLAN interface is commonly referred to as STA (Wireless Station/Wireless client). The STA functionality may be embedded as part of the data unit, or may be a dedicated unit, referred to as a bridge, coupled to the data unit. While STAs may communicate without any additional hardware (ad-hoc mode), such a network usually involves Wireless Access Point (a.k.a. WAP or AP) as a mediation device. The WAP implements the Basic Stations Set (BSS) and/or ad-hoc mode based on Independent BSS (IBSS). STA, client, bridge, and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHZ. Each channel bandwidth is 22 MHz, symmetrically (+/−11 MHZ) located around the center frequency. In the transmission path, first, the baseband signal (IF) is generated based on the data to be transmitted, using 256 QAM (Quadrature Amplitude Modulation) based OFDM (Orthogonal Frequency Division Multiplexing) modulation technique, resulting in a 22 MHz (single channel wide) frequency band signal. The signal is then up-converted to the 2.4 GHz (RF) and placed in the center frequency of the required channel, and transmitted to the air via the antenna. Similarly, the receiving path comprises a received channel in the RF spectrum, down-converted to the baseband (IF) wherein the data is then extracted.

In order to support multiple devices and use a permanent solution, a Wireless Access Point (WAP) is typically used. A Wireless Access Point (WAP, or Access Point-AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

Bluetooth. Bluetooth is a wireless technology standard for exchanging data over short distances (using short-wavelength UHF radio waves in the ISM band from 2.4 to 2.485 GHZ) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHZ, or 2400 and 2483.5 MHz including guard bands 2 MHZ wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHZ. It usually performs 800 hops per second, with Adaptive Frequency-Hopping (AFH) enabled. Bluetooth low energy uses 2 MHZ spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: *"Master Table of Contents & Compliance Requirements-Specification Volume 0"*, and in an article published 2012 in Sensors [ISSN 1424-8220] by Carles Gomez et al. [Sensors 2012, 12, 11734-11753; doi: 10.3390/s120211734] entitled: *"Overview and Evaluation of Bluetooth Low Energy: An Emerging Low-Power Wireless Technology"*, which are both incorporated in their entirety for all purposes as if fully set forth herein.

Bluetooth Smart technology operates in the same spectrum range (the 2.400 GHZ-2.4835 GHZ ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Neural networks may be used for object detection as described in an article by Christian Szegedy, Alexander Toshev, and Dumitru Erhan (of Google, Inc.) (downloaded 7/2015) entitled: "*Deep Neural Networks for Object Detection*", in a CVPR2014 paper provided by the Computer Vision Foundation by Dumitru Erhan, Christian Szegedy, Alexander Toshev, and Dragomir Anguelov (of Google, Inc., Mountain-View, California, U.S.A.) (downloaded 7/2015) entitled: "Scalable Object Detection using Deep Neural Networks", and in an article by Shawn McCann and Jim Reesman (both of Stanford University) (downloaded 7/2015) entitled: "Object Detection using Convolutional Neural Networks".

Any step or method herein may be based on, or may use, any of the documents mentioned in, or incorporated herein, the background part of this document. Further, any step or method herein may be based on, or may use, a study of the use of deep features extracted from a pretrained Vision Transformer (ViT) as dense visual descriptors as described in an article by Shir Amir, Yossi Gandelsman, Shai Bagon, and Tali Dekel published 4 Sep. 2022 (arXiv: 2112.05814 [cs.CV]; https://doi.org/10.48550/arXiv.2112.05814), entitled: "*Deep ViT Features as Dense Visual Descriptors*", which is incorporated in its entirety for all purposes as if fully set forth herein. The article observes and empirically demonstrates that such features, when extracted from a self-supervised ViT model (DINO-ViT), exhibit several striking properties, including: (i) the features encode powerful, well-localized semantic information, at high spatial granularity, such as object parts; (ii) the encoded semantic information is shared across related, yet different object categories, and (iii) positional bias changes gradually throughout the layers. These properties allow to design simple methods for a variety of applications, including co-segmentation, part co-segmentation and semantic correspondences. To distill the power of ViT features from convoluted design choices, the article is restricted to lightweight zero-shot methodologies (e.g., binning and clustering) applied directly to the features. Since the methods require no additional training nor data, they are readily applicable across a variety of domains. Extensive qualitative and quantitative evaluation show that the simple methodologies achieve competitive results with recent state-of-the-art supervised methods, and outperform previous unsupervised methods by a large margin.

Style transfer algorithms strive to render the content of one image using the style of another. Style Transfer by Relaxed Optimal Transport and Self-Similarity (STROTSS), a new optimization-based style transfer algorithm, is disclosed in an article by Nicholas Kolkin, Jason Salavon, and Greg Shakhnarovich entitled: "*Style Transfer by Relaxed Optimal Transport and Self-Similarity*", [https://doi.org/10.48550/arXiv.1904.12785; arXiv: 1904.12785v2 [cs.CV]] published 2019 in Proceedings of the IEEE/CVF Conference on Computer Vision and Pattern Recognition, which is incorporated in its entirety for all purposes as if fully set forth herein. The method allows user-specified point-to-point or region-to-region control over visual similarity between the style image and the output. Such guidance can be used to either achieve a particular visual effect or correct errors made by unconstrained style transfer. In order to quantitatively compare our method to prior work, conduct a large-scale user study was conducted, designed to assess the style-content tradeoff across settings in style transfer algorithms. The results indicate that for any desired level of content preservation, and the method provides higher quality stylization than prior work.

An approach for measuring similarity between visual entities (images or videos) based on matching internal self-similarities is disclosed in an article by Eli Shechtman and Michal Irani entitled: "*Matching Local Self-Similarities across Images and Videos*", published 2007 in IEEE Conference on Computer Vision and Pattern Recognition [DOI: 10.1109/CVPR.2007.383198], which is incorporated in its entirety for all purposes as if fully set forth herein. What is correlated across images (or across video sequences) is the internal layout of local self-similarities (up to some distortions), even though the patterns generating those local self-similarities are quite different in each of the images/videos. These internal self-similarities are efficiently captured by a compact local "self-similarity descriptor", measured densely throughout the image/video, at multiple scales, while accounting for local and global geometric distortions. This gives rise to matching capabilities of complex visual data, including detection of objects in real cluttered images using only rough hand-sketches, handling textured objects with no clear boundaries, and detecting complex actions in cluttered video data with no prior learning. The measure is compared to commonly used image-based and video-based similarity measures, and demonstrate its applicability to object detection, retrieval, and action detection.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, any components, systems, devices or elements described in the publications that are incorporated in their entirety herein.

The method herein may be used for creating an artificial image from two actually captured (such as natural) images. In one example, the artificial image is formed by transferring the visual appearance of one or more objects in one image to another image, while keeping a noticeable pose, appearance and shape differences between the two images. The combined image is created without any need for interactive guidance by a user, based on selecting and modifying specific elements or objects in the images. Typically, the created image provides the 'feel-and-look' of an actually captured image. Such created images may be used for entertainment, recreation, or artistic purposes. Further, the formed artificial image may obviate the need to create and capture a specific scene, resulting in convenience and economical savings. Furthermore, the artificially created image may not be feasible to create in reality, while can be easily emulated and visualised in the created image. In addition, an image improvement may be achieved, for example, by replacing poorly captured object appearance with the same object having a better captured appearance in another image. In one non-limiting example, the creating of the artificial combined image is used in fashion, where a person may visually 'try-on' a cloth or an outfit without actually obtaining the cloth or outfit or actually wearing it. Similarly, such mechanism may be used in medical imaging, where images in one modality may be visualized in a different modality. For instance, given an ultrasound image of a body region, the system may predict how a CT scan of that view would look like.

In one example, it would be an advancement in the art to provide methods and systems for visual appearance transfer between semantically-related images, such as across diverse natural image pairs that contain significant variations in the number of objects, pose, and appearance, that are simple, intuitive, require low communication bandwidth, small, secure, cost-effective, reliable, provide lower power consumption, provide lower CPU and/or memory usage, easy to use, reduce latency, faster, has a minimum part count, minimum hardware, and/or uses existing and available components, protocols, programs, and applications for providing better quality of service, better or optimal resources allocation, and provides a better user experience.

SUMMARY

Any method herein may be used for semantic appearance transfer and may comprise capturing, by a first camera, a first image that comprises a first structure associated with a first appearance; capturing, by a second camera, a second image that may be semantically-related to the first image and may be associated with a second appearance that may be different from the first appearance; providing, the first and second images to a generator; processing, by the generator, using an Artificial Neural Network (ANN), the first and second images; outputting, by the generator, based on the sematic similarity of the first and second images, a third image that comprises the first structure associated with the second appearance; displaying, by a display, the third image to a user. Any processing herein by the generator may comprise executing, by a processor, a software or firmware stored in a computer readable medium.

Any method herein may comprise displaying, by the display to the user, the first image, the second image, or a combination thereof. Alternatively or in addition, any method herein may comprise displaying, by the display to the user, the third image concurrently with the displaying of the first image, the second image, or a combination thereof. Any method herein may comprise, or may be based on, correctly relating semantically matching regions between the first and second images, and transferring the second appearance to the third image while maintaining high-fidelity of the structure and appearance.

Alternatively or in addition, any method herein may comprise training the generator, and any training herein may comprise providing, to a first appearance analyzer, the second image; generating, by the first appearance analyzer, a first output that may be responsive to, comprises a representation of, or comprises a function of, the second appearance; providing, to a second appearance analyzer, the third image; generating, by the second appearance analyzer, a second output that may be responsive to, comprises a representation of, or comprises a function of, an appearance of the third image; comparing, by a first appearance comparator, the first and second outputs; and training, the generator, to minimize or nullify the difference between the first and second outputs. Any two analyzers herein, such as the first and second appearance analyzers, may use the same, similar, or different, architecture or algorithm. Any training herein may comprise providing only the first and images, such as without using any additional images for the training process.

Alternatively or in addition, any method herein may comprise providing, to a first structure analyzer, the first image; generating, by the first structure analyzer, a third output that may be responsive to, comprises a representation of, or comprises a function of, the first structure; providing, to a second structure analyzer, the third image; generating, by the second structure analyzer, a fourth output that may be responsive to, comprises a representation of, or comprises a function of, a structure of the third image; comparing, by a first structure comparator, the third and fourth outputs; and training, the generator, to minimize or nullify the difference between the third and fourth outputs. Any two analyzers herein, such as the first and second structure analyzers, may use the same, similar, or different, architecture or algorithm. Any two analyzers herein, such as the second structure analyzer and the second appearance analyzer may be integrated and may share the same architecture or algorithm. Any training herein may comprise minimizing or nullifying an objective function that is a weighted linear function of any differences herein.

Any analyzer herein, such as the first appearance analyzer, the second appearance analyzer, the first structure analyzer, the second structure analyzer, or ay combination thereof, may comprise, may use, or may be based on, a self-supervised pre-trained fixed Vision Transformer (ViT) model that may use a self-distillation approach. Alternatively or in addition, any analyzer herein, such as each of the first appearance analyzer, the second appearance analyzer, the first structure analyzer, or the second structure analyzer, may comprise, may use, or may be based on, a respective self-supervised pre-trained fixed Vision Transformer (ViT) model that may use a self-distillation approach. Any Vision Transformer (ViT) model herein may comprise, may use, or may be based on, an architecture or code that may be configured for Natural Language Processing (NLP), or may comprise, may use, or may be based on, a fine-tuning or pre-trained machine learning model, that may comprise, may be based on, or may use, attention, self-attention, or multi-head self-attention.

Any Vision Transformer (ViT) model herein may comprise splitting a respective input image into multiple non-overlapping same fixed-sized patches, and may comprise, may use, or may be based on, differentially weighing the significance of each patch of a respective input image. Further, any Vision Transformer (ViT) model herein may comprise, may use, or may be based on, attaching or embedding a feature information to each of the patches, that comprises a key, a query, a value, a token, or any combination thereof. Alternatively or in addition, any Vision Transformer (ViT) model herein may comprise, may use, or may be based on, attaching or embedding a position information in a respective input image for each of the patches for providing a series of positional embedding patches, and feeding the combined patches and positions to a transformer encoder. Alternatively or in addition, any Vision Transformer (ViT) model herein may comprise, may use, or may be based on, being trained with image labels and may be fully supervised on a dataset, or assigning a [CLS] token to the image, predicting or estimating a class label to a respective input image, or any combination thereof. Any Vision Transformer (ViT) model herein may comprise, may use, or may be based on, a DINO-VIT model, that may comprise at least 2, 3, 4, 5, 7, 10, 12, 15, 17, 20, 30, 40, or 50 pre-trained layers model, or may comprises less than 3, 4, 5, 7, 10, 12, 15, 17, 20, 30, 40, 50, or 100 pre-trained layers model. Further, any DINO-ViT model herein may comprise or may use at least 3×3, 4×4, 5×5, 6×6, 7×7, 8×8, 9×9, 10×10, 11×11, 12×12, 13×13, 14×14, or 15×15 patches, or may comprise or may use less than 4×4, 5×5, 6×6, 7×7, 8×8, 9×9, 10×10, 11×11, 12×12, 13×13, 14×14, 15×15, or 16×16 patches.

Any DINO-ViT model herein may be used as external semantic high-level prior, such as for any training herein. Any two analyzers herein, such as the second appearance analyzer and the second structure analyzer, may comprise, may be based on, or may use, the same DINO-ViT model. Further, the first appearance analyzer or the second appearance analyzer may comprise a DINO-ViT model. Alternatively or in addition, any analyzer herein, such as the first appearance analyzer, may comprise a first DINO-ViT model, and any output herein, such as the first output, may comprise, may be a function of, may use, may be based on, or may be responsive to, a self-similarity of keys in the deepest attention module (Self-Sim) of any DINO-ViT model, such as the first DINO-ViT model. Alternatively or in addition, any analyzer herein, such as the second appearance analyzer, may comprise a second DINO-ViT model, and any output herein, such as the second output, may comprise, may be a function of, may use, may be based on, or may be responsive to, a self-similarity of keys in a deepest attention module (Self-Sim) of any DINO-ViT model, such as the second DINO-ViT model. Any structure analyzer herein, such as the first structure analyzer or the second structure analyzer, may comprise a DINO-ViT model. Alternatively or in addition, the first structure analyzer may comprise a first DINO-ViT model, and any output herein, such as the third output, may comprise, may be a function of, may use, may be based on, or may be responsive to, a [CLS] token in a deepest layer of the first DINO-ViT model. Alternatively or in addition, the second structure analyzer may comprise a second DINO-ViT model, and any output herein, such as the fourth output, may comprise, may be a function of, may use, may be based on, or may be responsive to, a [CLS] token in a deepest layer of the second DINO-ViT model.

Any training herein may comprise using an optimizer with a constant learning, and any optimizer herein may comprise, may use, or may be based on, an algorithm for first-order gradient-based optimization of stochastic objective functions, and further may comprise, may use, or may be based on, adaptive estimates of lower-order moments, such as an Adam optimizer. Any training herein may comprise using a publicly available deep learning framework that may be based on, may use, or may comprises, a machine learning library, such as PyTorch.

Any resolution of any two images herein, such as of the first and second images, or of the first and third images, may be the same. Alternatively or in addition, the resolution of any two images herein, such as of the first and second images, or of the first and third images, may be different from each other. Any resolution herein, such as of the first image, the second image, the third image, or any combination thereof, may be at least 50, 100, 200, 500, 1,000, 1,500, 2,000, 5,000, 10,000, or 20,000 pixels (px). Alternatively or in addition, any resolution herein, such as of the first image, the second image, the third image, or any combination thereof, may be less than 100, 200, 500, 1,000, 1,500, 2,000, 5,000, 10,000, 20,000 or 30,000 pixels (px).

Any image herein may comprise an across objects transfer where an appearance of one or more objects in an image may be transferred to the semantically related objects in another image, while attenuating or ignoring variations in pose, number of objects, or appearance of the second image. For example, any image herein, such as the third image, may comprise an across objects transfer, and the second appearance that may comprise an appearance of one or more objects in the first image may be transferred to the semantically related objects in the second image, while attenuating or ignoring variations in pose, number of objects, or appearance of the second image. Any image herein may comprise a within objects transfer, where an appearance of one or more objects in an appearance of one or more objects in one image may be transferred between corresponding body parts or object elements of another image. For example, any image herein, such as the third image, may comprise a within objects transfer, and the first appearance that may comprise an appearance of one or more objects in the second image may be transferred between corresponding body parts or object elements of the first and second images.

Any appearance herein, such as the second appearance, may comprise a global appearance information and style, color, texture, a response due to absorbing or reflecting light, or any combination thereof, while attenuating, ignoring, or discarding, exact objects' pose, shape, perceived semantics of the objects and their surroundings, and scene's spatial layout. Further, any [CLS] token of any DINO-ViT model that may be applied to any image herein, such as to the second image or to the third image, may represent, or may be responsive to, an appearance of the image, such as the second appearance.

Any structure of any image herein, such as the first structure, may comprise a spatial layout, objects' pose, objects' boundaries, scene's spatial layout, or any combination thereof, typically involving the layout of the scene in the image, while attenuating, ignoring, or discarding, the image appearance, local texture patterns, or style. Any deep spatial features extracted from any DINO-ViT model that may be applied to any image, such as to the first image or to the third image, may represent, or may be responsive to, any structure of any image, such as the first structure. Typically, while "structure" (a.k.a. "shape") is the global arrangement of the scene, an "appearance" is a more local property.

In one example, a structure may correspond to a 'content' and an appearance may correspond to a 'style' in the article by Nicholas Kolkin, Jason Salavon, and Greg Shakhnarovich entitled: "*Style Transfer by Relaxed Optimal Transport and Self-Similarity*", [https://doi.org/10.48550/arXiv.1904.12785; arXiv: 1904.12785v2 [cs.CV]] published 2019 in Proceedings of the IEEE/CVF Conference on Computer Vision and Pattern Recognition, which is incorporated in its entirety for all purposes as if fully set forth herein. In one example, a structure may correspond to 'shape' or 'local layout' defined vla global self-similarities, as disclosed in the article by Eli Shechtman and Michal Irani entitled: "*Matching Local Self-Similarities across Images and Videos*", published 2007 in IEEE Conference on Computer Vision and Pattern Recognition [DOI: 10.1109/CVPR.2007.383198], which is incorporated in its entirety for all purposes as if fully set forth herein.

Any two cameras herein, such as the first and second cameras, may be the same camera or different and separated cameras. Any capturing herein, such as of the first and second images, may be at different times or may use different poses, of the same camera. Any method herein may be used with an enclosure, and each of any two devices or functionalities herein, such as the first and second cameras, may be housed in, may be attached to, of may be integrated with, the enclosure. Alternatively or in addition, any method herein may be used with distinct first and second enclosures, and any device or any functionality herein, such as the first camera, may be housed in, may be attached to, of may be integrated with, the first enclosure, and any device or any functionality herein, such as the second camera, may be housed in, may be attached to, or may be integrated with, the second enclosure. Any capturing of images herein, such as the capturing of the first and second images, may be at the same times or at different times. Any two devices or functionalities herein, such as the first and second cameras, may be co-located, and any two images herein, such as the first and second images, may be partially or fully overlapping scenes or views. Alternatively or in addition, any two images herein, such as the first and second images, may be non-overlapping scenes or views.

Alternatively or in addition, any capturing herein, such as by the first or second camera, may be in a visible light, in an invisible light (such as infrared, ultraviolet, X-rays, or gamma rays), or any combination thereof. Any camera herein, such as the first or second camera, may consist of, may comprise, or may be based on, a MultiSpectral Scanner (MSS) that may collect data over a plurality of different wavelength ranges. Alternatively or in addition, any capturing herein of any image may comprise scanning, by any scanner, using across-track scanning, whisk-broom scanning, along-track scanning, push-broom scanning, or any combination thereof. Alternatively or in addition, any camera herein, such as the first or second camera, may consist of, may comprise, or may be based on, a camera or scanner that comprises a thermal camera, a Light-Detection-and-Ranging (LIDAR), Synthetic Aperture Radar (SAR), or any combination thereof.

Any camera herein, such as the first or second camera, may comprises: an optical lens for focusing received light, the lens being mechanically oriented to guide a captured image; a photosensitive image sensor array disposed approximately at an image focal point plane of the optical lens for capturing the respective image and producing an analog signal representing the respective image; and an analog-to-digital (A/D) converter coupled to the image sensor array for converting the analog signal to the digital data. Any image sensor array herein may comprises, may use, or may be based on, semiconductor elements that may use the photoelectric or photovoltaic effect, and may use, may comprise, or may be based on, Charge-Coupled Devices (CCD) or Complementary Metal-Oxide-Semiconductor Devices (CMOS) elements.

Any format of any image herein, such as the first image, the second image, the third image, or any combination thereof, uses, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards, or any combination thereof. Alternatively or in addition, any format of any image herein, such as the format of the first image, the second image, the third image, or any combination thereof, may use, may be compatible with, or may be based on, Portable Network Graphics (PNG), Graphics Interchange Format (GIF), Joint Photographic Experts Group (JPEG), Windows bitmap (BMP), Exchangeable image file format (Exif), Tagged Image File Format (TIFF), Raw Image Formats (RIF), or any combination thereof.

Any camera herein, such as the first or second camera, may comprise, or may consist of, a Digital Video Camera (DVC) that may produce a video data stream, and any capturing herein, such as of the first image, may comprise extracting a first frame that may comprise the first image from the video data stream. Further, the capturing of the second image may comprise extracting a second frame that may comprise the second image from the video data stream. Any digital video format herein may use, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), DPOF (Digital Print Order Format) standards, or any combination thereof. Any video data stream herein may be in a High-Definition (HD) or Standard-Definition (SD) format. Alternatively or in addition, any video data stream herein may be based on, may be compatible with, or may be according to, ISO/IEC 14496 standard, MPEG-4 standard, or ITU-T H.264 standard.

Any ANN herein may use upsampling operators and further may comprise, may use, or may be based on, a fully convolutional network that may be used to supplement a usual contracting network by successive layers. Alternatively or in addition, any ANN herein may comprise, may use, or may be based on, U-Net. Alternatively or in addition, any ANN herein may comprise multiple layers, and each of the layers of any ANN herein may comprise 1×1, 2×2, 3×3, 4×4, 5×5, or 6×6 convolutions. Alternatively or in addition, any ANN herein may comprise, may use, or may be based on, an encoder and a symmetrical corresponding decoder, that may comprise at least 1, 2, 3, 5, 5, 6, 7, 8, 9, 10, 12, 15, or 20 layers, or may comprise less than 2, 3, 5, 5, 6, 7, 8, 9, 10, 12, 15, 20, or 30 layers. Any encoder channels dimensions herein may be [3→16→32→64→128→128], and any decoder channel dimensions herein may be in the reverse order. Alternatively or in addition, any ANN herein may comprise adding an additional 1×1 Convolution layer to each level of the encoder.

Any ANN herein may be, or may comprise, a Feedforward Neural Network (FNN), a Recurrent Neural Network (RNN), a Deep Neural Network (DNN), a deep convolutional neural network, or any combination thereof. Further, any ANN herein may comprise at least 3, 4, 5, 7, 10, 15, 20, 25, 30, 35, 40, 45, or 50 layers, or may comprise less than 4, 5, 7, 10, 15, 20, 25, 30, 35, 40, 45, or 50 layers. Any DNN herein may comprise, may consist of, or may be based on, a Recurrent neural network (RNNs), a Convolutional deep Neural Network (CNNs), an AutoEncoder (AE), a Deep Belief Network (DBN), a Restricted Boltzmann machine (RBM), or any combination thereof.

Alternatively or in addition, any ANN herein may comprise, may use, or may be based on, a Convolutional Neural Network (CNN) that may use, may be based on, or may comprise, a pre-trained neural network that may be publicly available and trained using crowdsourcing for visual object recognition. Alternatively or in addition, any ANN herein may comprise, may use, or may be based on, a Visual Geometry Group (VGG)-VGG Net that may be VGG16 or VGG19 network or scheme. Alternatively or in addition, any ANN herein may comprise, may use, or may be based on, a Regions with CNN features (R-CNN) network or scheme, that may be based on, may comprise, or may use, Fast R-CNN, Faster R-CNN, or Region Proposal Network (RPN) network or scheme.

Alternatively or in addition, any ANN herein may comprise, may use, or may be based on, defining a regression problem to spatially detect separated bounding boxes and their associated classification probabilities in a single evaluation, such as You Only Look Once (YOLO) based object detection, that may be based on, or may use, YOLOv1, YOLOv2, or YOLO9000 network or scheme. Alternatively or in addition, any ANN herein may comprise, may use, or may be based on, a Feature Pyramid Networks (FPN), Focal Loss, or any combination thereof, that may use nearest neighbor upsampling, such as RetinaNet network or scheme. Alternatively or in addition, any ANN herein may comprise, may use, or may be based on, a Graph Neural Network (GNN) that may process data represented by graph data structures that may capture the dependence of graphs via message passing between the nodes of graphs. Any GNN herein may comprise, may be based on, or may use, GraphNet, Graph Convolutional Network (GCN), Graph Attention Network (GAT), or Graph Recurrent Network (GRN) network or scheme. Alternatively or in addition, any ANN herein may comprise, may use, or may be based on, a Convolutional Neural Network (CNN), such as MobileNet, MobileNetV1, MobileNetV2, or MobileNetV3 network or scheme. Alternatively or in addition, any ANN herein may comprise, may use, or may be based on, a fully convolutional network, such as an U-Net network, architecture, or scheme.

Any display herein may consist of, or may comprise, a display screen for visually presenting information, that may consist of, or may comprise, a monochrome, grayscale or color display, having an array of light emitters or light reflectors. Alternatively or in addition, any display or display screen herein may consist of, may comprise, may use, or may be based on, a projector that comprises an Eidophor projector, Liquid Crystal on Silicon (LCOS or LCoS) projector, LCD projector, MEMS projector, Digital Light Processing (DLP™) projector, or any combination thereof. Alternatively or in addition, any display or display screen herein may consist of, may comprise, may use, or may be based on, a virtual retinal display or a video display supporting Standard-Definition (SD) or High-Definition (HD) standards, that may be capable of scrolling, static, bold or flashing the presented information. Any video display herein may comprise a 3D video display.

Alternatively or in addition, any display or display screen herein may consist of, may comprise, may use, or may be based on, an analog display having an analog input interface supporting NTSC, PAL or SECAM formats, and the analog input interface may comprise of RGB, VGA (Video Graphics Array), SVGA (Super Video Graphics Array), SCART, or S-video interface. Alternatively or in addition, any display or display screen herein may consist of, may comprise, may use, or may be based on, a digital display that may use a digital input interface selected from the group consisting of IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video, and DVB (Digital Video Broadcast) interface. Alternatively or in addition, any display or display screen herein may consist of, may comprise, may use, or may be based on, a Cathode-Ray Tube (CRT), a Field Emission Display (FED), an Electroluminescent Display (ELD), a Vacuum Fluorescent Display (VFD), or an Organic Light-Emitting Diode (OLED) display, a passive-matrix (PMOLED) display, an active-matrix OLEDs (AMOLED) display, a Liquid Crystal Display (LCD) display, a Thin Film Transistor (TFT) display, an LED-backlit LCD display, or an Electronic Paper Display (EPD) display that may be based on Gyricon technology, Electro-Wetting Display (EWD), Electrofluidic display technology, or any combination thereof. Alternatively or in addition, any display or display screen herein may consist of, may comprise, may use, or may be based on, a laser video display that may be based on a Vertical-External-Cavity Surface-Emitting-Laser (VECSEL) or a Vertical-Cavity Surface-Emitting Laser (VCSEL).

Any functionality or component herein, such as the first camera, may be housed in, may be attached to, or may be integrated with, a first device having a first enclosure that may comprise a client device, and any functionality or component herein, such as any generator herein, may be housed in, may be attached to, or may be integrated with, a second device having a second enclosure. Any method herein may comprise storing, operating, or using, by any device such as any client device, a client operating system, that may consist of, may comprise, or may be based on, Microsoft Windows 7, Microsoft Windows XP, Microsoft Windows 8, Microsoft Windows 8.1, Linux, Google Chrome OS, or any combination thereof. Any client operating system herein may comprise, or may consist of, a mobile operating system, that may comprise Android version 2.2 (Froyo), Android version 2.3 (Gingerbread), Android version 4.0 (Ice Cream Sandwich), Android Version 4.2 (Jelly Bean), Android version 4.4 (KitKat), Apple IOS version 3, Apple iOS version 4, Apple iOS version 5, Apple IOS version 6, Apple IOS version 7, Microsoft Windows® Phone version 7, Microsoft Windows® Phone version 8, Microsoft Windows® Phone version 9, Blackberry® operating system, or any combination thereof. Any client operating system herein may comprise, or may consist of, a Real-Time Operating System (RTOS), that may comprise FreeRTOS, SafeRTOS, QNX, VxWorks, Micro-Controller Operating Systems (µC/OS), or any combination thereof.

Any enclosure herein, such as the first enclosure, may comprise a hand-held enclosure or a portable enclosure. Any device herein, such as any the client device herein, may consist of, may comprise, may be part of, or may be integrated with, a notebook computer, a laptop computer, a media player, a Digital Still Camera (DSC), a Digital video Camera (DVC or digital camcorder), a Personal Digital Assistant (PDA), a cellular telephone, a digital camera, a video recorder, a smartphone, or any combination thereof. Alternatively or in addition, any device herein, such as any client device herein, may consist of, may comprise, may be part of, or may be integrated with, a smartphone that may comprise, or may be based on, an Apple iphone 6 or a Samsung Galaxy S6.

Any device herein, such as the second camera, may be housed in, may be attached to, or may be integrated with, a third device having a third enclosure, or may be housed in, may be attached to, or may be integrated with, the first device. Any display herein may be housed in, may be attached to, or may be integrated with, a third device having a third enclosure. Alternatively or in addition, any display herein may be housed in, may be attached to, or may be integrated with, the first device.

Any device herein, such as the first or second device, may comprise, may consist of, or may be integrated with, a server device, that may be a dedicated device that manages network resources; may not be a client device and may not be a consumer device; may be continuously online with greater availability and maximum up time to receive requests almost all of the time efficiently processes multiple requests from multiple client devices at the same time; may generate various logs associated with any client device and traffic from/to the client device; may primarily interface and respond to requests from client devices; may have greater fault tolerance and higher reliability with lower failure rates; or may provide scalability for increasing resources to serve increasing client demands; or any combination thereof.

Any device herein, such as any server device herein, may be storing, operating, or using, a server operating system. Any server operating system herein may consist or, may comprise, or may be based on, Microsoft Windows Server®, Linux, or UNIX. Alternatively or in addition, Any server operating system herein may consist or, may comprise, or may be based on, Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, NetBSD®, or any combination thereof. Any device herein, such as any server device herein, may be cloud-based implemented as part of a public cloud-based service, and any public cloud-based service herein may be provided by Amazon Web Services® (AWS®), Microsoft® Azure™, or Google® Compute Engine™ (GCP). Any processing or outputting herein may be provided as an Infrastructure as a Service (IaaS) or as a Software as a Service (SaaS).

Any method herein may be used with a second device in a second enclosure, and any generator herein may be housed in, may be attached to, or may be integrated with, a first device having a first enclosure that may communicate with the second device, such as over the Internet, and the first camera, the second camera, the display, or any combination thereof, may be housed in, may be attached to, or may be integrated with, the second enclosure. Any device herein, such as the first device, may comprise a server device, the second device may comprise a client device, and the first and second devices may communicate using a client-server architecture. Any two devices herein, such as the first and second devices, may communicate over a wireless network. Any method herein may further comprise: coupling, by an antenna in the second enclosure, to the wireless network; transmitting, by a wireless transceiver in the second enclosure that may be coupled to the antenna, a first data to the wireless network via the antenna; receiving, by the first device, the first data; and transmitting, by the first device, a second data; receiving, by the wireless transceiver in the second enclosure that may be coupled to the antenna, the second data from the wireless network via the antenna. The second device may comprise the first camera or the second camera, and the first data may comprise the first or second image. Alternatively or in addition, the second device may comprise the display, and the second data may comprise the third image.

Any camera herein, such as the first camera, the second camera, or a combination of both cameras, may be housed in the second enclosure of the second device, and the second device may comprise, may be connected to, or may be in communication with, a database configured to store images. Any method herein may comprise receiving, by the first device from the first device, a first data that comprises the first image, the second image, or a combination of the first and second images; and storing, in the database, the first data. Any database herein may comprise the first or second image, and any providing herein, such as to the generator, may comprise retrieving, from the database, the first or second image respectively. Alternatively or in addition, any method herein may comprise retrieving, from the database, multiple images that include the first or second image; displaying, to the user on the display, the retrieved multiple images; and selecting, by the user, the first or second image from the multiple images. Any database herein may be a relational database, such as a Structured Query Language (SQL) based database.

Any wireless network herein may be over a licensed radio frequency band, or over an unlicensed radio frequency band that may be an Industrial, Scientific and Medical (ISM) radio band that may comprise, or may consist of, a 2.4 GHz band, a 5.8 GHz band, a 61 GHz band, a 122 GHz band, or a 244 GHz band. Any wireless network herein may be a Wireless Personal Area Network (WPAN), any antenna herein may comprise a WPAN antenna, and the any wireless transceiver herein may comprise a WPAN transceiver. Any WPAN herein may be according to, may be compatible with, or may be based on, Bluetooth™ or Institute of Electrical and Electronics Engineers (IEEE) IEEE 802.15.1-2005 standards, such as Bluetooth Low-Energy (BLE). Alternatively or in addition, any WPAN herein may be a wireless control network that may be according to, or may be based on, Zigbee™, IEEE 802.15.4-2003, or Z-Wave™ standards. Alternatively or in addition, any wireless network herein may be a Wireless Local Area Network (WLAN), any antenna herein may comprise a WLAN antenna, and the any wireless transceiver herein may comprise a WLAN transceiver. Alternatively or in addition, any WLAN herein may be according to, may be compatible with, or may be based on, IEEE 802.11-2012, IEEE 802.11a, IEEE 802.11b, IEEE 802.11g, IEEE 802.11n, or IEEE 802.11ac.

Alternatively or in addition, any wireless network herein may be a Wireless Wide Area Network (WWAN), any antenna herein may comprise a WWAN antenna, and the any wireless transceiver herein may comprise a WWAN transceiver. Alternatively or in addition, any WWAN herein may be according to, may be compatible with, or may be based on, WiMAX network that may be according to, may be compatible with, or may be based on, IEEE 802.16-2009. Alternatively or in addition, any WWAN herein may be according to, may be compatible with, or may be based on, a cellular telephone network that may be a Third Generation (3G) network that may use Universal Mobile Telecommunications System (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), or Global System for Mobile communications (GSM), Enhanced Data rates for GSM Evolution (EDGE) EDGE-Evolution, or the cellular telephone network may be a Fourth Generation (4G) network that may use Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or may be based on IEEE 802.20-2008.

Any two devices herein, such as any first and second devices herein, may communicates over a wired network. Any method herein may comprise: coupling, by a connector in the second enclosure, to the wired network; transmitting, by a wired transceiver in the second enclosure that may be coupled to the connector, a first data to the wired network via the connector; receiving, by the first device, the first data; transmitting, by the first device, a second data; and receiving, by the wired transceiver in the second enclosure that may be coupled to the connector, the second data from the wired network via the connector.

Any wired network herein may be a Personal Area Network (PAN), any connector herein may be a PAN connector, and any wired transceiver herein may be a PAN transceiver. Alternatively or in addition, any wired network herein may be a Local Area Network (LAN), any connector herein may be a LAN connector, and any wired transceiver herein may be a LAN transceiver. Alternatively or in addition, any wired network herein may be a packet-based or switched-based Wide Area Network (WAN), any connector herein may be a WAN connector, and any wired transceiver herein may be a WAN transceiver. Any LAN herein may be Ethernet based, and may be according to, may be compatible with, or may be based on, IEEE 802.3-2008 standard, such as 10Base-T, 100Base-T, 100Base-TX, 100Base-T2, 100Base-T4, 1000Base-T, 1000Base-TX, 10GBase-CX4, and 10GBase-T. Any LAN connector herein may be an RJ-45 connector a fiber-optic connector. Alternatively or in addition, any LAN herein may be according to, may be compatible with, or may be based on, a standard selected from the group consisting of 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, and 10GBase-LX4.

Any camera herein may consist of, may comprise, or may be based on, a MultiSpectral Scanner (MSS) that may collect data over a plurality of different wavelength ranges, and any capturing of the image herein may comprise along-track scanning, push-broom scanning, across-track scanning, whisk-broom scanning, or any combination thereof, by the scanner. Alternatively or in addition, any camera herein may consist of, may comprise, or may be based on, a Light Detection And Ranging (LIDAR) camera or scanner, Synthetic Aperture Radar (SAR), or a thermal camera that may be operative to capture in a visible light or in an invisible light that may be infrared, ultraviolet, X-rays, gamma rays, or any combination thereof.

Any camera herein may comprise, or may consist of, a Digital Video Camera (DVC) that may produces a video data stream, and any capturing of the image herein may comprise extracting a frame that may comprises the image from the video data stream. Any camera herein, such as any digital video camera herein, may comprise: an optical lens for focusing received light, the lens being mechanically oriented to guide a captured image; a photosensitive image sensor array disposed approximately at an image focal point plane of the optical lens for capturing the image and producing an analog signal representing the image; and an analog-to-digital (A/D) converter coupled to the image sensor array for converting the analog signal to the video data stream. Any image sensor array herein may comprise, may use, or may be based on, semiconductor elements that use the photoelectric or photovoltaic effect. Alternatively or in addition, any image sensor array herein may use, may comprise, or may be based on, Charge-Coupled Devices (CCD) or Complementary Metal-Oxide-Semiconductor Devices (CMOS) elements.

Any digital video camera herein may comprise an image processor coupled to the image sensor array for providing the video data stream according to a digital video format, and any digital video format herein may uses, may be compatible with, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), DPOF (Digital Print Order Format) standard, or any combination thereof. Any video data stream herein may be in a High-Definition (HD) or Standard-Definition (SD) format, and may be based on, may be compatible with, or may be according to, ISO/IEC 14496 standard, MPEG-4 standard, or ITU-T H.264 standard. Any method herein may be used with a video compressor that may be coupled to the digital video camera for compressing the video data stream, and may perform a compression scheme that may use, or may be based on, intraframe or interframe compression, and lossy or non-lossy compression. Any compression scheme herein may use, may be compatible with, or may be based on, at least one standard compression algorithm which may be selected from a group consisting of: JPEG (Joint Photographic Experts Group) and MPEG (Moving Picture Experts Group), ITU-T H.261, ITU-T H.263, ITU-T H.264 and ITU-T CCIR 601. Any video data herein may comprise, or may be based on, an MPEG2 transport stream that may encapsulate H.264 video stream and KLV (Key-Length-Value) encoded telemetries stream. Any video data protocol herein may be according to, or may be based on, an MISB ST 0601.15 standard, published 28 Feb. 2019 by the Motion Imagery Standards Board.

Any determining, detecting, localizing, identifying, classifying, or recognizing of one or more dynamic or static features or objects (or any combination thereof) in any image, such as in the first or second image, may use an ANN or any other scheme that may use, may comprise, or may be based on, a Convolutional Neural Network (CNN), or wherein the determining comprises the second image using a CNN. Any object herein may be identified using a single-stage scheme where the CNN may be used once, or may be identified using a two-stage scheme where the CNN may be used twice. Any determining, detecting, localizing, identifying, classifying, or recognizing of one or more dynamic or static objects (or any combination thereof) in any image, such as in the first or second image, may use an ANN or any other scheme that may use, may comprise, or may be based on, a pre-trained neural network that may be publicly available and trained using crowdsourcing for visual object recognition, such as the ImageNet network.

Any determining, detecting, localizing, identifying, classifying, or recognizing of one or more dynamic or static features or objects (or any combination thereof) in any image, such as in the first or second image, may use an ANN or any other scheme that may use, may comprise, or may be based on, an ANN that may be based on extracting features from the image, such as a Visual Geometry Group (VGG)-VGG Net that may be VGG16 or VGG19 network or scheme. Any determining, detecting, localizing, identifying, classifying, or recognizing of one or more dynamic or static objects (or any combination thereof) in any image, such as in the first or second image, may use an ANN or any other scheme that may use, may comprise, or may be based on, defining or extracting regions in the image, and feeding the regions to the CNN, such as a Regions with CNN features (R-CNN) network or scheme, that may be Fast R-CNN, Faster R-CNN, or Region Proposal Network (RPN) network or scheme.

Any determining, detecting, localizing, identifying, classifying, or recognizing of one or more dynamic or static features or objects (or any combination thereof) in any image, such as in the first or second image, may use an ANN or any other scheme that may use, may comprise, or may be based on, defining a regression problem to spatially detect separated bounding boxes and their associated classification probabilities in a single evaluation, such as You Only Look Once (YOLO) based object detection, that may be based on, or uses, YOLOv1, YOLOv2, or YOLO9000 network or scheme. Any determining, detecting, localizing, identifying, classifying, or recognizing of one or more dynamic or static objects (or any combination thereof) in any image, such as in the first or second image, may use an ANN or any other scheme that may use, may comprise, or may be based on, Feature Pyramid Networks (FPN), Focal Loss, or any combination thereof, and may further be may be using, may be based on, or may be comprising, nearest neighbor upsampling, such as RetinaNet network or scheme Any determining, detecting, localizing, identifying, classifying, or recognizing of one or more dynamic or static features or objects (or any combination thereof) in any image, such as in the first or second image, may use an ANN or any other scheme that may use, may comprise, or may be based on, Graph Neural Network (GNN) that may process data represented by graph data structures that may capture the dependence of graphs via message passing between the nodes of graphs, such as GraphNet, Graph Convolutional Network (GCN), Graph Attention Network (GAT), or Graph Recurrent Network (GRN) network or scheme. Any determining, detecting, localizing, identifying, classifying, or recognizing of one or more dynamic or static objects (or any combination thereof) in any image, such as in the first or second image, may use an ANN or any other scheme that may use, may comprise, or may be based on, a step of defining or extracting regions in the image, and feeding the regions to the Convolutional Neural Network (CNN), such as MobileNet, MobileNetV1, MobileNetV2, or MobileNetV3 network or scheme. Any determining, detecting, localizing, identifying, classifying, or recognizing of one or more dynamic or static objects (or any combination thereof) in any image, such as in the first or second image, may use an ANN or any other scheme that may use, may comprise, or may be based on, a fully convolutional network, such as U-Net network or scheme.

Any video camera herein may consist of, may comprise, or may be based on, a Light Detection And Ranging (LIDAR) camera or scanner, or Synthetic Aperture Radar (SAR). Alternatively or in addition, any video camera herein may consist of, may comprise, or may be based on, a thermal camera. Alternatively or in addition, any video camera herein may be operative to capture in a visible light. Alternatively or in addition, any video camera herein may be operative to capture in an invisible light, that may be infrared, ultraviolet, X-rays, or gamma rays.

Any method herein may be used with a memory or a non-transitory tangible computer readable storage media for storing computer executable instructions that comprises at least part of the method, and a processor for executing the instructions. A non-transitory computer readable medium may be having computer executable instructions stored thereon, wherein the instructions include the steps of any method herein.

Any system herein may further comprise a computer device and a wireless network for communication between the vehicle and the computer device, and any method herein may further comprise sending the tagged frame to a computer device, and the sending of the tagged frame or the obtaining of the video data may comprise sending over the wireless network, which may be over a licensed radio frequency band or may be over an unlicensed radio frequency band, such as an unlicensed radio frequency band may be an Industrial, Scientific and Medical (ISM) radio band. Any ISM band herein may comprise, or may consist of, a 2.4 GHz band, a 5.8 GHz band, a 61 GHz band, a 122 GHz band, or a 244 GHz band.

Any wireless network herein may comprise a Wireless Wide Area Network (WWAN), any wireless transceiver herein may comprise a WWAN transceiver, and any antenna herein may comprise a WWAN antenna. Any WWAN herein may be a wireless broadband network, any WWAN herein may be a WiMAX network, any antenna herein may be a WiMAX antenna and any wireless transceiver herein may be a WiMAX modem, and the WiMAX network may be according to, compatible with, or based on, Institute of Electrical and Electronics Engineers (IEEE) IEEE 802.16-2009. Alternatively or in addition, the WWAN may be a cellular telephone network, any antenna herein may be a cellular antenna, and any wireless transceiver herein may be a cellular modem, where the cellular telephone network may be a Third Generation (3G) network that uses Universal Mobile Telecommunications System (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), or Global System for Mobile communications (GSM), Enhanced Data rates for GSM Evolution (EDGE) EDGE-Evolution, or the cellular telephone network may be a Fourth Generation (4G) network that uses Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or may be based on IEEE 802.20-2008.

Any wireless network herein may comprise a Wireless Personal Area Network (WPAN), any wireless transceiver herein may comprise a WPAN transceiver, and any antenna herein may comprise an WPAN antenna. The WPAN may be according to, compatible with, or based on, Bluetooth™, Bluetooth Low Energy (BLE), or IEEE 802.15.1-2005 standards, or the WPAN may be a wireless control network that may be according to, or may be based on, Zigbee™, IEEE 802.15.4-2003, or Z-Wave™ standards. Any wireless network herein may comprise a Wireless Local Area Network (WLAN), any wireless transceiver herein may comprise a WLAN transceiver, and any antenna herein may comprise a WLAN antenna. The WLAN may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac.

Any wireless network herein may be using, or may be based on, Dedicated Short-Range Communication (DSRC) that may be according to, may be compatible with, or may be based on, European Committee for Standardization (CEN) EN 12253:2004, EN 12795:2002, EN 12834:2002, EN 13372:2004, or EN ISO 14906:2004 standard. Alternatively or in addition, the DSRC may be according to, may be compatible with, or may be based on, IEEE 802.11p, IEEE 1609.1-2006, IEEE 1609.2, IEEE 1609.3, IEEE 1609.4, or IEEE1609.5.

Any non-transitory tangible computer readable storage media herein may comprise a code to perform part of, or whole of, the steps of any method herein. Alternatively or in addition, any device herein may be housed in a single enclosure and may comprise the digital camera, a memory for storing computer-executable instructions, and a processor for executing the instructions, and the processor may be configured by the memory to perform acts comprising part of, or whole of, any method herein. Any apparatus, device, or enclosure herein may be a portable or a hand-held enclosure, and the may be battery-operated, such as a notebook, a laptop computer, a media player, a cellular phone, a Personal Digital Assistant (PDA), or an image processing device. Any method herein may be used with a memory or a non-transitory tangible computer readable storage media for storing computer executable instructions that may comprise at least part of the method, and a processor for executing part of, or all of, the instructions. Any non-transitory computer readable medium may be having computer executable instructions stored thereon, and the instructions may include the steps of any method herein.

Any digital video camera herein may comprise an optical lens for focusing received light, the lens being mechanically oriented to guide a captured image; a photosensitive image sensor array disposed approximately at an image focal point plane of the optical lens for capturing the image and producing an analog signal representing the image; and an analog-to-digital (A/D) converter coupled to the image sensor array for converting the analog signal to the video data stream. Any camera or image sensor array herein may be operative to respond to a visible or non-visible light, and any invisible light herein may be infrared, ultraviolet, X-rays, or gamma rays. Any image sensor array herein may comprise, may use, or may be based on, semiconductor elements that use the photoelectric or photovoltaic effect, such as Charge-Coupled Devices (CCD) or Complementary Metal-Oxide-Semiconductor Devices (CMOS) elements. Any video camera herein may consist of, may comprise, or may be based on, a Light Detection And Ranging (LIDAR) camera or scanner, Synthetic Aperture Radar (SAR), or a thermal camera.

Any digital video camera herein may further comprise an image processor coupled to the image sensor array for providing the video data stream according to a digital video format, which may use, may be compatible with, may be according to, or may be based on, TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. Further, any video data stream herein may be in a High-Definition (HD) or Standard-Definition (SD) format. Alternatively or in addition, any video data stream herein may be based on, may be compatible with, or may be according to, ISO/IEC 14496 standard, MPEG-4 standard, or ITU-T H.264 standard.

Any method herein may be used with a video compressor coupled to the digital video camera for compressing the video data stream, and any video compressor herein may perform a compression scheme that may uses, or may be based on, intraframe or interframe compression, and wherein the compression may be lossy or non-lossy. Further, any compression scheme herein may use, may be compatible with, or may be based on, at least one standard compression algorithm which may be selected from a group consisting of: JPEG (Joint Photographic Experts Group) and MPEG (Moving Picture Experts Group), ITU-T H.261, ITU-T H.263, ITU-T H.264 and ITU-T CCIR 601.

A method for training a generator for semantic appearance transfer may be used with a first image that may comprise a first structure associated with a first appearance, and may be used with a second image that may be semantically-related to the first image and may be associated with a second appearance that may be different from the first appearance. Any method herein may comprise providing, to a generator, the first and second images; outputting, by the generator, based on the sematic similarity of the first and second images, a third image that comprises the first structure associated with the second appearance; providing, to a first appearance analyzer, the second image; generating, by the first appearance analyzer, a first output that is responsive to, comprises a representation of, or comprises a function of, the second appearance; providing, to a second appearance analyzer, the third image; generating, by the second appearance analyzer, a second output that is responsive to, comprises a representation of, or comprises a function of, an appearance of the third image; comparing, by a first appearance comparator, the first and second outputs; and training, the generator, to minimize or nullify the difference between the first and second outputs.

Any method herein may further comprise capturing, by a first camera, the first image; capturing, by a second camera, the second image; and displaying, by any display, the third image to a user. Any generator herein may use any Artificial Neural Network (ANN). Any method herein may be used by providing only the first and images, and any first and second appearance analyzers herein may use the same, similar, or different, architecture, or algorithm. Any method herein may further comprise providing, to a first structure analyzer, the first image; generating, by the first structure analyzer, a third output that is responsive to, comprises a representation of, or comprises a function of, the first structure; providing, to a second structure analyzer, the third image; generating, by the second structure analyzer, a fourth output that is responsive to, comprises a representation of, or comprises a function of, a structure of the third image; comparing, by a first structure comparator, the third and fourth outputs; and training, the generator, to minimize or nullify the difference between the third and fourth outputs.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments and are not therefore to be considered limiting in scope.

DETAILED DESCRIPTION

Figure 1:
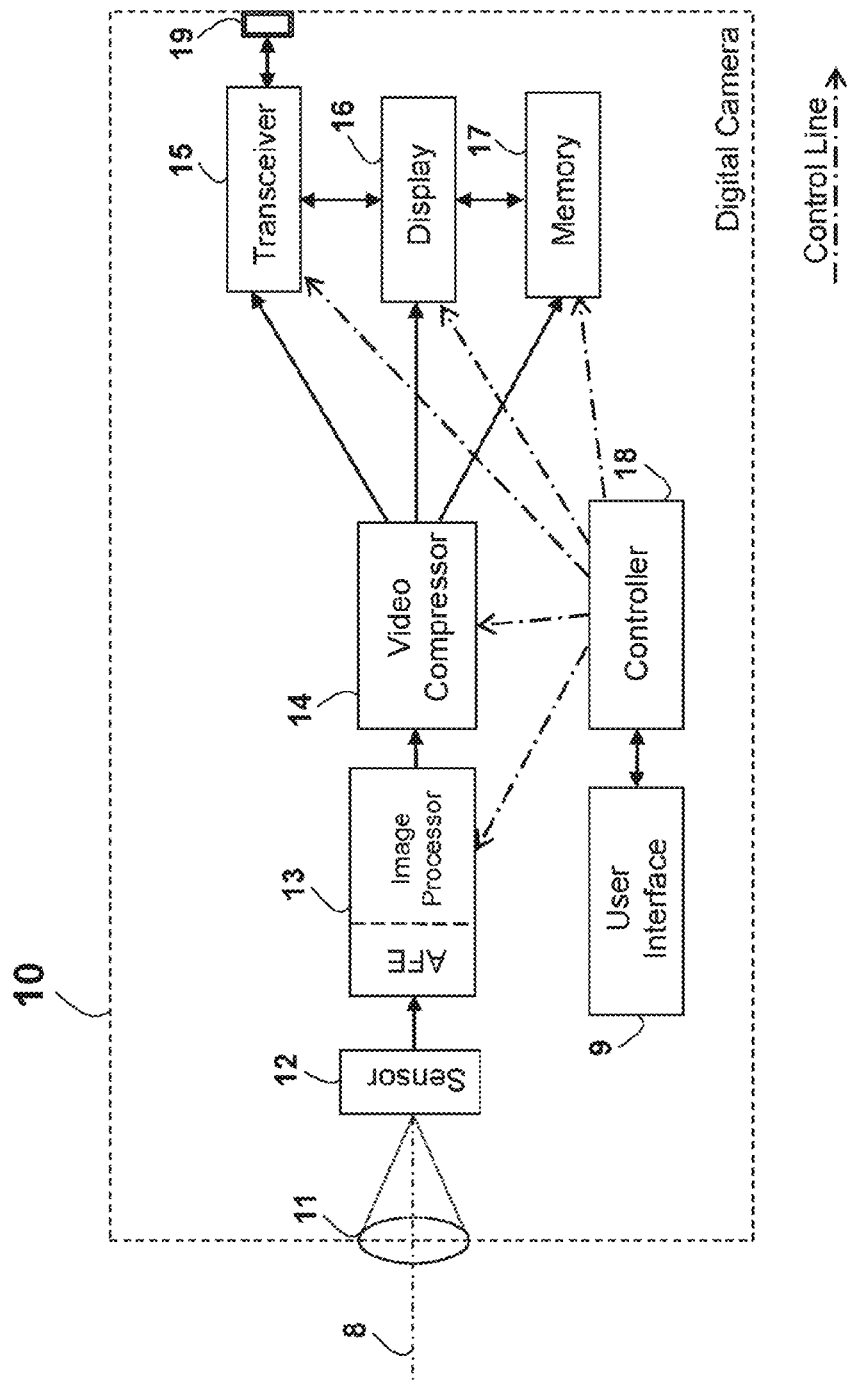
FIG. 1 schematically illustrates a simplified schematic block diagram of a prior-art digital camera.
Figure 2:
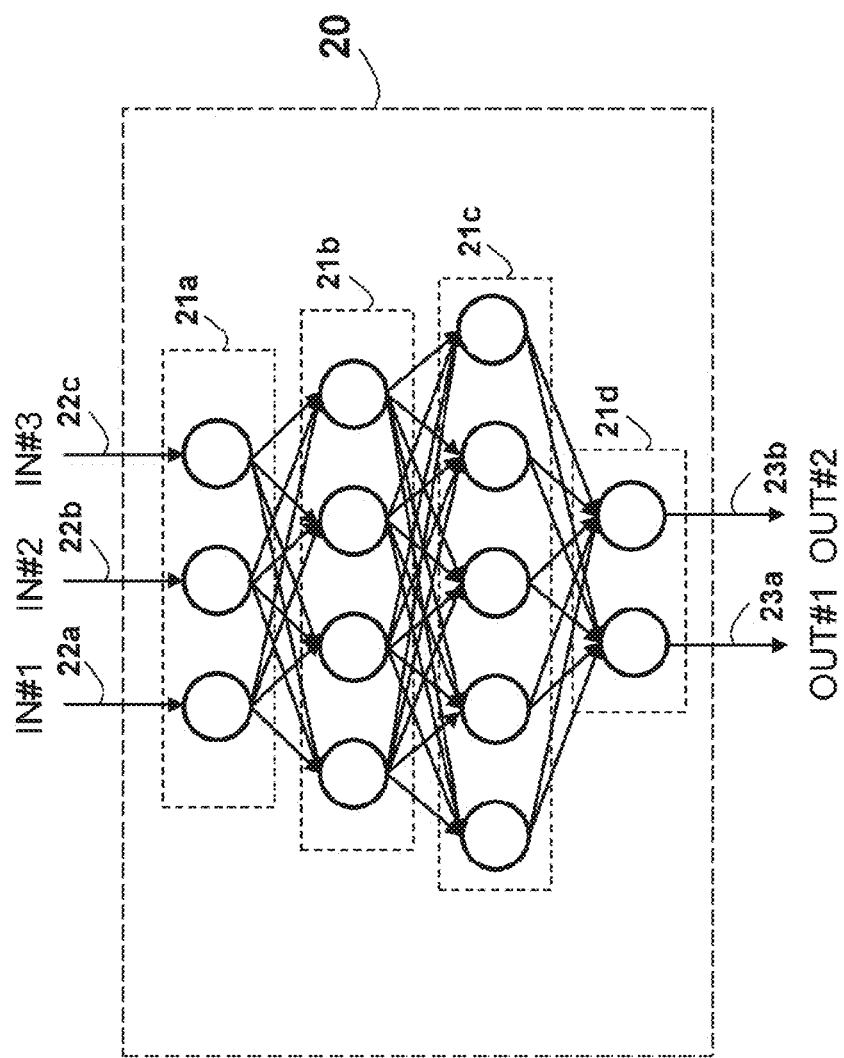
FIG. 2 schematically illustrates a block diagram of an example of a feed-forward Artificial Neural Network (ANN)
Figure 2A:
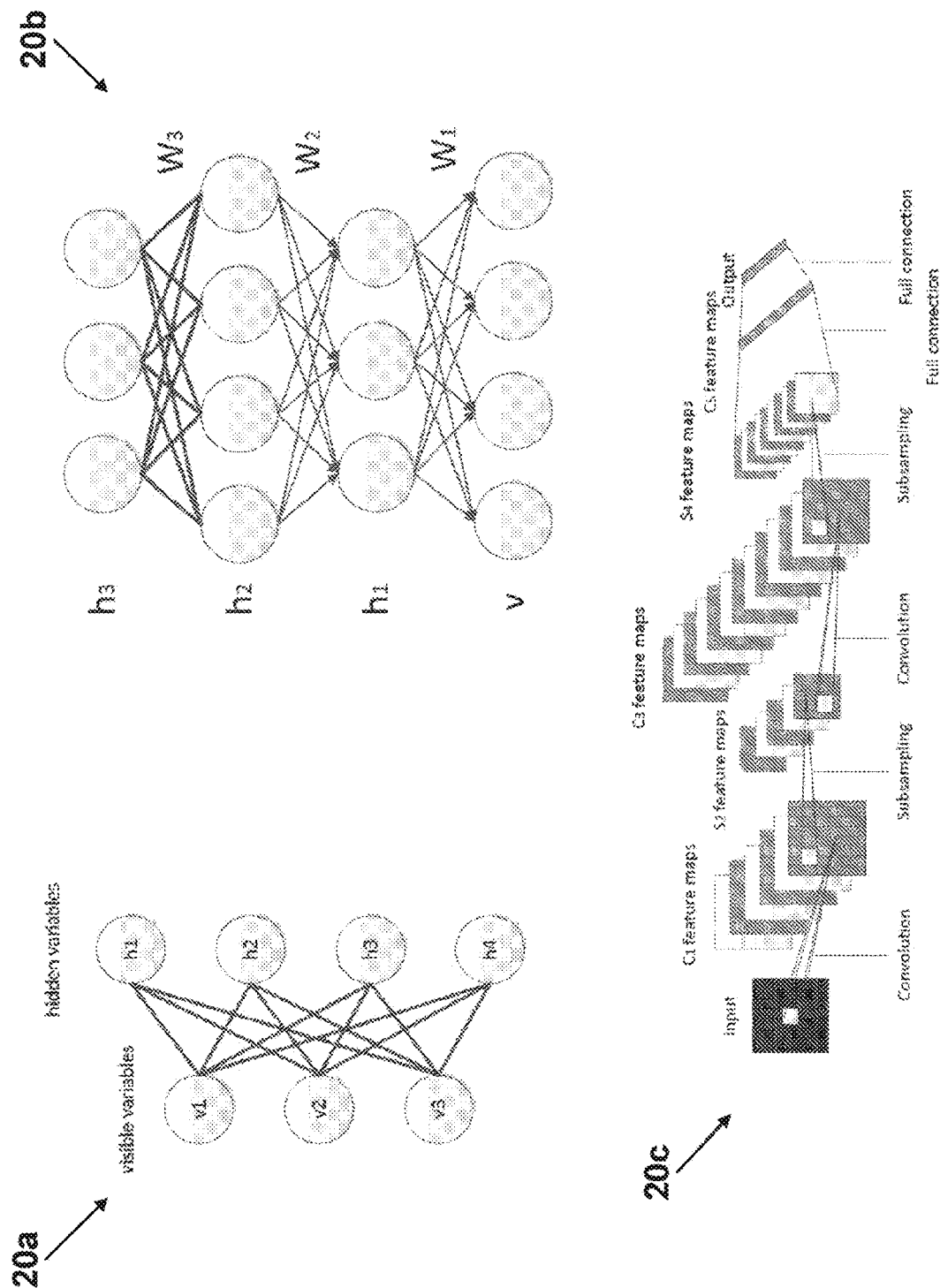
FIG. 2a schematically illustrates a schematic diagram of examples of a Deep Neural Network (DNN)

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, similar, or having similar functionality. It is readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a", "an", and "the" herein include plural referents unless the context clearly dictates otherwise. Thus, for example, a reference to "a component surface" includes a reference to one or more of such surfaces. By the term "substantially" it is meant that the recited characteristic, parameter, feature, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention. Spatially relative terms, such as "inner," "outer." "beneath", "below", "right", "left", "upper", "lower", "above", "front", "rear", "left", "right" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

As used herein, the terms "semantically-related" or 'semantically-similar" images refer to images which include contents, such as objects, regions, partitions, or any combination thereof, are conceptually the same or similar, such as being in the same categories or labels Semantic vision is an important line of research in computer vision. The keyword "semantic" means the extraction of features, not only visual (color, shape, texture), but also any "higher level" information. In particular, semantic vision seeks to understand or interpret images of scenes in terms of present objects and possible relations between them.

In general, semantics concerns the extraction of meaning from data. Semantic vision seeks to understand not only what objects are present in an image but, perhaps even more importantly, the relationship between those objects. In semantic vision, an image is typically segmented into regions of interest. Each segment is allocated a classification so that all pixels in an image are assigned a class (e.g., car, road, footpath, person, trec, sky). Contextual relationships provide important cues for understanding a scene. Spatial context can be formulated in terms of the relationship between an object and its neighbouring objects. For example, a car is likely to appear above a road, but is unlikely to be surrounded by sky. Contextual relationships can also be inferred from the relationship between items in an image and the camera. For instance, if a tree is occluded by a car, then the car is closer to the camera than the tree. The ability to attribute relationships between objects demonstrates reasoning, an important step towards true "cognition".

In contrast to a visual image, the term "semantic image," may refer to a 2D or 3D image, where the pixel values encode a semantic concept, class, label, feature, and/or category. Such semantic labels may indicate any semantic concept, including but not limited to a tangible object that is semantically classifiable and may be within an environment of an object to localize. Such semantically classifiable tangible objects include, but are not limited to, roads, buildings, cars, trees, sidewalks, lane dividers, and the like. That is, a semantic image is an image that encodes semantic representations of tangible objects. As noted herein, a corresponding semantic image may be generated from a corresponding visual image via semantic segmentation. As such, the semantic image data encoded in the pixel values of the semantic pixels encode semantic labels that are associated with tangible objects that were previously imaged (via a visual image camera) based on the detections of EM waves/photons that may have been reflected from and/or emitted by, and imaged in the corresponding visual image. Semantic images encoding semantic labels are contrasted with visual images, that encode information about the detected wave's/photon's intensity, amplitude, frequency, wavelength, polarization, and/or phase. That is, the pixel values of conventional visual images encode various detected aspects waves/photons received from (i.e., reflected from or emitted by) tangible objects in the environment. In contrast to a visual map, the term "semantic map" may refer to a semantic image that is a map. That is, a semantic map is a semantic image that is associated with a coordinate system.

As used herein, the term "appearance" of an image refers to a global appearance information and style, such as color and texture, while attenuating, ignoring, or discarding, exact objects' pose, shape, perceived semantics of the objects and their surrounding, and scene's spatial layout. In one example, a [CLS] token of a DINO-ViT model of an image may be used as a representation of the image appearance.

As used herein, the term "structure" of an image refers to a spatial layout, such as objects' pose, outline, shape, and scene's spatial layout, while attenuating, ignoring, or discarding, the image appearance, such as local texture patterns or style. In one example, deep spatial features extracted from DINO-ViT model of an image may be used as a representation of the image structure.

Any step or method herein may be based on, or may use, any step or method for semantically transferring the visual appearance of one natural image to another that is described in an article by Narek Tumanyan; Omer Bar-Tal; Shai Bagon; and Tali Dekel dated 2 Jan. 2022 (arXiv: 2201.00424 [cs.CV], https://doi.org/10.48550/arXiv.2201.00424) and entitled: "*Splicing ViT Features for Semantic Appearance Transfer*", which is incorporated in its entirety for all purposes as if fully set forth herein. The article goal is to generate an image in which objects in a source structure image are "painted" with the visual appearance of their semantically related objects in a target appearance image. The method works by training a generator given only a single structure/appearance image pair as input. To integrate semantic information into our framework—a pivotal component in tackling this task—the key idea is to leverage a pre-trained and fixed Vision Transformer (ViT) model which serves as an external semantic prior. Specifically, novel representations of structure and appearance extracted from deep ViT features are derived, untwisting them from the learned self-attention modules. An objective function is then established that splices the desired structure and appearance representations, interweaving them together in the space of ViT features.

The framework, termed "Splice", does not involve adversarial training, nor does it require any additional input information such as semantic segmentation or correspondences, and can generate high-resolution results, e.g., work in HD. High quality results on a variety of in-the-wild image pairs are demonstrated, under significant variations in the number of objects, their pose and appearance. Given two input images—a source structure image and a target appearance image-our method generates a new image in which the structure of the source image is preserved, while the visual appearance of the target image is transferred in a semantically aware manner. That is, objects in the structure image are "painted" with the visual appearance of semantically related objects in the appearance image. The method leverages a self-supervised, pre-trained ViT model as an external semantic prior. This allows to train our generator only on a single input image pair, without any additional information (e.g., segmentation/correspondences), and without adversarial training. Thus, the framework can work across a variety of objects and scenes, and can generate high quality results in high resolution (e.g., HD).

Figure 3:
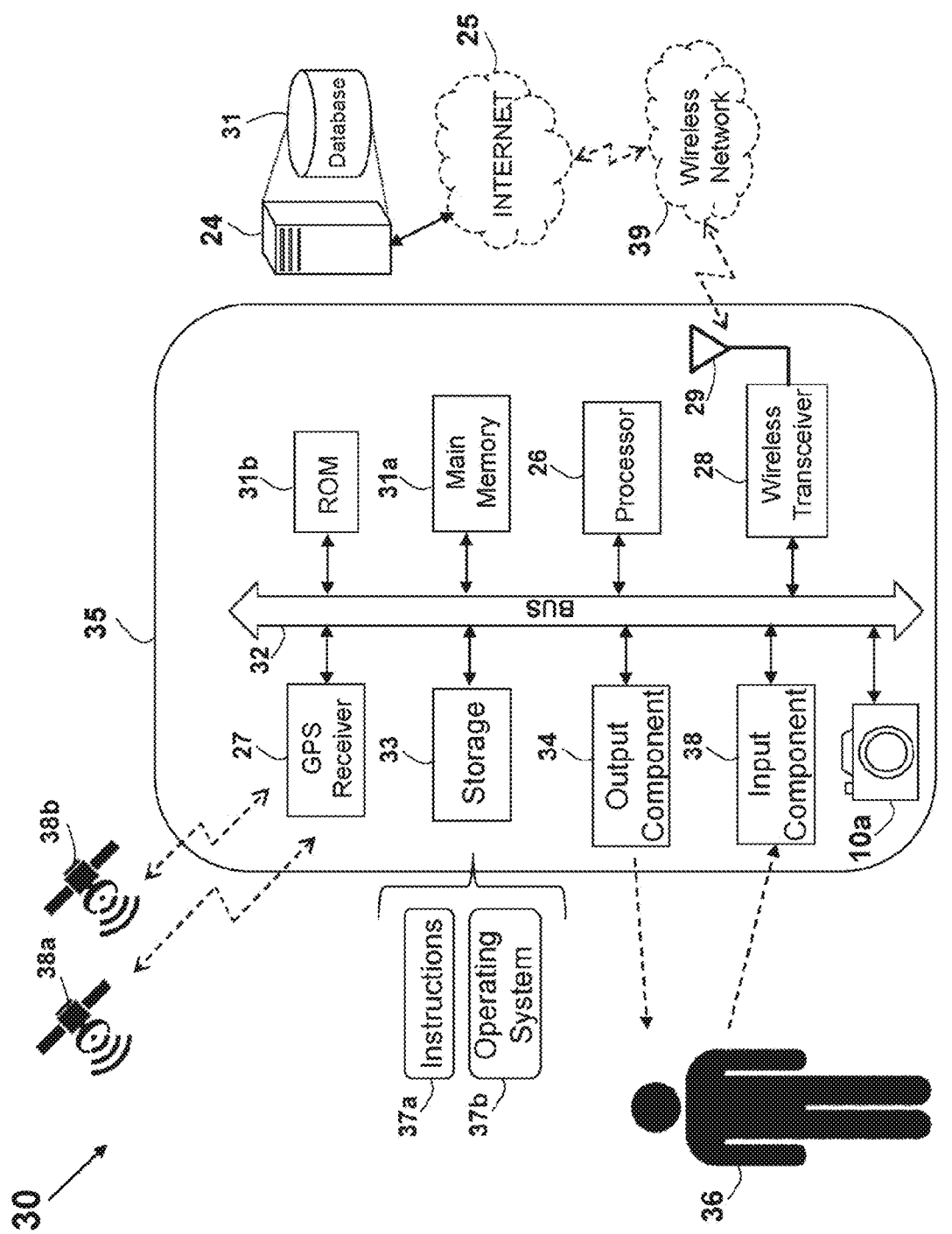
FIG. 3 schematically illustrates a schematic diagram of an example of a computer device.
Figure 4:
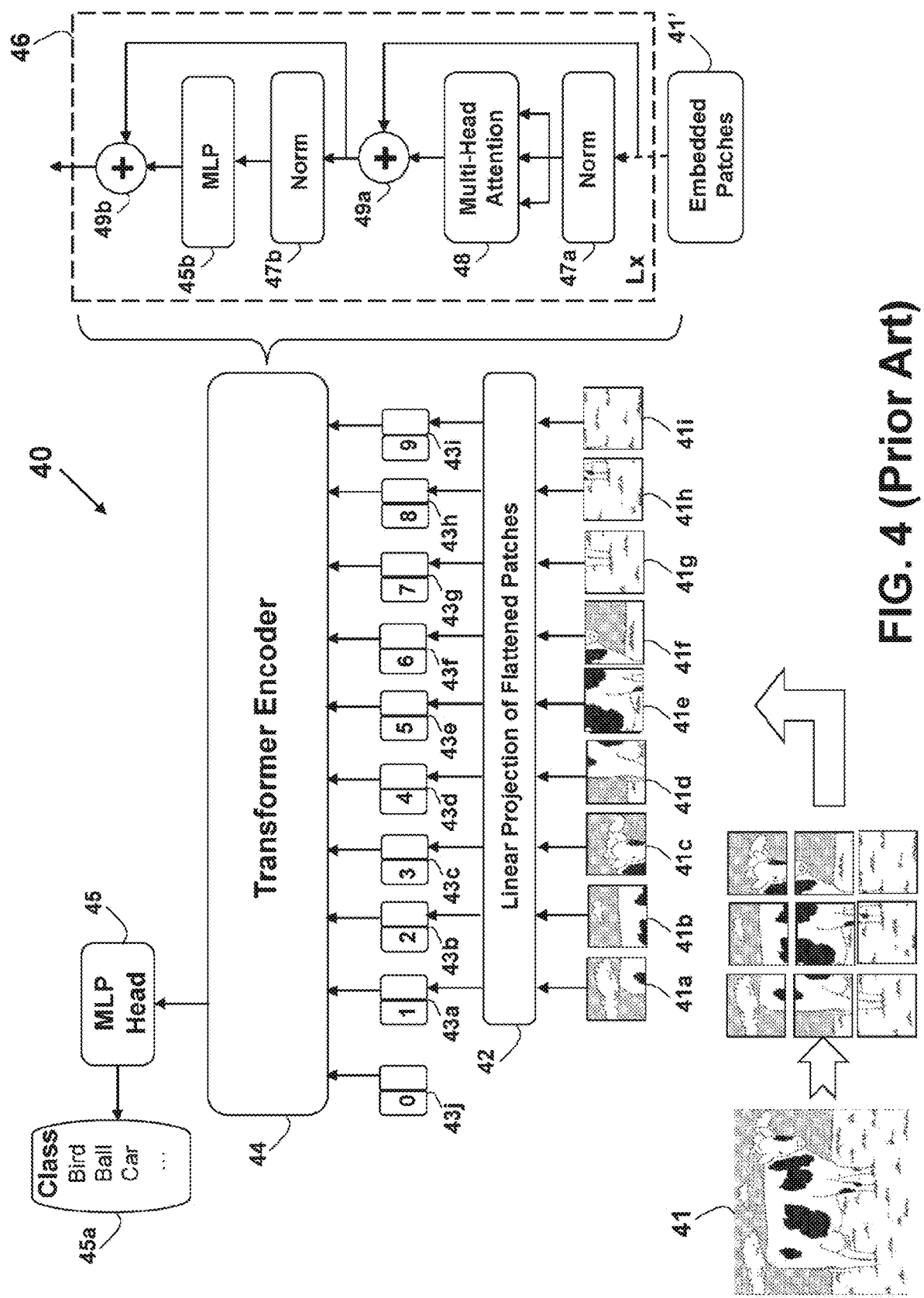
FIG. 4 schematically illustrates a schematic diagram of an architecture of a Vision Transformer (ViT) model.
Figure 5:
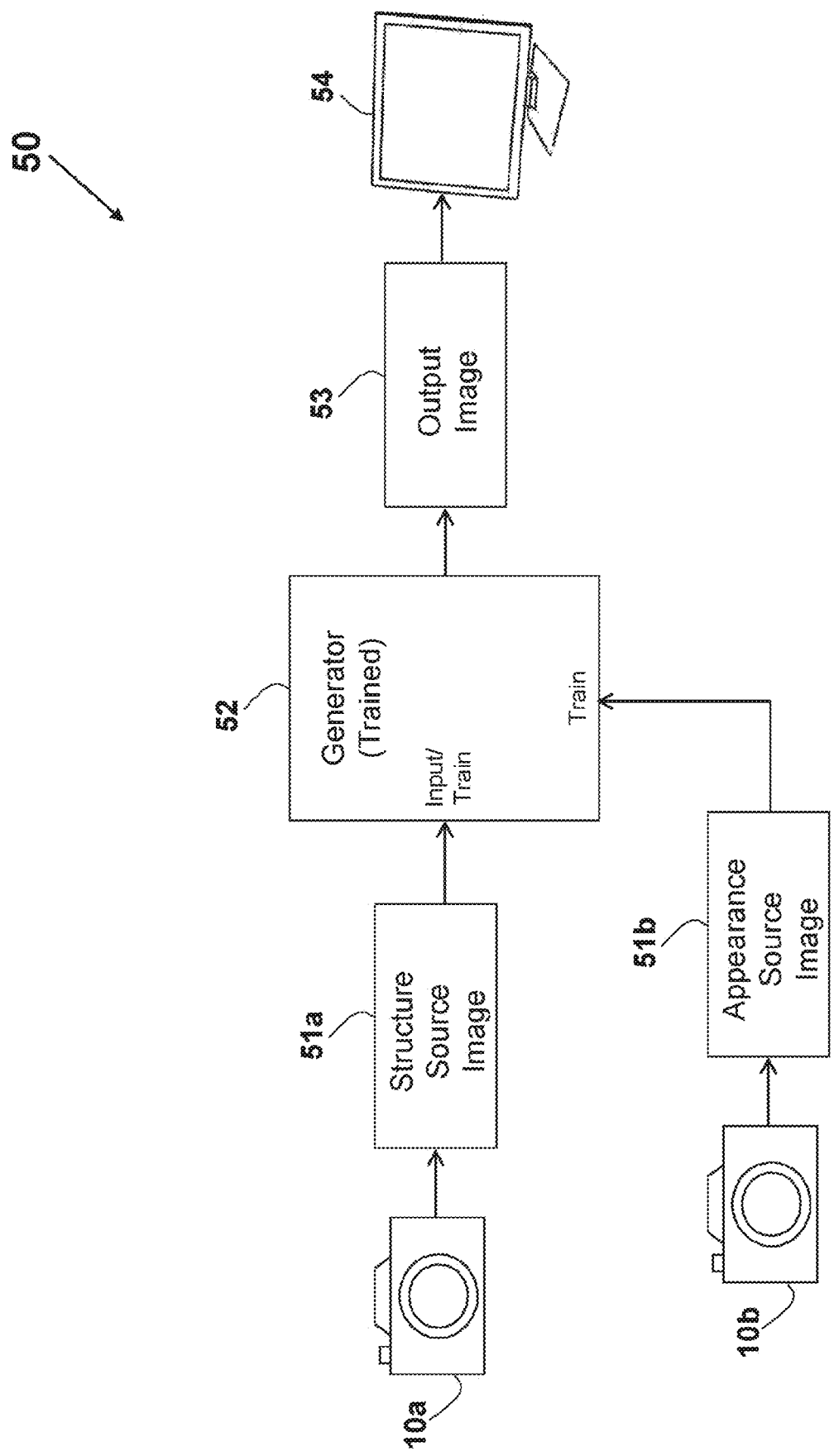
FIG. 5 pictorially depicts an arrangement for data flow for semantic appearance transfer from a first captured image to another captured image.

An example of an architecture or system 50 for semantically transferring the visual appearance of semantically-related natural images is shown in FIG. 5. Such splicing of structure and appearance across semantically related images or objects uses a first image 51*a*, referred to as 'Structure Source Image' that is captured by a camera 10*a*, and a second image 51*b*, referred to as 'Appearance Source Image' that is captured by a camera 10*b*. The first and second images are fed to a generator 52, as part of a training, or as part of an operation of the generator 52. The generator 52, without any user guidance or any other human intervention, produces an output image 53, which may be displayed on a display 54, in which the structure of the source image 51*a* is substantially preserved, while the visual appearance of the appearance image 51*b* transferred in a semantically aware manner. Objects in the structure image 51*a* are 'painted' with the visual appearance of the semantically-related objects in the appearance image 51*b*. Typically, the generator 52 is fed with a single input image pair 51*a* and 51*b*, without any additional information (e.g., segmentation/correspondences), and without adversarial training. The generator 52 is typically implemented as a firmware or software executed by a processor, such as the processor 26 shown as part of the device 35 shown in FIG. 3. The firmware or software may be stored in a memory, such as such as the ROM 31*b*, the main memory 31*a*, and a storage 33.

Figure 5A:
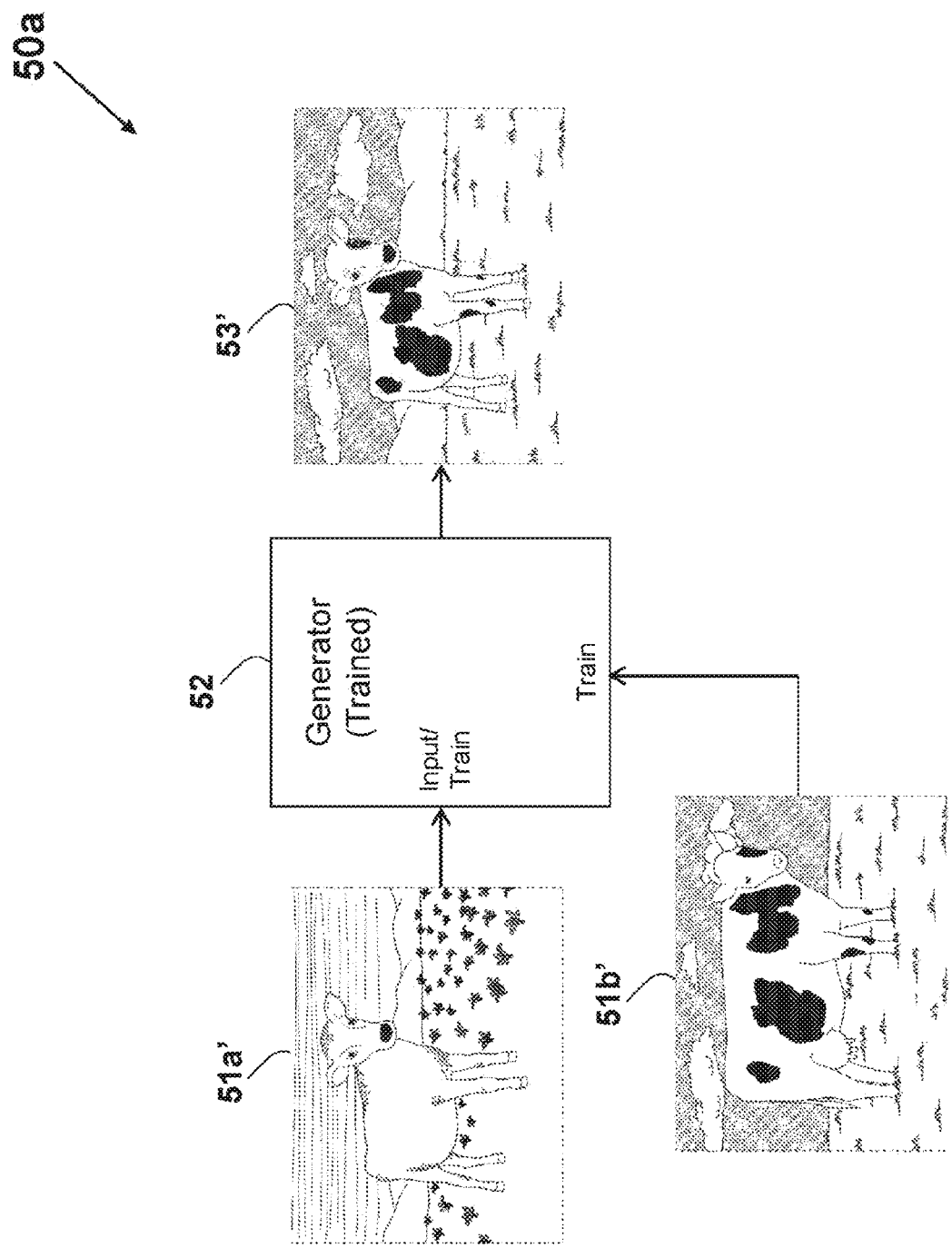
FIGS. 5a and 5b pictorially depict arrangements for semantic appearance transfer from an example of a first captured image to another example of a captured image.
Figure 5B:
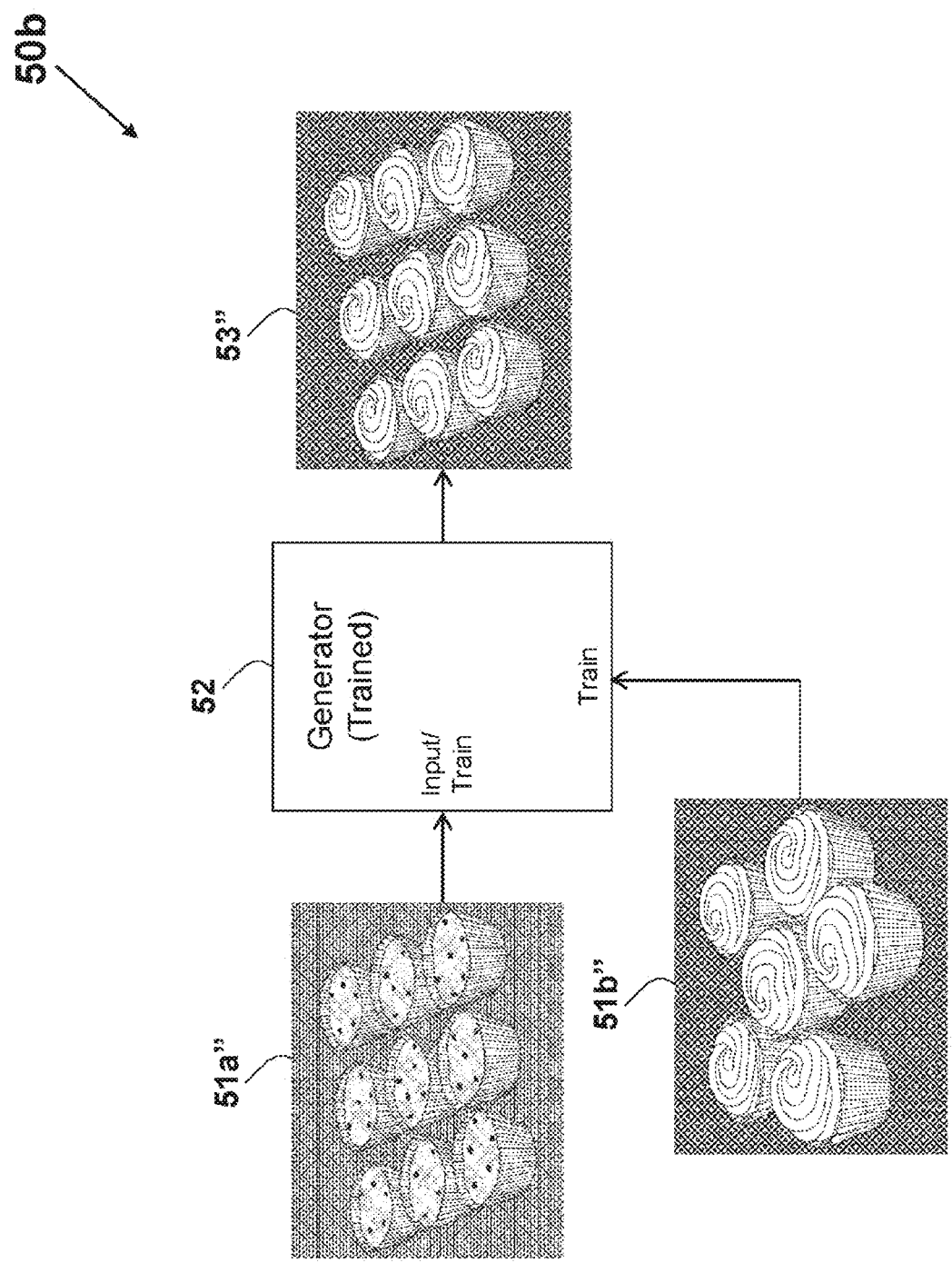

In addition to identifying pose, appearance and shape differences between the two images 51*a* and 51*b*, the generator 52 identifies associated regions in both images 51*a* and 51*b* that are semantically related, and transfers the visual appearance between these matching regions. In the output image 53, objects in the structure image 51*a* are "painted" with the visual appearance of semantically related objects in the appearance image 51*b*. The appearance image 51*b* is transferred to the output image 53 in a realistic manner, while preserving the structure of the structure image 51*a*. An example of an output image 53' generated by the generator 52 is shown in an arrangement 50*a* shown in FIG. 5*a*. In this example of an output image 53', the visual appearance of a spotted cow in a flower field shown in the appearance source image example 51*b*' is transferred to the non-spotted cow in a grass field in the structure source image example 51*a*'. Similarly, an example of an output image 53'' generated by the generator 52 is shown in an arrangement 50*b* shown in FIG. 5*b*. In this example of an output image 53'', the visual appearance of cupcakes in the appearance source image example 51*b*'' is transferred to other cupcakes in the structure source image example 51*a*''.

Figure 6:
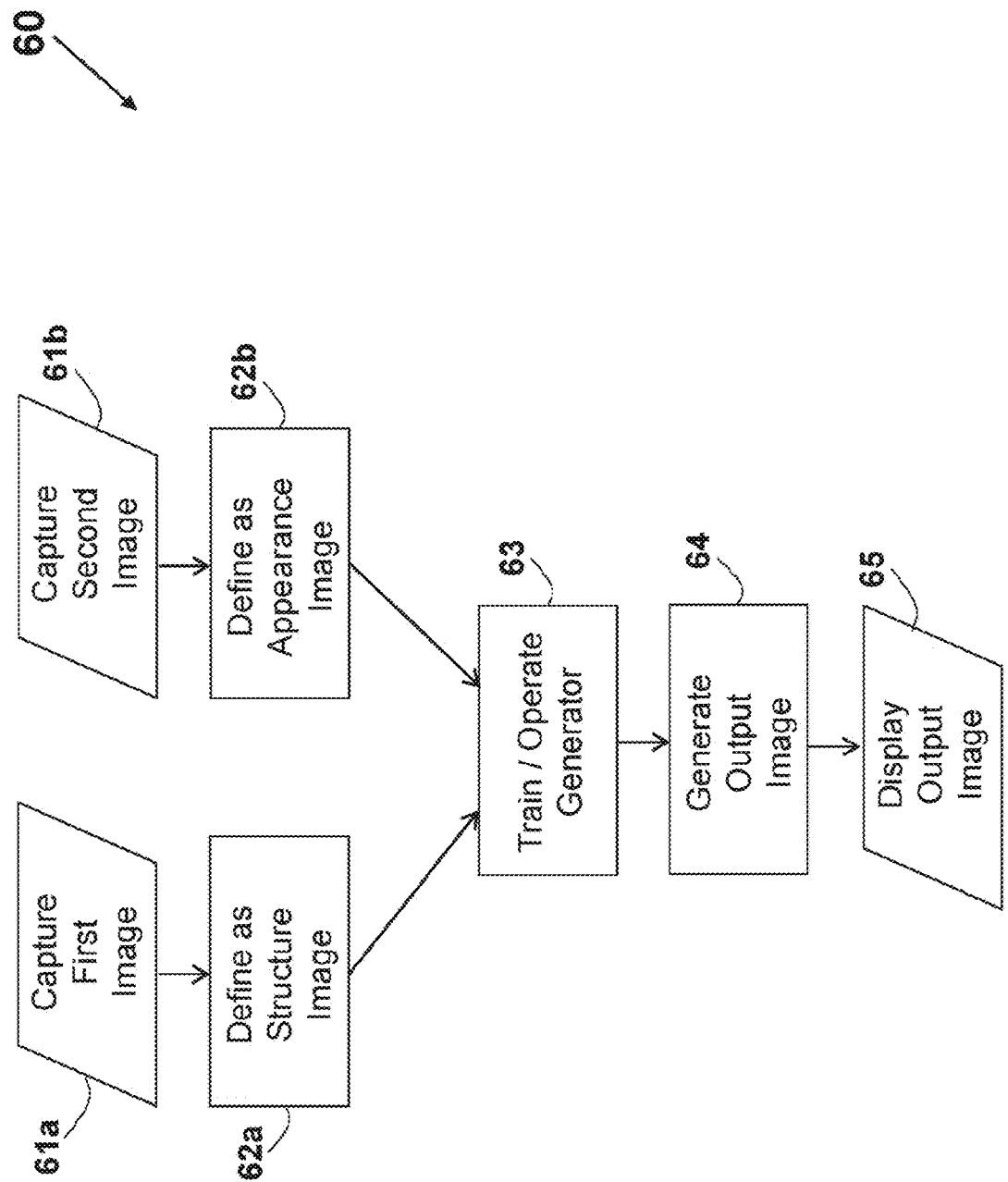
FIG. 6 schematically illustrates a simplified flow-chart of semantic appearance transfer from a first captured image to another captured image.

An example of a flow-chart 60 for semantic appearance transfer is shown in FIG. 6. A first image is captured, such as by the camera 10*a* in the arrangement 50, as part of a "Capture First Image" step 61*a*, and is designated as a "Structure Source Image" 51*a* as part of a "Define as Structure Image" step 62*a*. Similarly, a second image is captured, such as by the camera 10*b* in the arrangement 50, as part of a "Capture second Image" step 61*b*, and is designated as a "Appearance Source Image" 51*b* as part of a "Define as Appearance Image" step 62b. The images are fed to the generator 52 as part of a "Train/Operate Generator" step 63, which in turn generates the output image 53 as part of a "Generate Output Image" step 64. The output image 53 may be displayed to a user on a display 54 as part of a "Display Output Image" step 65.

In one example, the "Structure Source Image" 51a. "Appearance Source Image" 51b, and the output image 53 may have the same size or resolution. For example, the "Structure Source Image" 51a and the "Appearance Source Image" 51b may have the same size or resolution. Alternatively or in addition, the resolution of one of, or each of, the "Structure Source Image" 51a, "Appearance Source Image" 51b, and the output image 53, may be at least 50, 100, 200, 500, 1,000, 1,500, 2,000, 5,000, 10,000, or 20,000 pixels (px). Alternatively or in addition, the resolution of one of, or each of, the "Structure Source Image" 51a, "Appearance Source Image" 51b, and the output image 53, may be less than 100, 200, 500, 1,000, 1,500, 2,000, 5,000, 10,000, 20,000 or 30,000 pixels (px).

The transfer of the visual appearance shown in the output image 53 may be across objects, where the target visual appearance of one or more objects in the appearance source image 51b is transferred to their semantically related objects in the structure source image 51a, even under significant variations in pose, number of objects, and appearance between the input images. In the example shown in the arrangement 50a, the output image 53', the visual appearance of a spotted cow in a flower field shown in the appearance source image example 51b' is transferred to the non-spotted cow in a grass field in the structure source image example 51a'. Alternatively or in addition, the transfer of the visual appearance shown in the output image 53 may be within objects, where visual appearance is transferred between corresponding body parts or object elements, such as in the example shown in FIG. 5b, where in the output image 53", the visual appearance of cupcakes in the appearance source image example 51b" is transferred to other count and organization of cupcakes, in the structure source image example 51a". In one example, the arrangement 50 successfully transfers the appearance across semantically related regions, without adversarial loss. In addition to displaying the output image 53 on the display 54, the "Structure Source Image" 51a, "Appearance Source Image" 51b may equally be displayed on the display 54. Both of the captured images may be displayed concurrently or at separate times. Further, the captured images (separately or together) may be displayed together or concurrently with the output image 53 on the display 54.

Each of the cameras 10a and 10b of the arrangement 50 shown in FIG. 5 may include, may comprise, or may be based on, the camera 10 shown in FIG. 1. Further, while the two cameras 10a and 10b are used as part of the architecture 50 shown in FIG. 5, a single camera may be used for capturing both the structure source image 51a and the appearance source image 51b. For example, the two images may be captured using different poses of the same camera, or may be captured at different times. Further, the two cameras 10a and 10b may capture the same, or substantially the same, area or scene, such as an in-the-wild scene, at the same time or at different times. Similarly, the images may be captured by two different cameras in the same time, and may capture partially or fully overlapping scenes or views, such as capturing a same or overlapping Field-of-View (FOV), or may capture non-overlapping scenes or views.

In one example, the cameras 10a and 10b are different cameras, but are enclosed in, or attached to, a same enclosure (such of a single device). Alternatively or in addition, the cameras 10a and 10b may be enclosed in, or attached to, different and distinct enclosures, such as respectively belonging to different or distinct devices.

The first camera 10a or the second camera 10b (or both) may further comprise a digital still or video camera for capturing images along of, or centered at, an optical axis, and the digital camera may comprise an optical lens for focusing received light, the lens being mechanically oriented to guide the captured images; a photosensitive image sensor array disposed approximately at an image focal point plane of the optical lens for capturing the image and producing an analog signal representing the image; and an analog-to-digital (A/D) converter coupled to the image sensor array for converting the analog signal to a digital data representation of the captured image. The image sensor array may respond to visible or non-visible light, such as infrared, ultraviolet, X-rays, or gamma rays. The image sensor array may use, or may be based on, semiconductor elements that use the photoelectric or photovoltaic effect, such as Charge-Coupled Devices (CCD) or Complementary Metal-Oxide-Semiconductor Devices (CMOS) elements.

One of, or each of, the cameras 10a and 10b may be an optical-based imaging video camera that is operative to capture images or scenes in a visible or non-visible spectrum, or may equally use a LiDAR camera or scanner, as well as thermal camera or Synthetic Aperture Radar (SAR), as a substitute to the still or video camera 10. The camera may be an optical-based imaging video camera that is operative to capture images or scenes in a visible or non-visible spectrum, or may equally use a LiDAR camera or scanner, as well as thermal camera or Synthetic Aperture Radar (SAR), as a substitute to the still or video camera 10. In one example, one of, or each of, the cameras 10a and 10b may comprise a scanner, and the image is captured as part of the "Capture First Image" step 61a or as part of the "Capture Second Image" step 61b using a scanning system that employs a sensor with a narrow field of view (i.e., IFOV) that sweeps over the terrain to build up and produce a two-dimensional image of the surface. Such a scanning system that is used to collect data over a variety of different wavelength ranges is called a MultiSpectral Scanner (MSS), and is the most commonly used scanning system. There are two main modes or methods of scanning employed to acquire multispectral image data-across-track scanning, and along-track scanning.

One of, or each of, the cameras 10a and 10b may be an optical-based imaging video camera that is operative to capture images or scenes in a visible or non-visible spectrum, or may equally use a LiDAR camera or scanner or Synthetic Aperture Radar (SAR), as well as thermal camera, as a substitute to the still or video camera 34.

In one example, one of, or each of, the cameras 10a and 10b may comprise a scanner, and the image is captured as part of the "Capture First Image" step 61a or as part of the "Capture Second Image" step 61b (or both) may use a scanning system that employs a sensor with a narrow field of view (i.e., IFOV) that sweeps over the terrain to build up and produce a two-dimensional image of the surface. Such a scanning system that is used to collect data over a variety of different wavelength ranges is called a MultiSpectral Scanner (MSS), and is the most commonly used scanning system. There are two main modes or methods of scanning employed to acquire multispectral image data-across-track scanning, and along-track scanning.

Across-track scanners, referred to also as whiskbroom scanners, scan the Earth in a series of lines, where the lines are oriented perpendicular to the direction of motion of the sensor platform (i.e., across the swath). Each line is scanned from one side of the sensor to the other, using a rotating mirror. As the platform moves forward over the Earth, successive scans build up a two-dimensional image of the Earth's surface. So, the Earth is scanned point by point and line after line. The incoming reflected or emitted radiation is separated into several spectral components that are detected independently. A bank of internal detectors, each sensitive to a specific range of wavelengths, detects and measures the energy for each spectral band and then, as an electrical signal, they are converted to digital data and recorded for subsequent computer processing. The IFOV of the sensor and the altitude of the platform determine the ground resolution cell viewed, and thus the spatial resolution. The angular field of view is the sweep of the mirror, measured in degrees, used to record a scan line, and determines the width of the imaged swath. Airborne scanners typically sweep large angles (between 90° and 120°), while satellites, because of their higher altitude need only to sweep fairly small angles (10-20°) to cover a broad region. Because the distance from the sensor to the target increases towards the edges of the swath, the ground resolution cells also become larger and introduce geometric distortions to the images. Also, the length of time the IFOV "sees" a ground resolution cell as the rotating mirror scans (called the dwell time), is generally quite short and influences the design of the spatial, spectral, and radiometric resolution of the sensor.

Along-track scanners also use the forward motion of the platform to record successive scan lines and buildup a two-dimensional image, perpendicular to the flight direction (FIG. 5c). However, instead of a scanning mirror, they use a linear array of detectors (so-called charge-coupled devices, CCDs) located at the focal plane of the image formed by lens systems, which are "pushed" along in the flight track direction (i.e., along track). These systems are also referred to as push broom scanners, as the motion of the detector array is analogous to a broom being pushed along a floor. A separate linear array is required to measure each spectral band or channel. For each scan line, the energy detected by each detector of each linear array is sampled electronically and digitally recorded Along-track scanners with linear arrays have several advantages over across-track mirror scanners. The array of detectors combined with the pushbroom motion allows each detector to "see" and measure the energy from each ground resolution cell for a longer period of time (dwell time). This allows more energy to be detected and improves the radiometric resolution. The increased dwell time also facilitates smaller IFOVs and narrower bandwidths for each detector. Thus, finer spatial and spectral resolution can be achieved without impacting radiometric resolution. Because detectors are usually solid-state microelectronic devices, they are generally smaller, lighter, require less power, and are more reliable and last longer because they have no moving parts. On the other hand, cross-calibrating thousands of detectors to achieve uniform sensitivity across the array is necessary and complicated.

In one example, one of, or each of, the cameras 10a and 10b, is a video camera that captures video the "Capture First Image" step 61a or as part of the "Capture Second Image" step 61b (or both), and extracts a single frame to be designated as a 'structure image' 51a or as an 'appearance image' 51b. Since the analysis is on an image that consists of, or is part of an extracted frame on a frame-by-frame basis, a single frame may be extracted from the received video stream for further processing.

The format of the Structure Source Image 51a or of the Appearance Source Image 51b may be in any format, and may further be according to, compatible with, or based on, a standard format, such as TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. Further, the format of the first image, the second image, the third image, or any combination thereof, uses, is compatible with, or is based on, Portable Network Graphics (PNG), Graphics Interchange Format (GIF), Joint Photographic Experts Group (JPEG), Windows bitmap (BMP), Exchangeable image file format (Exif), Tagged Image File Format (TIFF), or Raw Image Formats (RIF).

The generator 52 may be based on, may include, or may use, an Artificial Neural Network (ANN) model or architecture. In one example, A U-Net architecture, with a 5-layer encoder and a symmetrical decoder. Each of the layers may comprise 3×3 Convolutions, followed by BatchNorm, and LeakyReLU activation. The encoder's channels dimensions are [3→16→32→64→128→128], while the decoder follows a reversed order. In each level of the encoder, an additional 1×1 Convolution layer is added and concatenate the output features to the corresponding level of the decoder. Lastly, a 1×1 Convolution layer is added followed by Sigmoid activation to get the final RGB output. Any ANN herein, may comprise, may use, or may be based on, a method, scheme or architecture such as U-Net, which is based on the fully convolutional network to supplement a usual contracting network by successive layers, where pooling operations are replaced by upsampling operators. These layers increase the resolution of the output, and a successive convolutional layer can then learn to assemble a precise output based on this information.

Any ANN herein, may comprises, may use, or may be based on, any Convolutional Neural Network (CNN). In one example, the CNN is trained to detect, identify, classify, localize, or recognize one or more objects, the structure, or the appearance. In one example, a one-stage approach may be used, where the CNN is used once. Alternatively, a two-stage approach may be used, where the CNN is used twice for the object detection. Any ANN herein, may comprise, may use, or may be based on, a pre-trained neural network that is based on a large visual database designed for use in visual object recognition, that is trained using crowdsourcing, such as Imagenet.

Any ANN herein, may comprise, may use, or may be based on, a Convolutional Neural Network (CNN). In one example, the CNN is trained to detect, identify, classify, localize, or recognize one or more objects, the structure, or the appearance. In one example, a one-stage approach may be used, where the CNN is used once. Alternatively, a two-stage approach may be used, where the CNN is used twice for the object detection. Further, using the CNN may comprise, may use, or may be based on, a pre-trained neural network that is based on a large visual database designed for use in visual object recognition, that is trained using crowdsourcing, such as Imagenet.

Any ANN herein, may comprise, may use, or may be based on, a method, scheme or architecture such as YOLO, for example YOLOv1, YOLOv2, or YOLO9000. Such a scheme includes defining as a regression problem to spatially separated bounding boxes and associated class probabilities, where a single neural network predicts bounding boxes and class probabilities directly from full images in one evaluation. After classification, post-processing is used to refine the bounding boxes, eliminate duplicate detections, and rescore the boxes based on other objects in the scene. The object detection is framed as a single regression problem, straight from image pixels to bounding box coordinates and class probabilities. A single convolutional network simultaneously predicts multiple bounding boxes and class probabilities for those boxes. YOLO trains on full images and directly optimizes detection performance. In one example, YOLO is implemented as a CNN and has been evaluated on the PASCAL VOC detection dataset.

Any ANN herein, may comprise, may use, or may be based on, Regions with CNN features (R-CNN), or any other scheme that uses selective search to extract just 2000 regions from the image, referred to as region proposals. Then, instead of trying to classify a huge number of regions, only 2000 regions are handled. These 2000 region proposals are generated using a selective search algorithm, that includes Generating initial sub-segmentation for generating many candidate regions, using greedy algorithm to recursively combine similar regions into larger ones, and using the generated regions to produce the final candidate region proposals. These 2000 candidate region proposals are warped into a square and fed into a convolutional neural network that produces a 4096-dimensional feature vector as output. The CNN acts as a feature extractor and the output dense layer consists of the features extracted from the image and the extracted features are fed into an SVM to classify the presence of the object within that candidate region proposal. In addition to predicting the presence of an object within the region proposals, the algorithm also predicts four values which are offset values to increase the precision of the bounding box. The R-CNN may be a Fast R-CNN, where the input image is fed to the CNN to generate a convolutional feature map. From the convolutional feature map, the regions of proposals are identified and warped into squares, and by using a RoI pooling layer they are reshaped into a fixed size so that it can be fed into a fully connected layer. From the RoI feature vector, a softmax layer is used to predict the class of the proposed region and also the offset values for the bounding box. Further, the R-CNN may be a Faster R-CNN, where instead of using selective search algorithm on the feature map to identify the region proposals, a separate network is used to predict the region proposals. The predicted region proposals are then reshaped using a RoI pooling layer which is then used to classify the image within the proposed region and predict the offset values for the bounding boxes. The R-CNN may use, comprise, or be based on a Region Proposal Network (RPN) that shares full-image convolutional features with the detection network, thus enabling nearly cost-free region proposals.

Any ANN herein, may comprise, may use, or may be based on, a method, scheme or architecture such as RetinaNet, that is a one-stage object detection model that is incorporates two improvements over existing single stage object detection models-Feature Pyramid Networks (FPN) and Focal Loss. The Feature Pyramid Network (FPN) may be built in a fully convolutional fashion architecture that utilizes the pyramid structure. In one example, pyramidal feature hierarchy is utilized by models such as Single Shot detector, but it doesn't reuse the multi-scale feature maps from different layers. Feature Pyramid Network (FPN) makes up for the shortcomings in these variations, and creates an architecture with rich semantics at all levels as it combines low-resolution semantically strong features with high-resolution semantically weak features, which is achieved by creating a top-down pathway with lateral connections to bottom-up convolutional layers. The construction of FPN involves two pathways which are connected with lateral connections: Bottom-up pathway and Top-down pathway and lateral connections. The bottom-up pathway of building FPN is accomplished by choosing the last feature map of each group of consecutive layers that output feature maps of the same scale. These chosen feature maps will be used as the foundation of the feature pyramid. Using nearest neighbor upsampling, the last feature map from the bottom-up pathway is expanded to the same scale as the second-to-last feature map. These two feature maps are then merged by element-wise addition to form a new feature map. This process is iterated until each feature map from the bottom-up pathway has a corresponding new feature map connected with lateral connections.

Focal Loss (FL) is an enhancement over Cross-Entropy Loss (CE) and is introduced to handle the class imbalance problem with single-stage object detection models. Single Stage models suffer from an extreme foreground-background class imbalance problem due to dense sampling of anchor boxes (possible object locations). In RetinaNet, at each pyramid layer there can be thousands of anchor boxes. Only a few will be assigned to a ground-truth object while the vast majority will be background class. These easy examples (detections with high probabilities) although resulting in small loss values can collectively overwhelm the model. Focal Loss reduces the loss contribution from easy examples and increases the importance of correcting miss-classified examples. Any ANN herein, may comprise, may use, or may be based on, a method, scheme or architecture that is Graph Neural Network (GNN) that processes data represented by graph data structures that capture the dependence of graphs via message passing between the nodes of graphs, such as GraphNet, Graph Convolutional Network (GCN), Graph Attention Network (GAT), or Graph Recurrent Network (GRN).

Any ANN herein, may comprise, may use, or may be based on, a method, scheme or architecture such as MobileNet, for example MobileNetV1, MobileNetV2, or MobileNetV3, that is based on a streamlined architecture that uses depthwise separable convolutions to build light weight deep neural networks, that is specifically tailored for mobile and resource constrained environments, and improves the state-of-the-art performance of mobile models on multiple tasks and benchmarks as well as across a spectrum of different model sizes. Any ANN herein, may comprise, may use, or may be based on, a method, scheme or architecture such as U-Net, which is based on the fully convolutional network to supplement a usual contracting network by successive layers, where pooling operations are replaced by upsampling operators. These layers increase the resolution of the output, and a successive convolutional layer can then learn to assemble a precise output based on this information.

Any ANN herein, may comprise, may use, or may be based on, a method, scheme or architecture such as Visual Geometry Group (VGG) VGG-Net, such as VGG 16 and VGG 19, respectively having 16 and 19 weight layers. The VGG Net extracts the features (feature extractor) that can distinguish the objects and is used to classify unseen objects, and was invented with the purpose of enhancing classification accuracy by increasing the depth of the CNNs. There are five max pooling filters embedded between convolutional layers in order to down-sample the input representation. The stack of convolutional layers is followed by 3 fully connected layers, having 4096, 4096 and 1000 channels, respectively, and the last layer is a soft-max layer. A thorough evaluation of networks of increasing depth is using an architecture with very small (3×3) convolution filters, which shows that a significant improvement on the prior-art configurations can be achieved by pushing the depth to 16-19 weight layers.

The display 54, as well as any display screen herein, may consist of, or may comprise, a monochrome, grayscale or color display and consists of an array of light emitters or light reflectors, or a projector that is based on an Eidophor, Liquid Crystal on Silicon (LCOS or LCOS), LCD, MEMS or Digital Light Processing (DLP™) technology. Any projector herein may consist of, or may comprise, a virtual retinal display. Further, any display or any display screen herein may consist of, or may comprise, a 2D or 3D video display that may support Standard-Definition (SD) or High-Definition (HD) standards, and may be capable of scrolling, static, bold or flashing the presented information.

Alternatively or in addition, the display 54 or any display screen herein, may consist of, or may comprise, an analog display having an analog input interface supporting NTSC, PAL or SECAM formats, and the analog input interface may include RGB, VGA (Video Graphics Array), SVGA (Super Video Graphics Array), SCART or S-video interface. Alternatively or in addition, the display 54 or any display screen herein may consist of, or may comprise, a digital display having a digital input interface that may include IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video or DVB (Digital Video Broadcast) interface. Alternatively or in addition, the display 54 or any display screen herein may consist of, or may comprise, a Cathode-Ray Tube (CRT), a Field Emission Display (FED), an Electroluminescent Display (ELD), a Vacuum Fluorescent Display (VFD), or an Organic Light-Emitting Diode (OLED) display, a passive-matrix (PMOLED) display, an active-matrix OLEDs (AMOLED) display, a Liquid Crystal Display (LCD) display, a Thin Film Transistor (TFT) display, an LED-backlit LCD display, or an Electronic Paper Display (EPD) display that may be based on Gyricon technology, Electro-Wetting Display (EWD), or Electrofluidic display technology. Alternatively or in addition, the display 54 or any display screen herein may consist of, or may comprise, a laser video display that is based on a Vertical-External-Cavity Surface-Emitting-Laser (VECSEL) or a Vertical-Cavity Surface-Emitting Laser (VCSEL).

The components of the arrangement 50 shown in FIG. 5 include the camera 10a that captures the structure image 61a of the flow chart 60 shown in FIG. 6, the camera 10b that captures the appearance image 61b of the flow chart 60 shown in FIG. 6, the generator 52 that executes at least part of the "Train/Operate Generator" step 63 of the flow chart 60 shown in FIG. 6, that may be implemented by a processor that executes software or firmware, and the display 54 for executing the "Display Output Image" step 65.

In one example, all the components of the arrangement 50 are enclosed in a single enclosure, attached to a single housing, or integrated or part of a single device. Alternatively or in addition, each of the components of the arrangement 50 is enclosed in a distinct or separate enclosure, attached to a separate or distinct housing, or is integrated or part of a separate or distinct device. Alternatively or in addition, part of the components may be enclosed in a single enclosure, attached to a single housing, or integrated or part of a single device. For example, the two cameras 10a and 10b may be enclosed in a single enclosure, attached to a single housing, or integrated or part of a single device. In another example, the camera 10a that captures the structure image 61a of the flow chart 60 shown in FIG. 6, the camera 10b that captures the appearance image 61b of the flow chart 60 shown in FIG. 6, and the generator 52 that executes at least part of the "Train/Operate Generator" step 63 of the flow chart 60 shown in FIG. 6, are enclosed in a single enclosure, attached to a single housing, or integrated or part of a single device. Further, the camera 10a that captures the structure image 61a of the flow chart 60 shown in FIG. 6, the camera 10b that captures the appearance image 61b of the flow chart 60 shown in FIG. 6, and the display 54 for executing the "Display Output Image" step 65, are enclosed in a single enclosure, attached to a single housing, or integrated or part of a single device.

In the case where at least part of the components of the arrangement 50 are enclosed in, attached to, or part of, multiple devices or enclosures, wired or wireless communication may be used for exchanging data between these devices or enclosures. In case of communication over a wired connection or communication, each of the connected devices uses a connector for connecting to the wired network medium, and a wired transceiver for transmitting data to, and receiving data from, the wired network via the connector. In case of communication over a wireless connection or communication, such as over the wireless network 39 of the arrangement 30 shown in FIG. 3, each of the communicating devices uses an antenna, such as the antenna 29 of the device 35 shown in FIG. 3, and a wireless transceiver, such as the wireless transceiver 28 of the device 35 shown in FIG. 3, for transmitting data to, and receiving data from, the wireless network via the antenna 29. Further, in the case where at least part of the components of the arrangement 50 are enclosed in, attached to, or part of, multiple devices or enclosures, they may communicate over the Internet 25.

Figure 7:
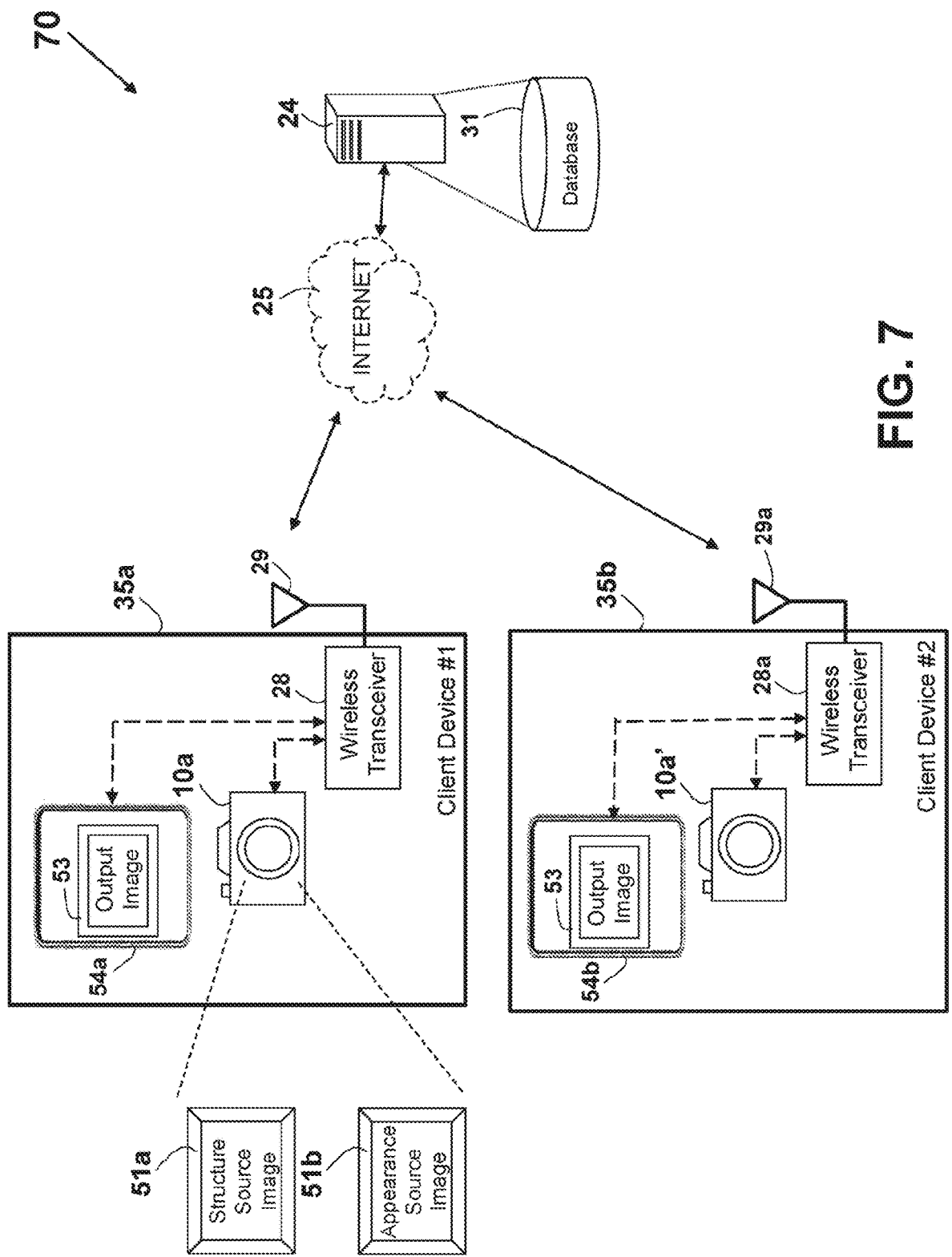
FIGS. 7-7d pictorially depict arrangements for semantic appearance transfer using different devices communicating over the Internet.

An arrangement 70 shown in FIG. 7 examples the case where the different components of the arrangement 50 shown in FIG. 5 are housed within three different and communicatively coupled devices. A "Client Device #1" device 35a, that may be identical, similar, or different from the device 35 shown as part of the arrangement 30 in FIG. 3, includes a camera 10a, that is used as both the camera 10a of the arrangement 50 for capturing the 'Structure Source Image' 51a and as the camera 10b of the arrangement 50 for capturing the 'Appearance Source Image' 51b. The output image 53 may be displayed on the display 54a, that corresponds to the display 54 of the arrangement 50 shown in FIG. 5. Similar to the device 35 shown as part of the arrangement 30 in FIG. 3, the device 35a may communicate wirelessly using the wireless transceiver 28 and the antenna 29. Further, a "Client Device #2" device 35b, that may be identical, similar, or different from the device 35 shown as part of the arrangement 30 in FIG. 3, includes a camera 10a', that may be used the camera 10a of the arrangement 50 for capturing the 'Structure Source Image' 51a, or as the camera 10b of the arrangement 50 for capturing the 'Appearance Source Image' 51b. The output image 53 may be displayed on the display 54b, that may correspond to the display 54 of the arrangement 50 shown in FIG. 5. Similar to the device 35 shown as part of the arrangement 30 in FIG. 3, the device 35b may communicate wirelessly using the wireless transceiver 28a and the antenna 29a.

The generator 52 that executes at least part of the "Train/Operate Generator" step 63 of the flow chart 60 shown in FIG. 6, may be implemented by a processor that executes software or firmware, that is part of the server 24, that may include (or be in communication with, the database 31. The communication between the server 24, the device 35a, and the device 35b, may be over the Internet 25. In one example, the server device 24 is exampled herein as a dedicated device. Alternatively ort in addition, the functionalities provided by the server device 24 may be part of a cloud-based service, where the server device 24 is implemented as Infrastructure as a Service (IaaS) or as a Software as a Service (SaaS) (or as a Platform as a Service (PaaS)), providing the benefits of a cloud based computing, such as consolidation, virtualization, better cost, reliability, level of service, and automation. One benefit involves balancing between off-premises and on-premises cloud storage options, or a mixture of the two options, depending on relevant decision criteria that is complementary to initial direct cost savings potential. The cloud may be operated or provided by a public cloud provider, such as by Amazon AWS, Microsoft Azure, or Google GCP.

In one example, part of, or all of, the steps, methods, or flow charts described herein are executed (independently or in cooperation) by a client device, or any device such as the devices 35a and 35b shown in FIG. 7. Alternatively or in addition, part of, or all of, the steps, methods, or flow charts described herein are executed (independently or in cooperation) by a server device, such as server 24 shown as part on the arrangement 70 shown in FIG. 7. In one example, a client device (such as the device 35a) and a server (such as the server 24) cooperatively perform part of, or all of, the steps, methods, or flow charts described herein. For example, lower computing power processor may be used in the device 35a, since the heavy or resourceful computations are performed at a remote server. Such scheme may obviate the need for expensive and resourceful device. In another example, memory resources may be saved at the client device by using data stored at a server.

Figure 7A:
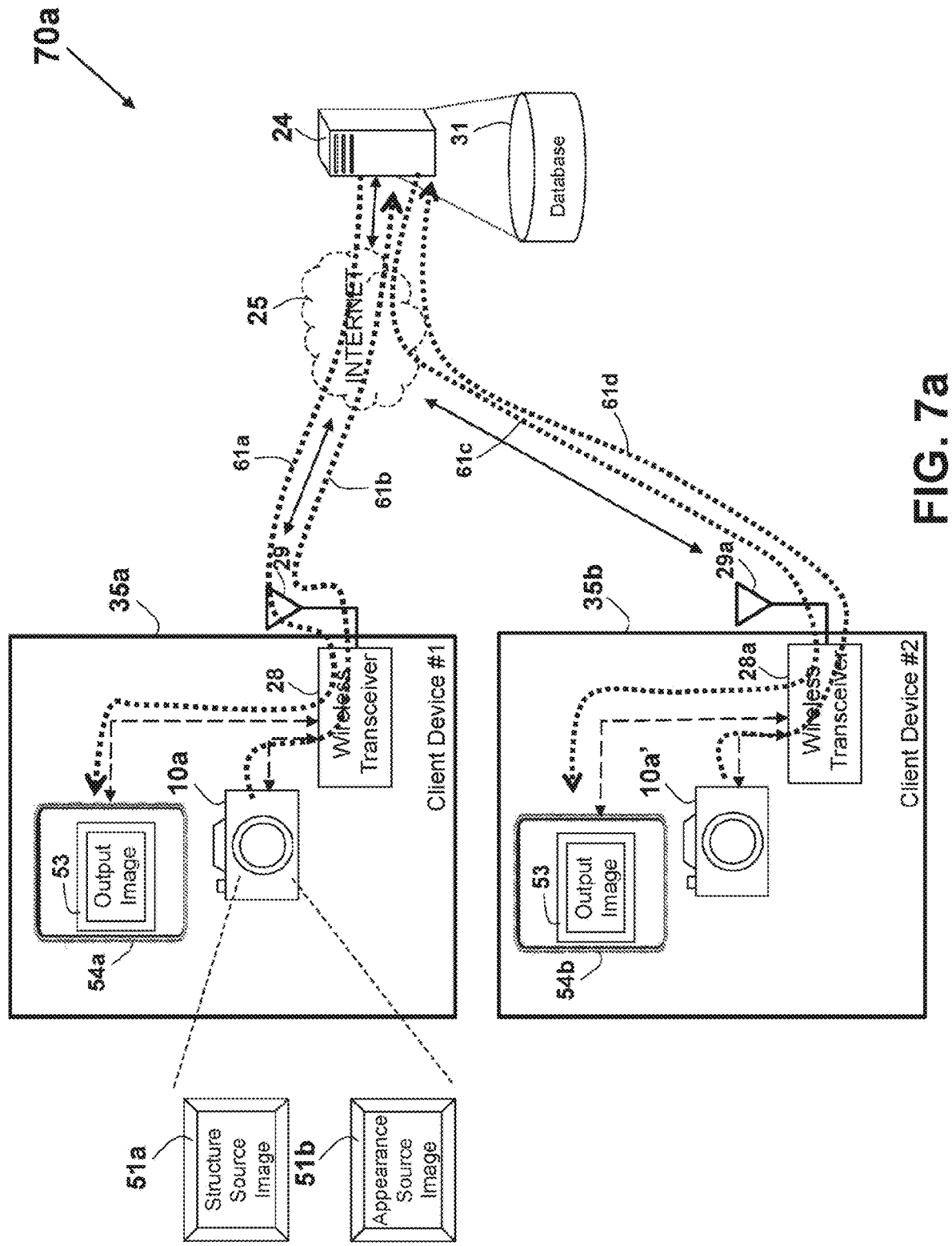

Examples of possible communication paths 70a of the arrangement 70 are shown in FIG. 7a. A path 61b is used to transmit the images captured by the camera 10a of the device 35a to the server 24, and a path 61a is used to transmit the output image 53 from the server 24 to the device 35a for displaying on the display 54a. Similarly, images captured using the camera 10a' of the device 35b may be transmitted to the server 24 over a path 61d, and a path 61c is used to transmit the output image 53 from the server 24 to the device 35b for displaying on the display 54b.

Figure 7B:
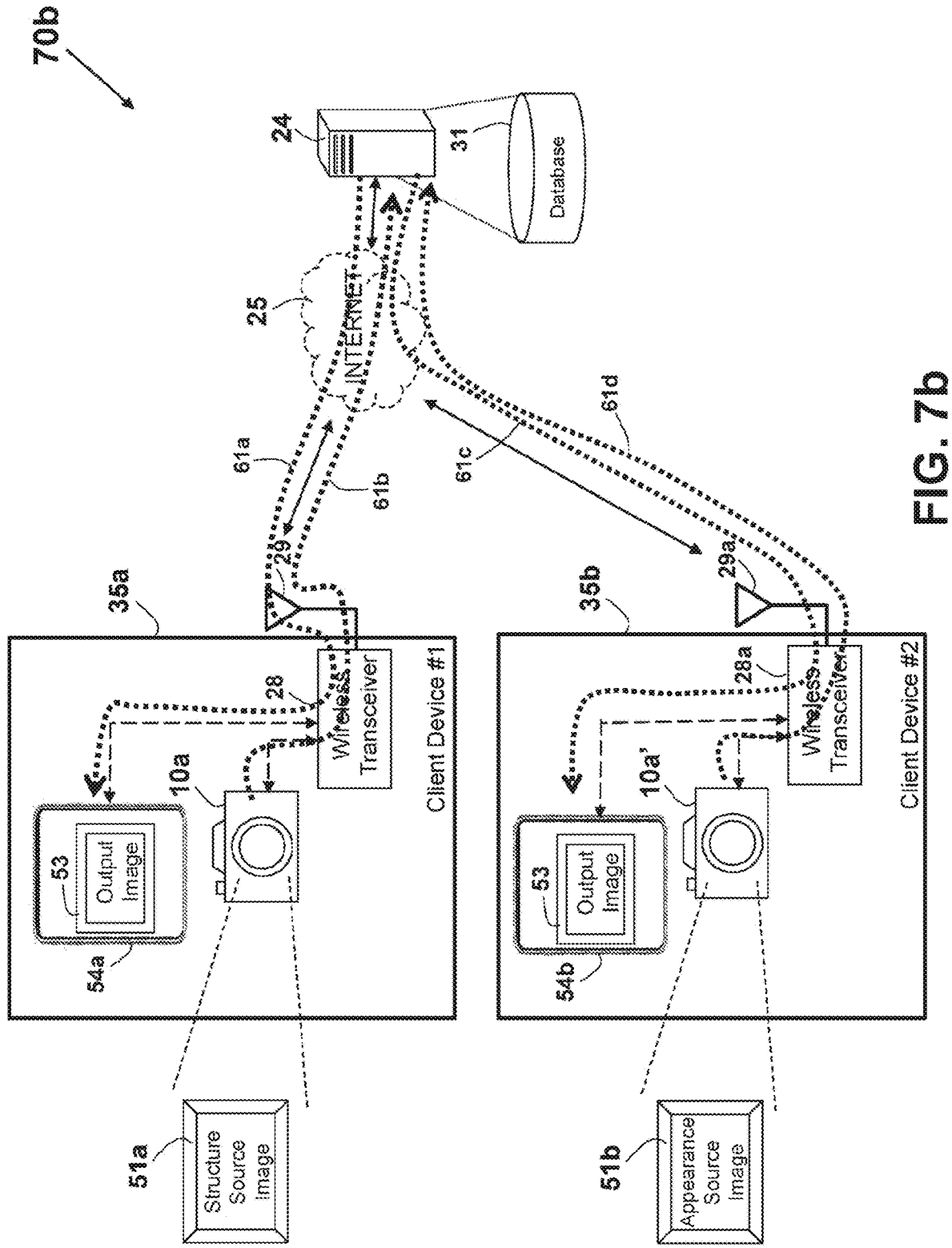
Figure 7C:
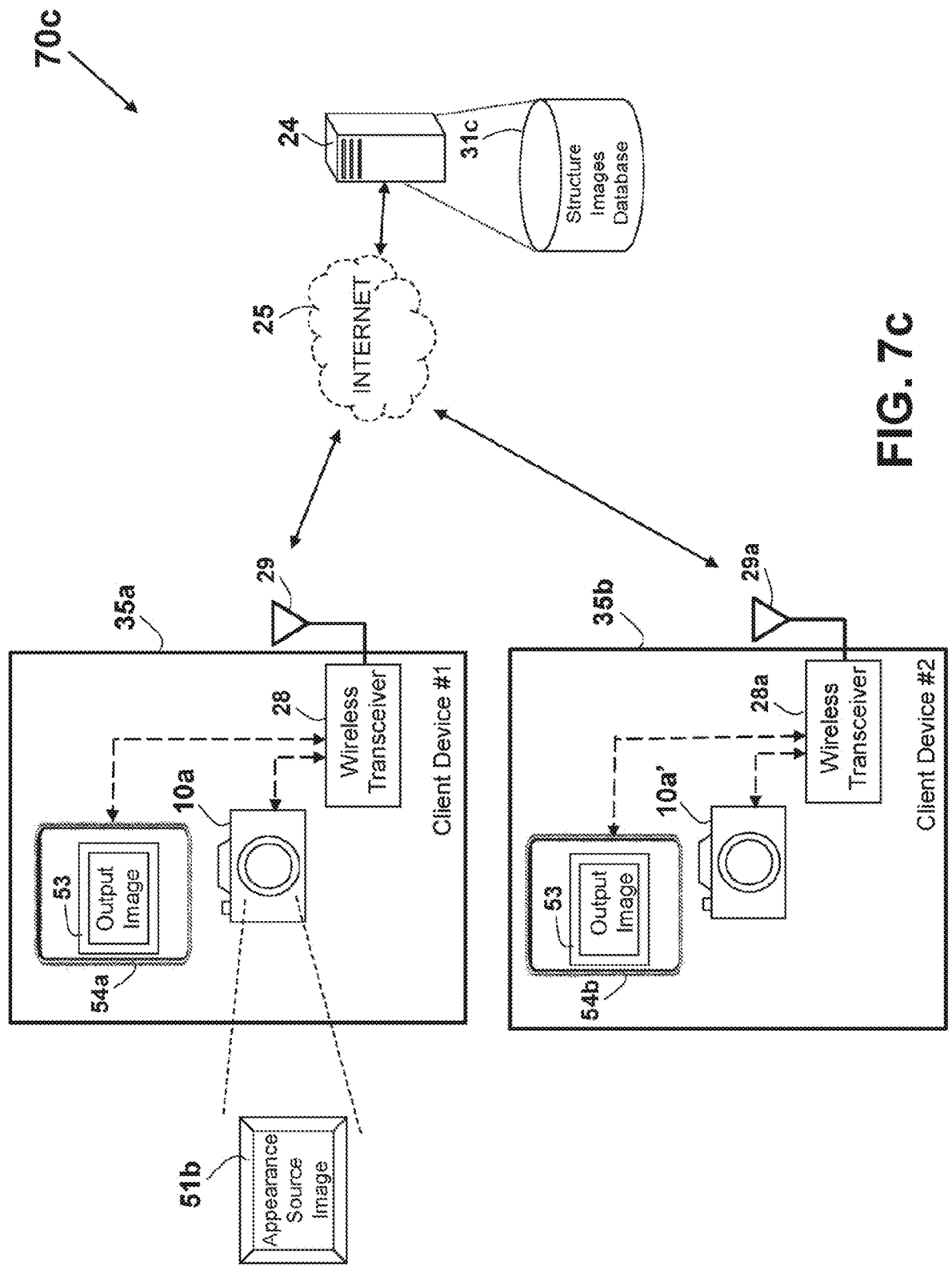
Figure 7D:
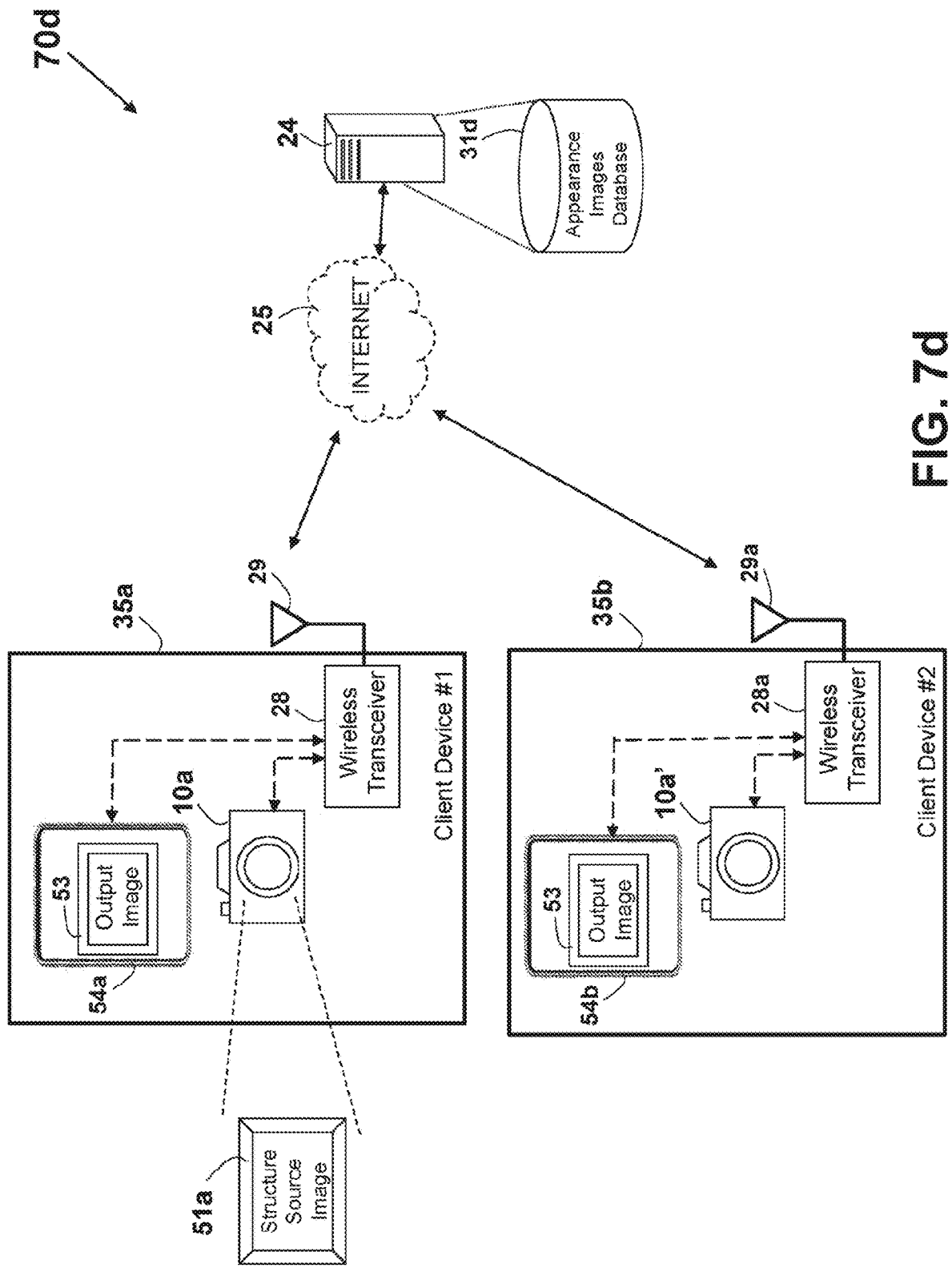

Another example of possible communication paths 70b of the arrangement 70 are shown in FIG. 7b. The path 61b is used to transmit the 'Structure Source Image' 51a captured by the camera 10a of the device 35a to the server 24, and the path 61a is used to transmit the output image 53 from the server 24 to the device 35a for displaying on the display 54a. Similarly, the 'Appearance Source Image' 51b captured using the camera 10a' of the device 35b may be transmitted to the server 24 over the path 61d, and the path 61c is used to transmit the output image 53 from the server 24 to the device 35b for displaying on the display 54b.

In one example, the server 24 comprises, or is in connection with, a database 'Structure Images Database' 31c, that stores many images, where each of these images may be selected as the 'Structure Source Image' 51a for executing the flow chart 60 shown in FIG. 6. For example, images captured by the camera 10a in device 35a, may be sent over the path 61b to be stored by the server 24 in the 'Structure Images Database' 31c. Alternatively or in addition, images captured by the camera 10a' in device 35b, may be sent over the path 61d to be stored by the server 24 in the 'Structure Images Database' 31c. Using the arrangement 70c, a user may be presented of various images to select from the database 'Structure Images Database' 31c, to be used as the "Structure Source Image" 51a for executing the flow chart 60 shown in FIG. 6.

Alternatively or in addition, the server 24 may comprises, or may be in connection with, a database 'Appearance Images Database' 31d, that stores many images, where each of these images may be selected as the 'Appearance Source Image' 51b for executing the flow chart 60 shown in FIG. 6. For example, images captured by the camera 10a in device 35a, may be sent over the path 61b to be stored by the server 24 in the 'Appearance Images Database' 31d. Alternatively or in addition, images captured by the camera 10a' in device 35b, may be sent over the path 61d to be stored by the server 24 in the 'Appearance Images Database' 31d. Using the arrangement 70d, a user may be presented of various images to select from the database 'Appearance Images Database' 31d, to be used as the "Appearance Source Image" 51b for executing the flow chart 60 shown in FIG. 6.

Any database herein, such as the 'Structure Images Database' 31c or the 'Appearance Images Database' 31d, may be a relational database, a non-relational database, an object-oriented database, an object database, an entity-relationship model database, an associative database. XML database, or any combination thereof. Further non-limiting examples include SQL, PostgreSQL. MySQL, Oracle, DB2, and Sybase. In some embodiments, the database may be internet-based. Further, a database may be web-based, or a database may be a cloud computing-based.

Figure 8:
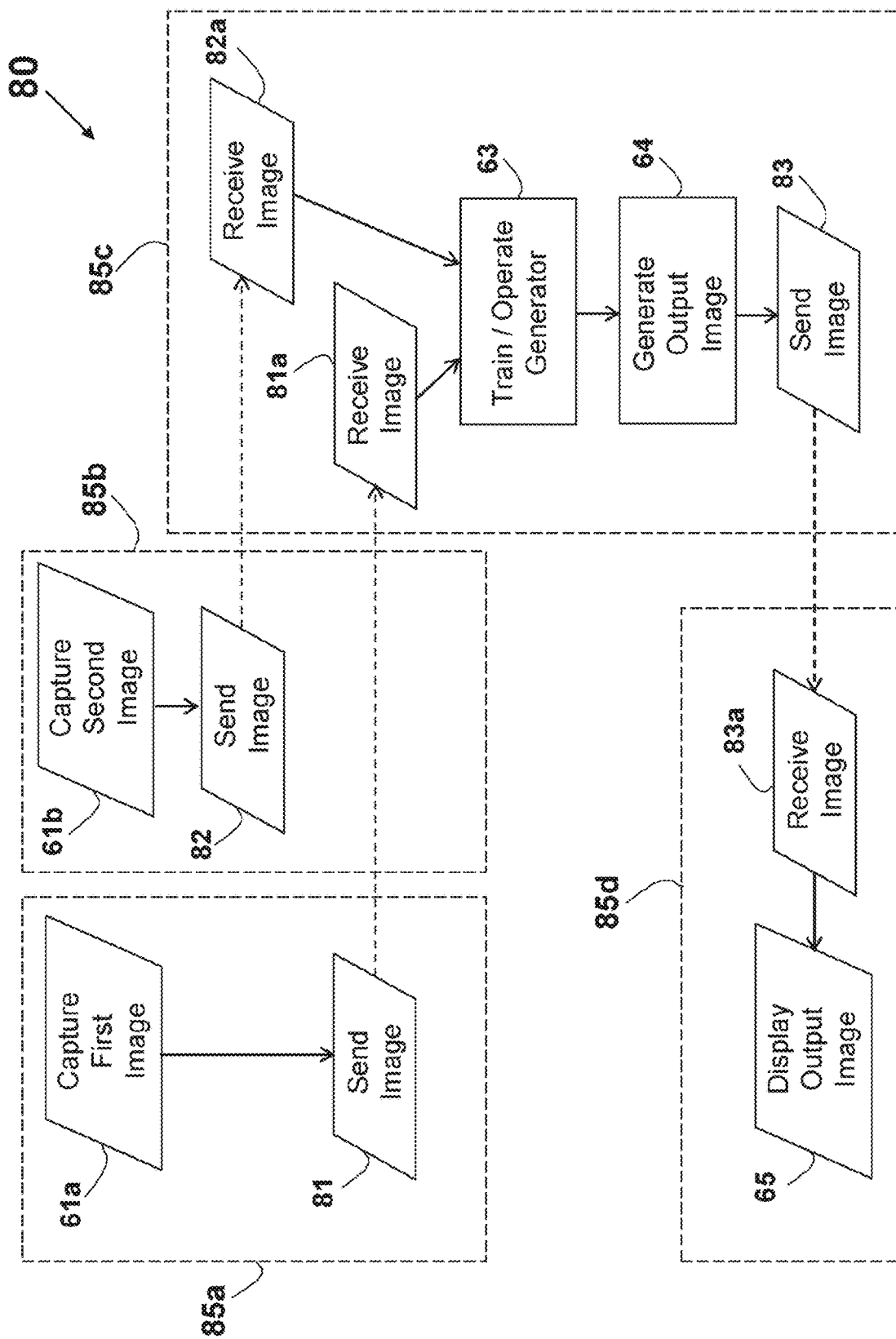
FIG. 8 schematically illustrates a simplified flow-chart of semantic appearance transfer involving different devices communicating over the Internet.

A flow chart 80 shown in FIG. 8, that is based on the flow chart 60 shown in FIG. 6, describes a method for semantic appearance transfer, where the involved system components are located in different locations, or are part of (or integrated with) different devices housed in respective different enclosures. In this example, the camera 10a of the arrangement 50 shown in FIG. 5 is enclosed in a separate device, that may correspond to the Client Device #1 35a or the Client device #2 35b, that executes the sub flow-chart 85a that includes the "Capture First Image" step 61a, follows by sending the captured image, as part of a "Send Image" step 81, to a separate device that includes the processor that executes the generator 52 functionality, such as the server 24. The sending as part of the "Send Image" step 81 and a corresponding receiving as part of a "Receive Image" step 81a by the generator 52 housed device, may correspond to the communication paths 61b or 61d (such as over the Internet 25), shown in the arrangement 70a, and may use a wired networking or communication. Alternatively or in addition, the sending as part of the "Send Image" step 81 and the corresponding receiving as part of a "Receive Image" step 81a by the generator 52 housed device may use a wireless networking, using a wireless transceiver 28 coupled to an antenna 29 respectively in each of the communicating devices.

Further, the camera 10b of the arrangement 50 shown in FIG. 5 is enclosed in a separate device, that may correspond to the Client Device #1 35a or the Client device #2 35b, that executes the sub flow-chart 85b that includes the "Capture Second Image" step 61b, follows by sending the captured image, as part of a "Send Image" step 82, to a separate device that includes the processor that executes the generator 52 functionality, such as the server 24. The sending as part of the "Send Image" step 82 and a corresponding receiving as part of a "Receive Image" step 82a by the generator 52 housed device, may correspond to the communication paths 61b or 61d (such as over the Internet 25), shown in the arrangement 70a, and may use a wired networking or communication. Alternatively or in addition, the sending as part of the "Send Image" step 82 and the corresponding receiving as part of a "Receive Image" step 82a by the generator 52 housed device may use a wireless networking, using a wireless transceiver 28 coupled to an antenna 29 respectively in each of the communicating devices.

A sub flow chart 85c is executed by a separate device, that may be a server, such as the server 24, that received the first image as part of the "Receive Image" step 81a and the second image as part of the "Receive Image" step 82a. The received images are processed by a processor that executes the software or firmware of the generator 52 as part of the "Train/Operate Generator" step 63 for generating the output image as part of the "Generate Output Image" step 64. The produced output image 53 is sent, as part of a "Send Image" step 83 to a device that includes the display 54, where it is received as part of a "Receive Image" step 83a for displaying on the display 54. The device that houses the display 54 executes a sub flow chart 85d, that includes receiving of the output image 53 as part of the "Receive Image" step 83a, and displaying the received output image 53 on the display 54 as part of the "Display Output Image" step 65.

Figure 9:
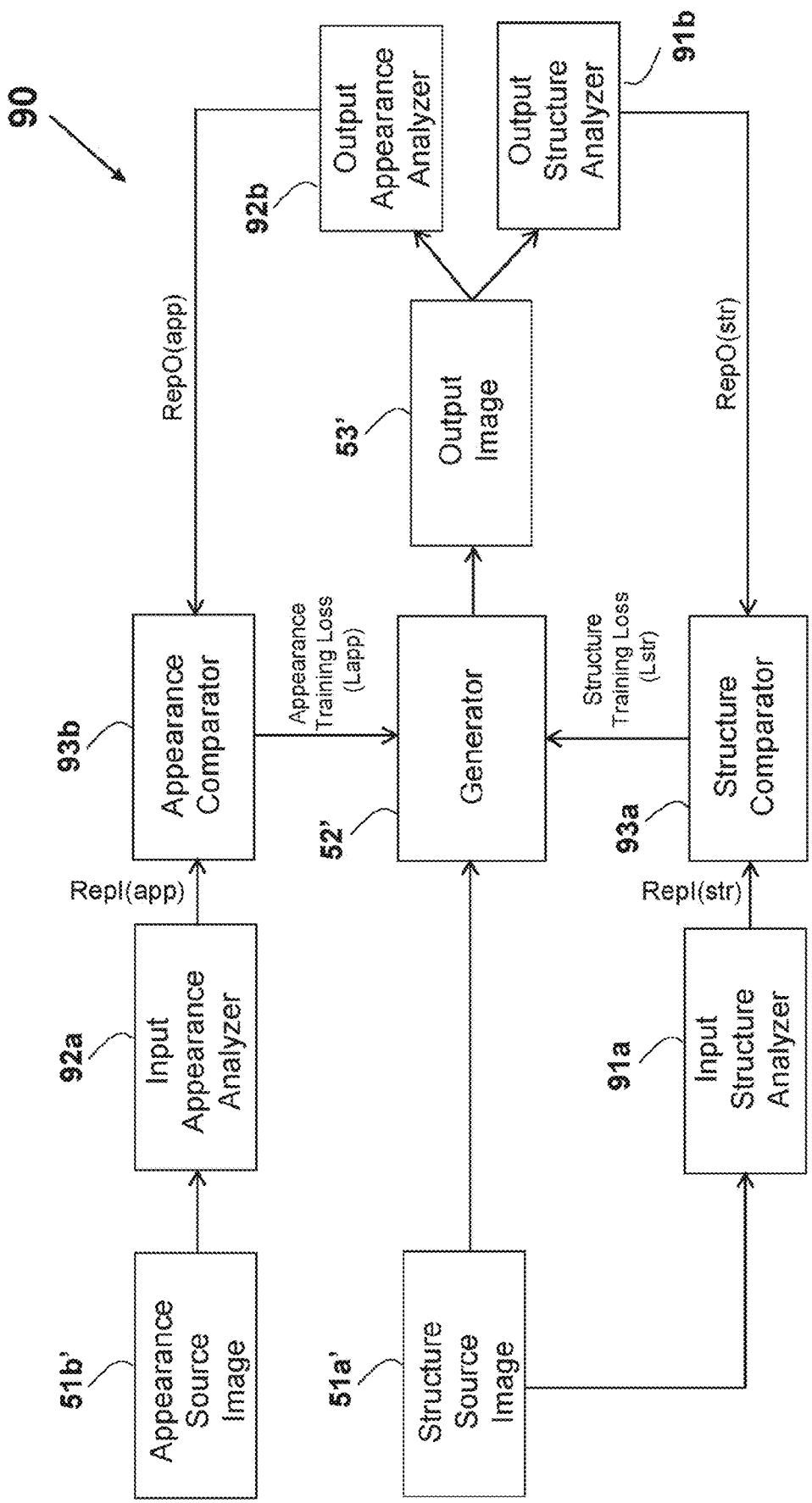
FIG. 9 pictorially depicts an arrangement for data flow for training a generator for semantic appearance transfer from a first captured image to another captured image.

An architecture or model 90 for training the generator 52 is shown in FIG. 9, where a generator 52' may be a pre-trained version of the generator 52. An 'Appearance Source Image' 51b', that may correspond to the 'Appearance Source Image' 51b, is fed to an 'Input Appearance Analyzer' 92a, that outputs RepI(app) that is a representation of, a function of, or responsive to, the appearance of the 'Appearance Source Image' 51b'. A 'Structure Source Image' 51a', that may correspond to the 'Structure Source Image' 51a, is fed to both the generator 52' and to an 'Input Structure Analyzer' 91a, that outputs RepI(str) that is a representation of, a function of, or responsive to, the structure of the 'Appearance Source Image' 51b'. The generator 52' outputs an 'Output Image' 53', that corresponds to the 'Output Image' 53. The 'Output Image' 53' is fed to an 'Output Appearance Analyzer' 92b, that outputs RepO(app) that is a representation of, a function of, or responsive to, the appearance of the 'Output Image' 53', and further the 'Output Image' 53' is fed to an 'Output Structure Analyzer' 91b, that outputs RepO(str) that is a representation of, a function of, or responsive to, the structure of the 'Output Image' 53', An 'Appearance Comparator' 93b matches or compares the required (target) appearance of the 'Appearance Source Image' 51b', as represented or derived as RepI(app), against the appearance of the current 'Output Image' 53', as represented or derived as RepO(app), and output a training loss appearance Lapp, that reflects the difference between the required appearance RepI(app) and the appearance produced by the generator 52', shown as Lapp, where Lapp=f{RepI(app), RepO(app)}, such as Lapp=f{|RepI(app)−RepO(app)|}. In parallel, an 'Structure Comparator' 93a matches or compares the required (target) structure of the 'Structure Source Image' 51a', as represented or derived as RepI(str), against the structure of the current 'Output Image' 53', as represented or derived as RepO(str), and output a training loss appearance Lstr, that reflects the difference between the required appearance RepI(str) and the appearance produced by the generator 52', shown as Lstr, where Lstr=f{RepI(str), RepO(str)}, such as Lstr=f{|RepI(str)−RepO(str)|}.

The training objectives are to train the generator 52' to minimize or nullify the Lapp, thus encouraging the deep appearance of the 'Appearance Source Image' 51b' and the 'Output Image' 53' to match, in parallel to train the generator 52' to minimize or nullify the Lstr, thus encouraging the deep structure of the 'Structure Source Image' 51a' and the 'Output Image' 53' to match, so that the goal of 'painting' the objects in the 'Structure Source Image' 51a' with the visual appearance of the semantically related objects in the 'Appearance Source Image' 51b'. The analyzers 'Input Appearance Analyzer' 92a and the 'Output Appearance Analyzer' 92b may be the same analyzer, may be identical analyzers, may be based on the same model or architecture, may use the same principle or algorithm, may be similar to each other, or may be distinct or different. Similarly, the analyzers 'Input Structure Analyzer' 91a and the 'Output Structure Analyzer' 91b may be the same analyzer, may be identical analyzers, may be based on the same model or architecture, may use the same principle or algorithm, may be similar to each other, or may be distinct or different. Further, the comparators 'Appearance Comparator' 93b and 'Structure Comparator' 93a may be the same comparator, may be identical comparators, may be based on the same model or architecture, may use the same principle or algorithm, may be similar to each other, or may be distinct or different.

Figure 9A:
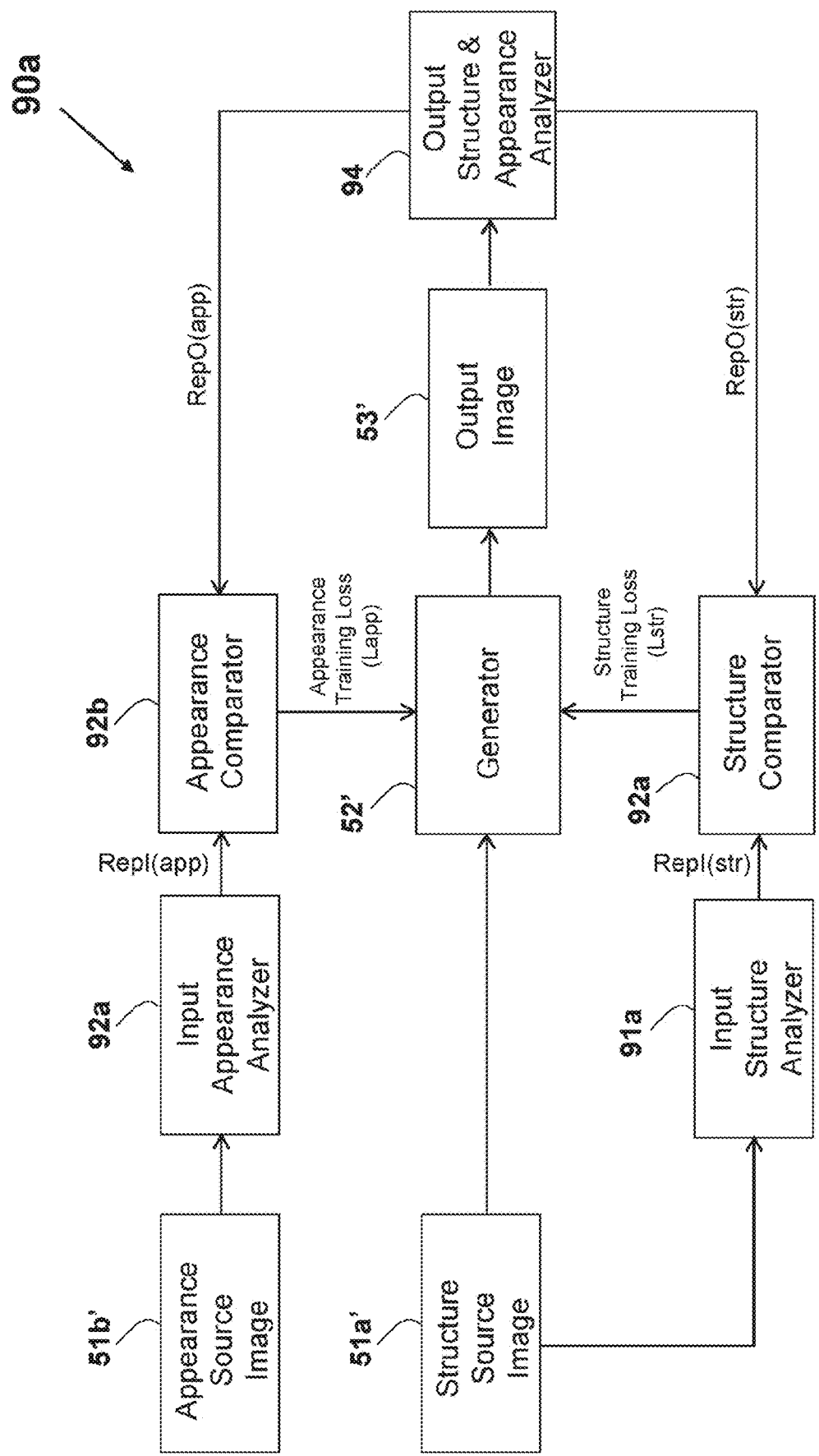
FIG. 9a pictorially depicts an arrangement for data flow for training a generator for semantic appearance transfer and using a combined appearance/structure analyzer.

In one example illustrated in the model or architecture 90a shown in FIG. 9a, the 'Output Appearance Analyzer' 92b and the 'Output Structure Analyzer' 91b are implemented using a single analyzer 'Output Structure & Appearance Analyzer' 94 that combined both the 'Output Appearance Analyzer' 92b and the 'Output Structure Analyzer' 91b. The combined analyzer outputs both the RepO(app) that is a representation of, a function of, or responsive to, the appearance of the 'Output Image' 53', and the RepO(str) that is a representation of, a function of, or responsive to, the structure of the 'Output Image' 53'. For example, the same ANN or ViT may be used, using different outputs or different layers for providing both outputs RepO(app) and RepO(str).

Figure 9B:
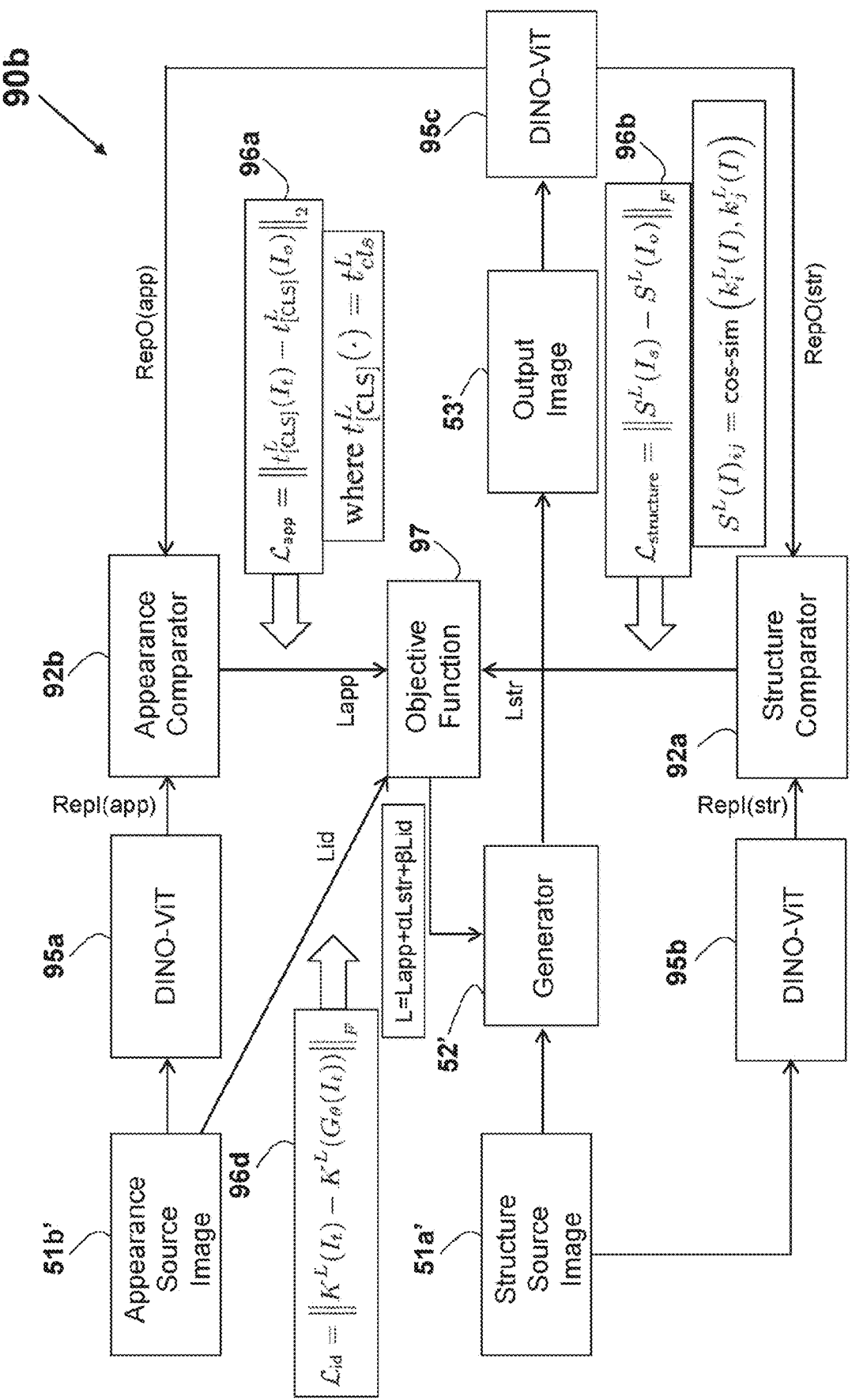
FIG. 9b pictorially depicts an arrangement for data flow for training a generator for semantic appearance transfer from a first captured image to another captured image based on generating an objective function and using DINO-ViT models as analyzers.

Implementation examples of the analyzers of the arrangement 90a of FIG. 9a are shown in an arrangement 90b shown in FIG. 9b. The 'Input Appearance Analyzer' 92a may use, may be based on, or may comprise, a self-supervised pre-trained DINO-ViT model 95a, the 'Input Structure Analyzer' 91a may use, may be based on, or may comprise, a self-supervised pre-trained DINO-ViT model 95b, and the 'Output Structure & Appearance Analyzer' 94 may use, may be based on, or may comprise, a self-supervised pre-trained DINO-ViT model 95c. The DINO-ViT model 95a and the DINO-ViT model 95b may be based on the same model or architecture, may use the same principle or algorithm, may be similar to each other, or may be distinct or different from each other. Similarly, The DINO-ViT model 95a (or 95b) and the DINO-ViT model 95c may be based on the same model or architecture, may use the same principle or algorithm, may be similar to each other, or may be distinct or different from each other.

Each of the DINO-ViT model 95a, the DINO-ViT model 95b, and the DINO-VIT 95c may comprise, may be based on, or may use, an architecture or code configured for Natural Language Processing (NLP) that uses a fine-tuning or pre-trained machine deep learning model that may include, may be based on, or may use, an attention, self-attention, or multi-head self-attention. Further, each of the DINO-ViT model 95a, the DINO-ViT model 95b, and the DINO-VIT 95c may comprise, may be based on, or may use, multiple self-attention layers that includes differentially weighing the significance of each part of the input image after splitting the image into multiple non-overlapping same fixed-sized patches. Further, each of the DINO-ViT model 95a, the DINO-ViT model 95b, and the DINO-VIT 95c may comprise, may be based on, or may use, attaching or embedding a feature information to each of the patches, that comprises a key, a query, a value, a token, or any combination thereof, or attaching or embedding a position information in the image for each of the patches for providing a series of positional embedding patches that are fed to a transformer encoder. Furthermore, each of the DINO-ViT model 95a, the DINO-ViT model 95b, and the DINO-VIT 95c may comprise, may be based on, or may use, training using image labels and may be fully supervised on a dataset, and may further comprise assigning a [CLS] token to the image or predicting or estimating a class label to the image.

In one example, the output RepO(app) of the DINO-ViT model 95c (serving as the 'Output Structure & Appearance Analyzer' block 94) may be derived from, may be based on, or may comprise, a self-similarity of keys in the deepest attention module (Self-Sim). Similarly, the output RepI(app) of the DINO-ViT model 95a (serving as the 'Input Appearance Analyzer' block 92a) may be derived from, may be based on, or may comprise, a self-similarity of keys in the deepest attention module (Self-Sim). In one example, the output RepO(str) of the DINO-ViT model 95c (serving as the 'Output Structure & Appearance Analyzer' block 94) may be derived from, may be based on, or may comprise, the [CLS] token in the deepest layer. Similarly, the output RepI(str) of the DINO-ViT model 95a (serving as the 'Input Appearance Analyzer' block 92a) may be derived from, may be based on, or may comprise, the [CLS] token in the deepest layer.

Each of the DINO-ViT model 95a, the DINO-ViT model 95b, and the DINO-VIT 95c may comprise, may be based on, or may use, at least 2, 3, 4, 5, 7, 10, 12, 15, 17, 20, 30, 40, or 50 pre-trained layers model. Alternatively or in addition, each of the DINO-ViT model 95a, the DINO-ViT model 95b, and the DINO-VIT 95c may comprise, may be based on, or may use, less than 3, 4, 5, 7, 10, 12, 15, 17, 20, 30, 40, 50, or 100 pre-trained layers model. Further, each of the DINO-ViT model 95a, the DINO-ViT model 95b, and the DINO-VIT 95c may comprise, may be based on, or may use, at least 3×3, 4×4, 5×5, 6×6, 7×7, 8×8, 9×9, 10×10, 11×11, 12×12, 13×13, 14×14, or 15×15 patches of the respective input image. Alternatively or in addition, each of the DINO-ViT model 95a, the DINO-ViT model 95b, and the DINO-VIT 95c may comprise, may be based on, or may use, less than 4×4, 5×5, 6×6, 7×7, 8×8, 9×9, 10×10, 11×11, 12×12, 13×13, 14×14, 15×15, or 16×16 patches. In one example, a DINO-ViT model of 12 layer pretrained model in the 8×8 patches configuration (ViT-B/8) is used for one of, or each of, the DINO-ViT model 95a, the DINO-ViT model 95b, and the DINO-VIT 95c.

The arrangement 90b further illustrates combining the training for appearance and structure by using a single objective function L, produced by an 'Objective Function' functionality 97. In one example, the objective function L is a sum of linear weighting of the Lapp (from the 'Appearance Comparator' 92b), the Lstr (from the 'Structure Comparator' 92a), and a Lid, for example in the form of L=Lapp+αLstr+βLid, where the coefficients α and β reflect the relative weights between the terms. In one example, the α coefficient is set to 0.1 and the β coefficient is set to 0.1. However, both α=β and α≠β may be used in different scenarios. The term 'Lapp' encourages the output image 53' to match the appearance of the 'Appearance Source Image' 51b', and is defined as the difference in [CLS] token between the generated and texture image, as shown in Lapp formula 96a, where the [CLS] token is extracted from the deepest layer of the DINO-ViT models 95a and 95c. The term 'Lstr' encourages the output image 53' to match the structure of the 'Structure Source Image' 51a', and is defined by the difference in self-similarity of the keys extracted from the attention module at deepest transformer layer of the DINO-ViT models 95b and 95c, as shown in Lstr formula 96b. The term Lid is used as a regularization and is calculated according to a formula 96d, and this loss encourages the generator 52' to preserve the keys representation of the 'Structure Source Image' 51a', and is applied to the keys in the deepest ViT layer, which is a sematic yet invertible representation of the input image.

In one example, the training may use, may be based on, or may comprise, an Adam optimizer with a constant learning. Adam, which is an algorithm for first-order gradient-based optimization of stochastic objective functions, and is based on adaptive estimates of lower-order moments, is introduced in a paper by Diederik P. Kingma and Jimmy Ba entitled: "*Adam: A Method for Stochastic Optimization*", dated May 7, 2015 [arXiv: 1412.6980 [cs.LG]; https://doi.org/10.48550/arXiv.1412.6980; Published as a conference paper at the 3rd International Conference for Learning Representations, San Diego, 2015], which is which is hereby incorporated herein by reference in its entirety. The method is straightforward to implement, is computationally efficient, has little memory requirements, is invariant to diagonal rescaling of the gradients, and is well suited for problems that are large in terms of data and/or parameters. The method is also appropriate for non-stationary objectives and problems with very noisy and/or sparse gradients. The hyper-parameters have intuitive interpretations and typically require little tuning. Some connections to related algorithms, on which Adam was inspired, are discussed. The paper also analyzes the theoretical convergence properties of the algorithm and provide a regret bound on the convergence rate that is comparable to the best known results under the online convex optimization framework. Empirical results demonstrate that Adam works well in practice and compares favorably to other stochastic optimization methods. Finally, we discuss AdaMax, a variant of Adam based on the infinity norm.

In one example, the training may use, may be based on, or may comprise, PyTorch. Deep learning frameworks have often focused on either usability or speed, but not both. PyTorch is a machine learning library that shows that these two goals are in fact compatible: it provides an imperative and Pythonic programming style that supports code as a model, makes debugging easy and is consistent with other popular scientific computing libraries, while remaining efficient and supporting hardware accelerators such as GPUs. A paper by Adam Paszke; Sam Gross; Francisco Massa; Adam Lerer, James Bradbury, Gregory Chanan, Trevor; Killeen, Zeming; Lin, Natalia; Gimelshein, Luca; Antiga, Alban; Desmaison, Andreas; Köpf, Edward; Yang, Zach; De Vito, Martin; Raison, Alykhan; Tejani, Sasank; Chilamkurthy, Benoit Steiner; Lu Fang; Junjie Bai; and Soumith Chintala, entitled "*PyTorch: An Imperative Style, High-Performance Deep Learning Library*" dated Dec. 3, 2019 [arXiv: 1912.01703 [cs.LG]; https://doi.org/10.48550/arXiv.1912.01703; Published in "*Advances in Neural Information Processing Systems* 32" pages 8024-8035. Curran Associates, Inc., 2019], which is which is hereby incorporated herein by reference in its entirety, details the principles that drove the implementation of PyTorch and how they are reflected in its architecture. Every aspect of PyTorch is a regular Python program under the full control of its user, and the careful and pragmatic implementation of the key components of its runtime enables them to work together to achieve compelling performance. The paper further demonstrates the efficiency of individual subsystems, as well as the overall speed of PyTorch on several common benchmarks.

Figure 10:
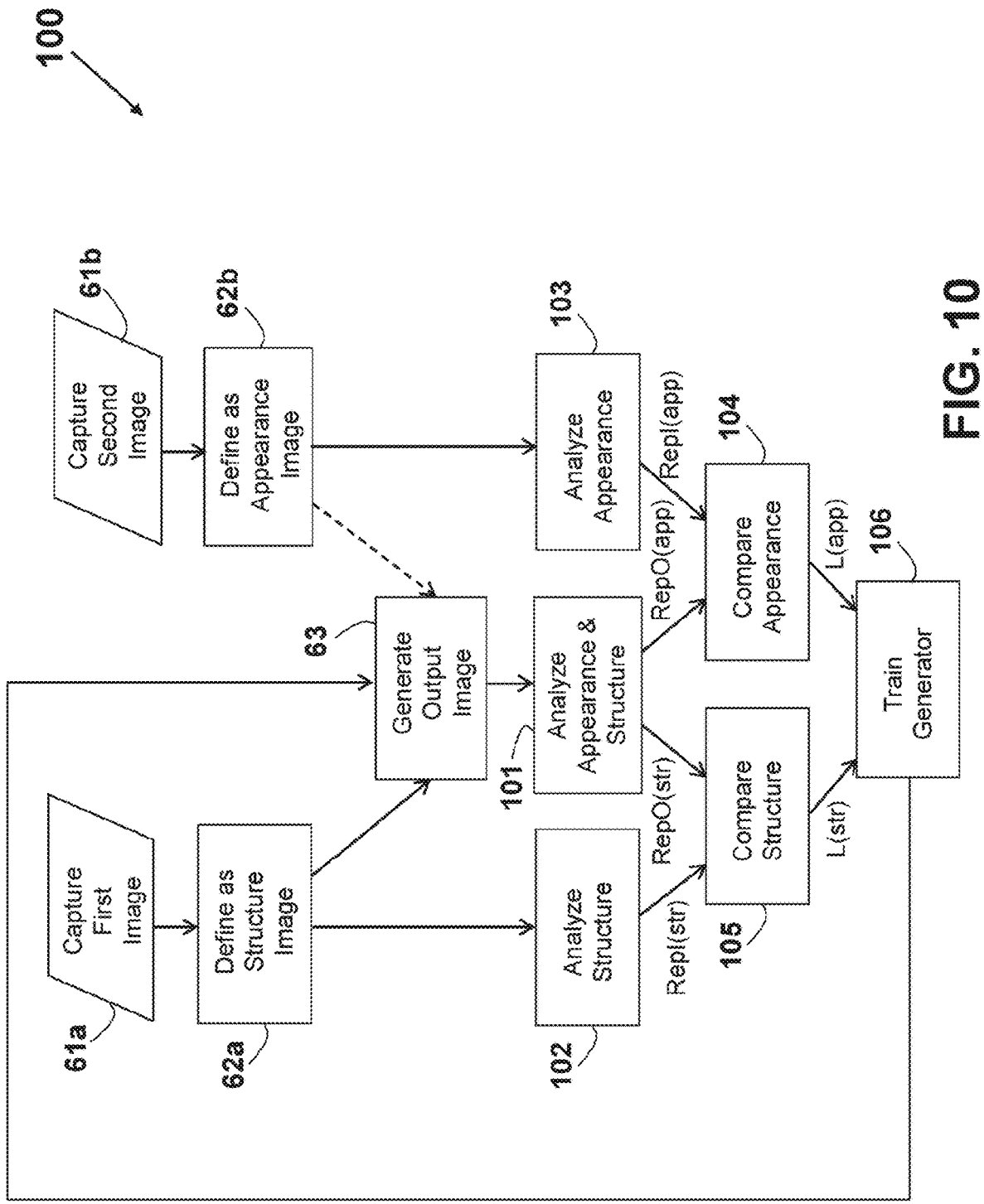
FIG. 10 schematically illustrates a simplified flow-chart for training a generator for semantic appearance transfer from a first captured image to another captured image.

A training flow chart 100, that corresponds to the training arrangement 90 shown in FIG. 9, is shown in FIG. 10. A first image is captured as part of the "Capture First Image" step 61a, and defined as the "Structure Source Image" 51a' as part of the "Define as Structure Image" step 62a. A second image is captured as part of the "Capture Second Image" step 61b, and defined as the "Appearance Source Image" 51b' as part of the "Define as Appearance Image" step 62b. The generator 52' outputs the "Output Image" 53' as part of a "Generate Output Image" step 63. The structure representation RepI(str) is produced by the "Input Structure Analyzer" 91a as part of an "Analyze Structure" step 102, and the appearance representation RepI(app) is produced by the "Input Appearance Analyzer" 92a as part of an "Analyze Appearance" step 103. The structure representation RepO (str) is produced by the "Output Structure Analyzer" 91b (or by the "Output Structure & Appearance Analyzer" 94), and the appearance representation RepO(app) is produced by the "Output Appearance Analyzer" 92b (or by the "Output Structure & Appearance Analyzer" 94), as part of an "Analyze Appearance & Structure" step 101. The structures of the "Structure Source Image" 51a' and the "Output Image" 53' are compared by the "Structure Comparator" 92a as part of a "Compare Structure" step 105 to produce the training loss L(str), while the appearances of the "Appearance Source Image" 51b' and the "Output Image" 53' are compared by the "Appearance Comparator" 92b as part of a "Compare Appearance" step 104 to produce the training loss L(app). The generator 52' is trained to minimize the training losses as part of a "Train Generator" step 106.

In one example, any method herein may use information encoded in different ViT's features across layers, using a "feature inversion" visualization techniques. Further, a method may use the global token (a.k.a [CLS] token) to provide a powerful representation of visual appearance by capturing not only texture information but more global information such as object parts, and reconstructing an original image from these features, yet they provide powerful semantic information at high spatial granularity. Furthermore, a method may derive representations of structure and visual appearance extracted from deep ViT features, untwisting them from the learned self-attention modules. For example, visual appearance may be represented via the global [CLS] token, and structure may be represented via the self-similarity of keys, all extracted from the last layer. In one example, a generator trained on a single input pair of structure/appearance images, may produce an image that splices the desired visual appearance and structure in the space of ViT features, such as without requiring any additional information such as semantic segmentation, and without involving any adversarial training. The training flowchart 100 may correctly relate semantically matching regions between the input images, and successfully transfer the visual appearance between them, while maintaining high-fidelity of the structure and appearance.

In one example, the training may use PyTorch, and the objective may be optimized with relative weights: α=0:1, β=0:1. An Adam optimizer may be used with a constant learning rate of λ=2·10-3. Each batch may contain fI~s; I~tg, relating to the augmented views of the source structure image and the target appearance image respectively. Every 75 iterations, fIs, Itg may be added to the batch (i.e., do not apply augmentations). The resulting images fG(I~s); G(I~t) and I~t may then be resized down to 224[pix] (maintaining aspect ratio) using bicubic interpolation, before extracting DINO-ViT features for estimating the losses. Training on an input image pair of size 512×512 may take ~20 minutes to train on a single GPU (Nvidia RTX 6000) for a total of 2000 iterations. Data augmentations may be applied to the input image pair fIs, Itg to create multiple internal examples fIsi; ItigN i=1. Specifically, at each training step, the following augmentations may be applied: Augmentations to the source structure image Is; random cropping: we uniformly sample a N×N crop such that N is between 95%-100% of the height of Is; random horizontal-flipping, applied in probability p=0.5; random color jittering: in probability p=0.5 we jitter the brightness, contrast, saturation and hue of the image; random Gaussian blurring: in probability p=0.5 a Gaussian blurring 3×3 filter (o is uniformly sampled between 0.1-2.0) may be applied; or any combination thereof.

Any ANN herein may be a dynamic neural network, such as Feedforward Neural Network (FNN) or Recurrent Neural Network (RNN), and may comprise at least 3, 4, 5, 7, 10, 15, 20, 25, 30, 35, 40, 45, or 50 layers. Alternatively, or in addition, the ANN may comprise less than 3, 4, 5, 7, 10, 15, 20, 25, 30, 35, 40, 45, or 50 layers.

Any ANN herein, may comprises, may use, or may be based on, any Convolutional Neural Network (CNN). In one example, the CNN is trained to detect, identify, classify, localize, or recognize one or more static objects, one or more dynamic objects, or any combination thereof. In one example, a one-stage approach may be used, where the CNN is used once. Alternatively, a two-stage approach may be used, where the CNN is used twice for the object detection. Any ANN herein, may comprise, may use, or may be based on, a pre-trained neural network that is based on a large visual database designed for use in visual object recognition, that is trained using crowdsourcing, such as Imagenet.

Any ANN herein, may comprise, may use, or may be based on, a Convolutional Neural Network (CNN). In one example, the CNN is trained to detect, identify, classify, localize, or recognize one or more static objects, one or more dynamic objects, or any combination thereof. In one example, a one-stage approach may be used, where the CNN is used once. Alternatively, a two-stage approach may be used, where the CNN is used twice for the object detection. Further, using the CNN may comprise, may use, or may be based on, a pre-trained neural network that is based on a large visual database designed for use in visual object recognition, that is trained using crowdsourcing, such as Imagenet.

Any ANN herein, may comprise, may use, or may be based on, a method, scheme or architecture such as YOLO, for example YOLOv1, YOLOv2, or YOLO9000. Such a scheme includes defining as a regression problem to spatially separated bounding boxes and associated class probabilities, where a single neural network predicts bounding boxes and class probabilities directly from full images in one evaluation. After classification, post-processing is used to refine the bounding boxes, eliminate duplicate detections, and rescore the boxes based on other objects in the scene. The object detection is framed as a single regression problem, straight from image pixels to bounding box coordinates and class probabilities. A single convolutional network simultaneously predicts multiple bounding boxes and class probabilities for those boxes. YOLO trains on full images and directly optimizes detection performance. In one example, YOLO is implemented as a CNN and has been evaluated on the PASCAL VOC detection dataset.

Any ANN herein, may comprise, may use, or may be based on, Regions with CNN features (R-CNN), or any other scheme that uses selective search to extract just 2000 regions from the image, referred to as region proposals. Then, instead of trying to classify a huge number of regions, only 2000 regions are handled. These 2000 region proposals are generated using a selective search algorithm, that includes Generating initial sub-segmentation for generating many candidate regions, using greedy algorithm to recursively combine similar regions into larger ones, and using the generated regions to produce the final candidate region proposals. These 2000 candidate region proposals are warped into a square and fed into a convolutional neural network that produces a 4096-dimensional feature vector as output. The CNN acts as a feature extractor and the output dense layer consists of the features extracted from the image and the extracted features are fed into an SVM to classify the presence of the object within that candidate region proposal. In addition to predicting the presence of an object within the region proposals, the algorithm also predicts four values which are offset values to increase the precision of the bounding box. The R-CNN may be a Fast R-CNN, where the input image is fed to the CNN to generate a convolutional feature map. From the convolutional feature map, the regions of proposals are identified and warped into squares, and by using a RoI pooling layer they are reshaped into a fixed size so that it can be fed into a fully connected layer. From the RoI feature vector, a softmax layer is used to predict the class of the proposed region and also the offset values for the bounding box. Further, the R-CNN may be a Faster R-CNN, where instead of using selective search algorithm on the feature map to identify the region proposals, a separate network is used to predict the region proposals. The predicted region proposals are then reshaped using a RoI pooling layer which is then used to classify the image within the proposed region and predict the offset values for the bounding boxes. The R-CNN may use, comprise, or be based on a Region Proposal Network (RPN) that shares full-image convolutional features with the detection network, thus enabling nearly cost-free region proposals.

Any ANN herein, may comprise, may use, or may be based on, a method, scheme or architecture such as Retina-Net, that is a one-stage object detection model that is incorporates two improvements over existing single stage object detection models-Feature Pyramid Networks (FPN) and Focal Loss. The Feature Pyramid Network (FPN) may be built in a fully convolutional fashion architecture that utilizes the pyramid structure. In one example, pyramidal feature hierarchy is utilized by models such as Single Shot detector, but it doesn't reuse the multi-scale feature maps from different layers. Feature Pyramid Network (FPN) makes up for the shortcomings in these variations, and creates an architecture with rich semantics at all levels as it combines low-resolution semantically strong features with high-resolution semantically weak features, which is achieved by creating a top-down pathway with lateral connections to bottom-up convolutional layers. The construction of FPN involves two pathways which are connected with lateral connections: Bottom-up pathway and Top-down pathway and lateral connections. The bottom-up pathway of building FPN is accomplished by choosing the last feature map of each group of consecutive layers that output feature maps of the same scale. These chosen feature maps will be used as the foundation of the feature pyramid. Using nearest neighbor upsampling, the last feature map from the bottom-up pathway is expanded to the same scale as the second-to-last feature map. These two feature maps are then merged by element-wise addition to form a new feature map. This process is iterated until each feature map from the bottom-up pathway has a corresponding new feature map connected with lateral connections.

Focal Loss (FL) is an enhancement over Cross-Entropy Loss (CE) and is introduced to handle the class imbalance problem with single-stage object detection models. Single Stage models suffer from an extreme foreground-background class imbalance problem due to dense sampling of anchor boxes (possible object locations). In RetinaNet, at each pyramid layer there can be thousands of anchor boxes. Only a few will be assigned to a ground-truth object while the vast majority will be background class. These easy examples (detections with high probabilities) although resulting in small loss values can collectively overwhelm the model. Focal Loss reduces the loss contribution from easy examples and increases the importance of correcting misclassified examples. Any ANN herein, may comprise, may use, or may be based on, a method, scheme or architecture that is Graph Neural Network (GNN) that processes data represented by graph data structures that capture the dependence of graphs via message passing between the nodes of graphs, such as GraphNet, Graph Convolutional Network (GCN), Graph Attention Network (GAT), or Graph Recurrent Network (GRN).

Any ANN herein, may comprise, may use, or may be based on, a method, scheme or architecture such as Mobile-Net, for example MobileNetV1, MobileNetV2, or Mobile-NetV3, that is based on a streamlined architecture that uses depthwise separable convolutions to build light weight deep neural networks, that is specifically tailored for mobile and resource constrained environments, and improves the state-of-the-art performance of mobile models on multiple tasks and benchmarks as well as across a spectrum of different model sizes. Any ANN herein, may comprise, may use, or may be based on, a method, scheme or architecture such as U-Net, which is based on the fully convolutional network to supplement a usual contracting network by successive layers, where pooling operations are replaced by upsampling operators. These layers increase the resolution of the output, and a successive convolutional layer can then learn to assemble a precise output based on this information.

Any ANN herein, may comprise, may use, or may be based on, a method, scheme or architecture such as Visual Geometry Group (VGG) VGG-Net, such as VGG 16 and VGG 19, respectively having 16 and 19 weight layers. The VGG Net extracts the features (feature extractor) that can distinguish the objects and is used to classify unseen objects, and was invented with the purpose of enhancing classification accuracy by increasing the depth of the CNNs. There are five max pooling filters embedded between convolutional layers in order to down-sample the input representation. The stack of convolutional layers is followed by 3 fully connected layers, having 4096, 4096 and 1000 channels, respectively, and the last layer is a soft-max layer. A thorough evaluation of networks of increasing depth is using an architecture with very small (3×3) convolution filters, which shows that a significant improvement on the prior-art configurations can be achieved by pushing the depth to 16-19 weight layers.

Any object or region in any image herein may include, may consist of, or may be part of, a landform that includes, consists of, or is part of, a shape or form of a land surface. The landform may be a natural or artificial feature of the solid surface of the Earth. Typical landforms include hills, mountains, plateaus, canyons, and valleys, as well as shoreline features such as bays and peninsulas. Landforms together make up a given terrain, and their arrangement in the landscape is known as topography. Terrain (or relief) involves the vertical and horizontal dimensions of land surface, usually expressed in terms of the elevation, slope, and orientation of terrain features. Terrain affects surface water flow and distribution. Over a large area, it can affect weather and climate patterns. Landforms are typically categorized by characteristic physical attributes such as elevation, slope, orientation, stratification, rock exposure, and soil type. Gross physical features or landforms include intuitive elements such as berms, mounds, hills, ridges, cliffs, valleys, rivers, peninsulas, volcanoes, and numerous other structural and size-scaled (e.g., ponds vs. lakes, hills vs. mountains) elements including various kinds of inland and oceanic waterbodies and sub-surface features. Artificial landforms may include man-made features, such as canals, ports and many harbors; and geographic features, such as deserts, forests, and grasslands.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™-2008 entitled: "*Standard for Information Technology—Portable Operating System Interface (POSIX®) Description*", and The Open Group Technical Standard Base Specifications, Issue 7, IEEE STD. 1003.1™, 2013 Edition.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A., Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

Unless otherwise dictated by the context or specifically disclosed in the text, any of the steps, functions, operations, or processes herein, such as any of the steps in any of the flow-charts herein, is performed automatically, typically by a processor under software or firmware control, in the respective device, without any intervention by a human operator or user. Further, any shifting between states, steps, functions, operations, or processes herein, such as shifting between any of the steps in any of the flow-charts herein, is performed automatically, typically by a processor under software or firmware control in the respective device, without any intervention by a human operator or user.

Any image or image content herein may consist of, be part of, or include, an image or an image extracted from a video content. A video content may be in a digital video format that may be based on one out of: TIFF (Tagged Image File Format), RAW format, AVI, DV, MOV, WMV. MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. An intraframe or interframe compression may be used, and the compression may be a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

A non-limiting example of a processor may be 80186 or 80188 available from Intel Corporation located at Santa-Clara, California, USA. The 80186 and its detailed memory connections are described in the manual "80186/80188 High-Integration 16-Bit Microprocessors" by Intel Corporation, which is incorporated in its entirety for all purposes as if fully set forth herein. Other non-limiting example of a processor may be MC68360 available from Motorola Inc. located at Schaumburg, Illinois, USA. The MC68360 and its detailed memory connections are described in the manual "MC68360 Quad Integrated Communications Controller-User's Manual" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Texas, U.S.A.), described in a data sheet published 2015 by Texas Instruments Incorporated [DS-TM4C123GH6PM-15842.2741, SPMS376E, Revision 15842.2741 June 2014], entitled: "*Tiva™ TM4C123GH6PM Microcontroller—Data Sheet*", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHZ Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHZ Cortex-M with FPU, a variety of integrated memories and multiple programmable GPIO. Tiva™ C Series devices offer consumers compelling cost-effective solutions.

The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). Capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any medium or any memory, that participates in providing instructions to a processor for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that perform particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

Operating system. An Operating System (OS) is software that manages computer hardware resources and provides common services for computer programs. The operating system is an essential component of any system software in a computer system, and most application programs usually require an operating system to function. For hardware functions such as input/output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Any software or firmware herein may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat)), Apple iOS version 3, Apple iOS version 4, Apple IOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (uC/OS).

Any apparatus herein, may be a client device that may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A., Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as a server, may equally function as a server in the meaning of client/server architecture. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for semantic appearance transfer comprising:
capturing, by a first camera, a first image that comprises a first structure associated with a first appearance;
capturing, by a second camera, a second image that is semantically-related to the first image and is associated with a second appearance that is different from the first appearance;
providing, to a first appearance analyzer, the second image;
generating, by the first appearance analyzer, a first output that is responsive to, comprises a representation of, or comprises a function of, the second appearance;
providing, to a second appearance analyzer, the third image;
generating, by the second appearance analyzer, a second output that is responsive to, comprises a representation of, or comprises a function of, an appearance of the third image;
comparing, by a first appearance comparator, the first and second outputs;
training, a generator, to minimize or nullify the difference between the first and second outputs;
providing, to the generator, the first and second images;
processing, by the generator, using an Artificial Neural Network (ANN), the first and second images;
outputting, by the generator, based on the first and semantically-related, a third image that second images being comprises the first structure associated with the second appearance; and
displaying, by a display, the third image to a user.

2. The method according to claim 1, further comprising correctly relating or identifying semantically matching regions or objects between the first and second images, and transferring the second appearance to the third image while maintaining high-fidelity of structure and appearance.

3. The method according to claim 1, further comprising:
providing, to a first structure analyzer, the first image;
generating, by the first structure analyzer, a third output that is responsive to, comprises a representation of, or comprises a function of, the first structure;
providing, to a second structure analyzer, the third image;
generating, by the second structure analyzer, a fourth output that is responsive to, comprises a representation of, or comprises a function of, a structure of the third image;
comparing, by a first structure comparator, the third and fourth outputs; and
training, the generator, to minimize or nullify the difference between the third and fourth outputs.

4. The method according to claim 3, further comprising using an optimizer with a constant learning.

5. The method according to claim 4, wherein the optimizer comprises, uses, or is based on, an algorithm for first-order gradient-based optimization of stochastic objective functions, wherein the optimizer comprises, uses, or is based on, adaptive estimates of lower-order moments, or wherein the optimizer comprises, uses, or is based on, Adam optimizer.

6. The method according to claim 5, further comprising using a publicly available deep learning framework that is based on, uses, or comprises, a machine learning library.

7. The method according to claim 6, wherein the deep learning framework comprises, uses, or is based on, PyTorch.

8. The method according to claim 5, wherein the first appearance analyzer, the second appearance analyzer, the first structure analyzer, or the second structure analyzer, comprises, uses, or is based on, a self-supervised pre-trained fixed Vision Transformer (ViT) model that uses a self-distillation approach.

9. The method according to claim 8, wherein each of the first appearance analyzer, the second appearance analyzer, the first structure analyzer, or the second structure analyzer, comprises, uses, or is based on, a respective self-supervised pre-trained fixed Vision Transformer (ViT) model that uses a self-distillation approach.

10. The method according to claim 8, wherein the Vision Transformer (ViT) model comprises, uses, or is based on, an architecture or code that is configured for Natural Language Processing (NLP), or wherein the Vision Transformer (ViT) model comprises, uses, or is based on, a fine-tuning or pre-trained machine learning model, wherein the Vision Transformer (ViT) model comprises, uses, or is based on, a deep learning model that comprises, is based on, or uses, attention, self-attention, or multi-head self-attention, or wherein the Vision Transformer (ViT) model further comprises splitting a respective input image into multiple non-overlapping same fixed-sized patches.

11. The method according to claim 10, wherein the Vision Transformer (ViT) model comprises, uses, or is based on, differentially weighing a respective significance of each patch of a respective input image, wherein the Vision Transformer (ViT) model comprises, uses, or is based on, attaching or embedding a feature information to each of the patches, that comprises a key, a query, a value, a token, or any combination thereof, wherein the Vision Transformer (ViT) model comprises, uses, or is based on, attaching or embedding a position information in the image for each of the patches for providing a series of positional embedding patches, and feeding the position-embedded patches and positions to a transformer encoder, or wherein the Vision Transformer (ViT) model is further trained with image labels and is fully supervised on a dataset.

12. The method according to claim 8, wherein the Vision Transformer (ViT) model comprises, uses, or is based on, assigning a [CLS] token to the image, predicting or estimating a class label to a respective input image, or any combination thereof.

13. The method according to claim 12, wherein the Vision Transformer (ViT) model comprises, uses, or is based on, a DINO-ViT model.

14. The method according to claim 13, wherein the DINO-ViT model is used as external semantic high-level prior, wherein the second appearance analyzer and the second structure analyzer are based on, or use, the same DINO-ViT, or wherein the first appearance analyzer or the second appearance analyzer comprises a DINO-ViT model.

15. The method according to claim 14, wherein the first appearance analyzer comprises a first DINO-ViT model, and wherein the first output comprises, is a function of, uses, is based on, or is responsive to, a self-similarity of keys in the deepest attention module (Self-Sim) of the first DINO-ViT model, or wherein the second appearance analyzer comprises a second DINO-ViT model, and wherein the second output comprises, is a function of, uses, is based on, or is responsive to, a self-similarity of keys in a deepest attention module (Self-Sim) of the second DINO-ViT model.

16. The method according to claim 13, wherein the first structure analyzer or the second structure analyzer comprises a DINO-ViT model, and wherein the first structure analyzer comprises a first DINO-VIT model, and wherein the third output comprises, is a function of, uses, is based on, or is responsive to, a [CLS] token in a deepest layer of the first DINO-ViT model, or wherein the second structure analyzer comprises a second DINO-ViT model, and wherein the fourth output comprises, is a function of, uses, is based on, or is responsive to, a [CLS] token in a deepest layer of the second DINO-ViT model.

17. The method according to claim 1, wherein the third image comprises an across objects transfer, so that the second appearance that comprises appearance of one or more objects in the first image is transferred to semantically-related objects in the second image, while attenuating or ignoring variations in pose, number of objects, or appearance of the second image, wherein the third image comprises a within objects transfer, wherein the first appearance that comprises appearance of one or more objects in the second image is transferred between corresponding body parts or object elements of the first and second images, or wherein the second appearance comprises a global appearance information and style, color, texture, or any combination thereof, while attenuating, ignoring, or discarding, exact objects' pose, shape, perceived semantics of the objects and their surroundings, and scene's spatial layout.

18. The method according to claim 1, wherein a [CLS] token of a DINO-ViT model applied to the second image or to the third image represents, or is responsive to, the second appearance.

* * * * *